United States Patent
Wohlstadter et al.

(10) Patent No.: US 11,734,753 B2
(45) Date of Patent: Aug. 22, 2023

(54) REAL PROPERTY INFORMATION MANAGEMENT, RETENTION AND TRANSFERAL SYSTEM AND METHODS FOR USING SAME

(71) Applicant: Thermodynamic Design, LLC, Potomac, MD (US)

(72) Inventors: Jacob Wohlstadter, Potomac, MD (US); Bradley Christiansen, Centreville, VA (US); Craig Philip Lovell, Fairfax, VA (US); Michael Osganian, Fairfax, VA (US); Michael Vock, Vienna, VA (US)

(73) Assignee: Thermodynamic Design, LLC, Rockville, MD (US)

( * ) Notice: Subject to any disclaimer, the term of this patent is extended or adjusted under 35 U.S.C. 154(b) by 821 days.

(21) Appl. No.: 16/551,526

(22) Filed: Aug. 26, 2019

(65) Prior Publication Data

US 2020/0151811 A1    May 14, 2020

Related U.S. Application Data

(60) Continuation of application No. 15/156,552, filed on May 17, 2016, now Pat. No. 10,546,347, which is a continuation of application No. 13/856,703, filed on Apr. 4, 2013, now abandoned, which is a division of application No. 12/451,946, filed as application No. PCT/US2008/007172 on Jun. 6, 2008, now Pat. No. 8,442,921.

(Continued)

(51) Int. Cl.
*G06Q 40/02* (2023.01)
*G06Q 40/00* (2023.01)
(Continued)

(52) U.S. Cl.
CPC ......... *G06Q 40/02* (2013.01); *G06Q 30/0623* (2013.01); *G06Q 40/00* (2013.01); *G06Q 40/10* (2013.01); *G06Q 50/16* (2013.01)

(58) Field of Classification Search
CPC .... G06Q 40/02; G06Q 30/0623; G06Q 40/00; G06Q 40/10; G06Q 50/16
See application file for complete search history.

(56) References Cited

U.S. PATENT DOCUMENTS

| 5,794,216 A | 8/1998 | Brown |
| 6,594,633 B1 | 7/2003 | Broerman |

(Continued)

FOREIGN PATENT DOCUMENTS

| AU | 2004208660 A1 | 9/2004 |
| CN | 1813228 A | 8/2006 |

(Continued)

OTHER PUBLICATIONS

Kevin Park, Good Home Improvers Make Good Neighbors, Apr. 2008, Harvard University, web, 1-25 (Year: 2008).*

(Continued)

*Primary Examiner* — I Jung Liu
(74) *Attorney, Agent, or Firm* — Wolf, Greenfield & Sacks, P.C.

(57) ABSTRACT

The present invention is in the field of computer systems and processes for managing real and personal property. One aspect of the invention is directed to capturing history of a (real) property, which may include a description of the property, the personal property located on the real property, the projects and maintenance performed or to be performed on the property and their impact on the owner's tax basis in the property. Another aspect of invention allows for sharing of this history with an online community and for transferring the history (or portions thereof) on sale to a buyer.

43 Claims, 60 Drawing Sheets

Related U.S. Application Data

(60) Provisional application No. 60/933,728, filed on Jun. 8, 2007.

(51) Int. Cl.
    G06Q 40/10      (2023.01)
    G06Q 30/0601    (2023.01)
    G06Q 50/16      (2012.01)

(56) References Cited

U.S. PATENT DOCUMENTS

| | | | |
|---|---|---|---|
| 7,076,452 | B2 | 7/2006 | Florance et al. |
| 7,089,202 | B1 * | 8/2006 | McNamar ............. G06Q 40/04 |
| | | | 705/36 R |
| 7,171,389 | B2 | 1/2007 | Harrison |
| 7,454,355 | B2 | 11/2008 | Milman et al. |
| 7,818,219 | B2 | 10/2010 | Klivington et al. |
| 7,890,484 | B1 | 2/2011 | Hall |
| 8,224,726 | B2 | 7/2012 | Murray |
| 8,442,921 | B2 | 5/2013 | Wohlstadter |
| 10,546,347 | B2 | 1/2020 | Wohlstadter et al. |
| 2001/0051883 | A1 | 12/2001 | Loveland |
| 2002/0116163 | A1 | 8/2002 | Loveland |
| 2003/0023610 | A1 | 1/2003 | Bove |
| 2003/0225599 | A1 | 12/2003 | Mueller et al. |
| 2004/0098269 | A1 | 5/2004 | Wise et al. |
| 2004/0133645 | A1 | 7/2004 | Massanelli |
| 2004/0167797 | A1 | 8/2004 | Goncalves |
| 2005/0010423 | A1 | 1/2005 | Bagbey |
| 2005/0071376 | A1 | 3/2005 | Modi |
| 2005/0187832 | A1 | 8/2005 | Morse et al. |
| 2005/0288957 | A1 | 12/2005 | Eraker et al. |
| 2006/0167776 | A1 * | 7/2006 | Conaty ............. G06Q 40/00 |
| | | | 705/35 |
| 2006/0271406 | A1 | 11/2006 | Califano et al. |
| 2007/0100644 | A1 | 5/2007 | Keillor et al. |
| 2007/0174070 | A1 | 7/2007 | Jafa et al. |
| 2007/0198493 | A1 | 8/2007 | Serio |
| 2007/0214073 | A1 | 9/2007 | Smith |
| 2007/0220123 | A1 | 9/2007 | Agrawal |
| 2007/0255581 | A1 | 11/2007 | Otto et al. |
| 2012/0265633 | A1 | 10/2012 | Wohlstadter et al. |
| 2013/0304612 | A1 | 11/2013 | Wohlstadter et al. |
| 2016/0335716 | A1 | 11/2016 | Wohlstadter et al. |

FOREIGN PATENT DOCUMENTS

| | | |
|---|---|---|
| DE | 10140712 A1 | 3/2003 |
| EP | 1 693 793 A1 | 8/2006 |
| JP | 2001-283036 A | 10/2001 |
| JP | 2002-083031 A | 3/2002 |
| JP | 2002-092124 A | 3/2002 |
| JP | 2002-197168 A | 7/2002 |
| JP | 2002-279045 A | 9/2002 |
| JP | 2002-304539 A | 10/2002 |
| JP | 2003-006303 A | 1/2003 |
| JP | 2003-030305 A2 | 1/2003 |
| JP | 2003-099518 A | 4/2003 |
| JP | 2003-178126 A | 6/2003 |
| JP | 4421797 B2 * | 2/2010 |
| KR | 0340707 B1 | 6/2002 |
| KR | 2002-0062727 | 7/2002 |
| WO | WO 01/31540 A1 | 5/2001 |
| WO | WO 2002/041116 A2 | 5/2002 |

OTHER PUBLICATIONS

Chinese Second Office Action dated Dec. 16, 2020 in connection with Chinese Application No. 201610818442.6.
PCT/US2008/007172, Nov. 19, 2008, International Search Report and Written Opinion.
PCT/US2008/007172, Dec. 11, 2009, International Preliminary Report on Patentability.
EP 08 768 245.6, Jun. 8, 2011, Extended European Search Report.
EP 08 768 245.6, Jul. 24, 2012, Office Communication.
EP 08 768 245.6, Dec. 14, 2012, Summons to Attend Oral Proceedings.
EP 08 768 245.6, Apr. 9, 2013, Decision to Refuse a European Patent Application.
EP 08 768 245.6, May 8, 2019, Summons to Oral Proceedings.
Office Communication dated May 7, 2012, for Application No. AU 2008262341.
Office Communication Jul. 22, 2013, for Application No. AU 2008262341.
Office Communication dated Oct. 29, 2014, for Application No. AU 2013234417.
Office Communication dated Sep. 24, 2015, for Application No. AU 2013234417.
Office Communication dated Oct. 23, 2015, for Application No. AU 2013234417.
Office Communication Oct. 23, 2015, for Application No. CA 2,691,280.
Office Communication dated Nov. 2, 2015, for Application No. CA 2,691,280.
Office Communication Jan. 20, 2017, for Application No. CA 2,928,392.
Office Communication Dec. 18, 2017, for Application No. CA 2,928,392.
Office Communication dated Oct. 26, 2011, for Application No. CN 200880102328.7.
Office Communication dated Jul. 31, 2012, for Application No. CN 200880102328.7.
Office Communication Feb. 4, 2013, for Application No. CN 200880102328.7.
Office Communication dated Oct. 22, 2014, for Application No. CN 200880102328.7.
Office Communication dated Dec. 31, 2014 for Application No. CN 200880102328.7.
Office Communication dared May 18, 2015 for Application No. CN 200880102328.7.
Office Communication dated Sep. 25, 2015 for Application No. CN 200880102328.7.
Office Communication dated Jan. 29, 2016 for Application No. CN 200880102328.7.
Office Communication dated Jun. 12, 2016 for Application No. CN 200880102328.7.
Office Communication dated Nov. 21, 2016 for Application No. CN 201610818442.6.
Office Communication dated Oct. 5, 2012 for Application No. JP 2010-511216.
Office Communication dated Mar. 6, 2013 for Application No. JP 2010-511216.
Office Communication dated Mar. 23, 2015 for Application No. KR 10-2010-7000472.
Office Communication dated Oct. 28, 2015 for Application No. KR 10-2010-7000472.
Examination Report dated Aug. 20, 2018 for Application No. AU 2016200732.
International Search Report and Written Opinion dated Nov. 19, 2008 in connection with International Application No. PCT/US2008/007172.
International Preliminary Report dated Dec. 11, 2009 in connection with International Application No. PCT/US2008/007172.
Extended European Search Report dated Jun. 8, 2011 in connection with Emopean Application No. 08768245.6.
European Office Communication dated Jul. 24, 2012 in connection with European Patent Application No. 08768245.6.
European Summons to Attend Oral Proceedings dated Dec. 14, 2012 in connection with European Application No. 08768245.6.
European Office Action dated Apr. 9, 2013 in connection with European Application No. 08768245.6.
European Summons to Oral Proceedings dated May 8, 2019 in connection with European Application No. EP 08768245.6.
Australian Official Notice dated May 7, 2012 in connection with Australian Patent Application No. 2008262341.

(56) References Cited

OTHER PUBLICATIONS

Australian Notice of Acceptance dated Jul. 22, 2013 in connection with Australian Application No. 2008262341.
Australian Patent Examination Report issued Oct. 29, 2014 in connection with Australian Patent Application No. 2013234417.
Australian Patent Examination Report No. 2 dated Sep. 24, 2015 in connection with Australian Application No. 2013234417.
Australian Notice of Acceptance dated Oct. 23, 2015 for Australian Application No. 2013234417.
Australian Examination Report dated Aug. 20, 2018 in conneciton with Australian Application No. 2016200732.
Canadian Office Action dated Jan. 23, 2015 in connection with Canadian Application No. 2,691,280.
Canadian Notice of Allowance dated Nov. 2, 2015 in connection with Canadian Application No. 2,691,280.
Canadian Office Action dated Jan. 20, 2017 in connection with Canadian Application No. 2,928,392.
Canadian Office Action dated Dec. 18, 2017 in connection with Canadian Application No. 2,928,392.
Chinese Office Action dated Oct. 26, 2011 in connection with Chinese Application No. 200880102328.7.
Chinese Office Action dated Jul. 31, 2012 in connection with Chinese Application No. 200880102328.7.
Chinese Decision of Rejection dated Feb. 4, 2013 in connection with Chinese Application No. 200880102328.7.
Chinese Office Action dated Oct. 22, 2014 in connection with Chinese Application No. 200880102328.7.
Chinese Office Action dated Dec. 31, 2014 in connection with Chinese Application No. 200880102328.7.
Chinese Decision of Rejection dated May 18, 2015 in connection with Chinese Application No. 200880102328.7.
Chinese Office Action dated Sep. 25, 2015 in connection with Chinese Application No. 200880102328.7.
Chinese Office Action dated Jan. 29, 2016 in connection with Chinese Application No. 200880102328.7.
Chinese Office Action dated Jun. 12, 2016 in connection with Chinese Application No. 200880102328.7.
Chinese Office Action dated Nov. 21, 2016 in connection with Chinese Application No. 201610818442.6.
Japanese Official Notice dated Oct. 5, 2012 in connection with Japanese Patent Application No. 2010-511216.
Japanese Office Action dated Mar. 6, 2013 in connection with Japanese Application No. 2010-511216.
Korean Office Action dated Mar. 23, 2015 in connection with Korean Application No. 10-2010-7000472.
Korean Notice of Allowance dated Oct. 28, 2015 in connection with Korean Application No. 10-2010-7000472.
[No Author Listed], HomeShark Acquires HomeScout. PR Newswire. Mar. 12, 1998.
[No Author Listed], Timberline Introduces Bid Management Software. PR Newswire. Apr. 18, 2003.
[No Author Listed], AmeriQuotes.com Launches Extensive Online Directory of Commercial Real Estate Service Providers. PR Newswire. Oct. 17, 2000.
Dornbusch, Computer-Based Information Services: Putting the World at Your Fingertips. Austin Business Journal, vol. 12, No. 49, s. 1, p. 12, Feb. 1, 1993.
Du Bois, Technology Nets Real Estate—Online Marketplaces Cut Workload, Facilitate Sale of Products, Services. eWeek. Oct. 23, 2000; 59.
Hackney, Detroit Free Press Suzette Hackney Column Detroit Free Press. May 20, 2005.
Holma, Commentary: Are Subcontractors Bids Binding? That Depends. Daily Record and the Kansas City Daily News-Press. Nov. 18, 2005:1.
Lopez, City to Re-Bid Civic Center Project. The Santa Fe New Mexican. Jul. 27, 2006: A-1.
Park, Good Home Improvers Make Good Neighbors. Apr. 2008, Harvard University, web, 1-25 (Year:2008).
Australian Examination Report dated Jan. 5, 2022 in connection with Austrian Application No. 2020257107.
[No Author Listed], Frequently Asked Questions—Virtual Tour FAQ. realtor.com Apr. 3, 2000 http://web.archive.org/web/20000304023252/http://www.realtor.com/FAQ/VirtualFAQ.asp [last accessed Feb. 9, 2012], 6 pages.
Office Action for Canadian Application No. 2,928,392, dated Oct. 15, 2021.
Australian Examination Report No. 2 dated Dec. 2, 2022, in connection with Australian Application No. 2020257107.
Australian Direction of Request Examination dated Jan. 31, 2023, in connection with Australian Application No. 2023 20061.

\* cited by examiner

| Filter by Home Features | | | | Hide ▲ |
|---|---|---|---|---|
| Lot Size: | Any Size ▼ | | | |
| Architectural Style: | Any Style ▼ | | | |
| Minimum Sq. Ft.: | Any Size ▼ | | | |
| Age of Home: | Any Age ▼ | | | |
| Air Conditioning: | Any ▼ | | | |
| Closet: | Cedar-Lined / Clothes/Standard / Coat | Bar: | Breakfast / Dry / Wet | |
| Driveway: | Asphalt / Concrete / Dirt | Deck | Any ▼ | |
| | | Exterior: | Aluminum Siding / Brick / Faux Stucco | |
| Fireplace: | Faux / Gas / Wood Burning | Floor: | Carpeted / Concrete / Hardwood | |
| Garden: | Flower / Herb / Rock | Heat: | Baseboard / Forced Air / Gas | |
| Location: | Beach Front / Cul-de-sac / End Unit | Parking: | Assigned / Attached / Carport | |
| Plumbing: | Any ▼ | Pool: | Any ▼ | |
| Roof: | Any ▼ | Sewer: | Any ▼ | |
| Water: | Any ▼ | | | |

Miscellaneous:

☐ Balcony   ☐ Central Vacuum   ☐ Indoor Pool

☐ Porch   ☐ Putting/Chipping Green   ☐ Security System

☐ Solar Power   ☐ Spa/Hot Tub   ☐ Sprinkler System

☐ Tennis Court   ☐ Wine Cooler

[Show Homes]

Details and Features — 2104

| Field | Value |
|---|---|
| Neighborhood: | Mr. Roger's Neighborhood |
| Listing Status: | For Sale |
| Listing Price: | $960000 |
| Estimated Value: | $951000 |
| Tax Assessed Value: | $885000 |
| Basis: | $338000 — 2103 |
| Home Type: | Single Family House |
| Architectural Style: | Neoclassical |
| Model Name: | Essington |
| Builder: | NV Homes |
| Year Built: | 1954 |
| Lot Size: | 48.0 Acres |
| Home Size: | 6875 Square Feet |
| Description: | Single family house overlooking a man-made pond. |

Hide ▲

FIG. 21C

NOTE: For feature sets supporting more than one selection, to select more than one feature Hold the CTRL key down.

| | | | | |
|---|---|---|---|---|
| Air Conditioning: | None ▼ | | Closet: | Cedar-Lined ▼ / Clothes/Standard / Coat ▲ |
| Deck: | None ▼ | | Driveway: | Concrete ▼ / Dirt / *Gravel* ▲ |
| Exterior: | Stucco ▼ / Vinyl Siding / *Wood* ▲ | | Garden: | *Flower* ▼ / Herb / Rock ▲ |
| Heat: | Baseboard ▼ / Forced Air / Gas ▲ | *2106* | Location: | Cul-de sac ▼ / End Unit / *Golf Course Front* ▲ |
| Parking: | Assigned ▼ / Attached / Carport ▲ | | Patio: | None ▼ |
| Plumbing: | None ▼ | | Pool: | Indoor ▼ / Outdoor Above-Ground / Outdoor In-Ground ▲ |
| Roof: | None ▼ | | | |
| Water: | None ▼ | | Sewer: | None ▼ |
| | | | Windows: | Bay ▼ / Casement / Double-paned ▲ |

Miscellaneous:
- ☐ Air Filter   ☐ Automatic Garage Door   ☐ Automatic Gates
- ☐ Basketball Hoop   ☐ Cable   ☐ Central Vacuum
- ☐ Intercom System   ☐ Porch   ☐ Putting/Chipping Green
- ☐ Satellite Dish   ☐ Security System   ☐ Shutters
- ☐ Sidewalk   ☐ Solar Power   ☐ Spa/Hot Tub
- ☐ Sprinkler System   ☐ Tennis Court   ☐ Water Filter
- ☐ Zoned Temperature Control

[ Save ]

*FIG. 21D*

| | | | | | Published |
|---|---|---|---|---|---|
| My Homes ▼ Find a Home ▼ Providers ▼ Forums | | | | | |
| ○ 464 Main st. >Project Overview — 2201 | | | | | |
| 🏠 Show [All ▼] Projects | | | | | |
| 🏠 New Project — 2206 | | | | | |
| | | 2202 | 2212 2214 | | |
| Delete | Name ⇕ | Category ⇕ | Status ⇕ | Start ⇕ Date 2210 | End ⇕ Date |
| ☐ | Gutters Project | Cleaning Services—>Exterior Home—>Gutters | Inactive ▼ | | ☑ |
| ☐ | Fix Railing 2204 | Carpentry—>Decks—>Repair | New ▼ | | ☑ |
| ☐ | Floor | Carpentry—>Flooring—>Hardwood | New ▼ | | ☐ |
| ☐ | Gutters Project | Cleaning Services—>Exterior Home—>Gutters | New ▼ | | ☑ |
| ☐ | Outlets, Switches & Wiring Project | Electrical—>Outlets—>Switches & Wiring | In Progress ▼ | 9/12/2006 | ☑ |
| ☐ | Fireplaces, Inserts & Stoves Project | Heating & Cooling—>Heating Systems—>Fireplaces, Inserts & Stoves | In Progress ▼ | 9/12/2006 | ☑ |
| ☐ | Interior Designers Project | Home Services—>Interior Designers | Submitted ▼ | | ☑ |
| ☐ | Recovery Project 2208 | Computers—>Data—>Recovery | New ▼ | | ☑ |

[ Save Changes ]  [ Reset ]

My Homes ▼  Find a Home  Providers ▼  Forums

○ 464 Main St. > Home Layout

To add a room to a floor, first select the floor then click on a room type to add that type of room to the floor.

Add Floor

△ Attic  [×]

☐ 1st Floor  [×]

| Master Bedroom [×] | Master Bedroom [×] | Dinette [×] |
| Dining Room [×] | Exercise Room [×] | Family Room [×] |
| Foyer [×] | Kitchen [×] | Laundry Room [×] |
| Loft [×] | Media Room [×] | Study [×] |

☐ Basement  [×]

Workshop [×]  Recreation Room [×]

Rooms Options
○ Attached Garage
○ Bed
○ Den
○ Dinette
○ Dining
○ Exercise
○ Family
○ Foyer
○ Full Bath
○ Half Bath
○ Kitchen
○ Laundry
○ Library
○ Living
○ Loft
○ Media
○ Rec
○ Study
○ Sun
○ Utility
○ Workshop
○ Other

Details and Features                                    Hide ▲

Shape:       [Hexagonal ▼]

Length:      [         ] Feet    Width: [     ] Feet

Area:        [         ] Square Feet

Description: [A smelly and cramped Dinette           ]

NOTE: For feature sets supporting more than one selection, to select more than one feature hold the CTRL key down.

| | | | |
|---|---|---|---|
| Bar: | Breakfast / Dry / Wet | Bath/Shower: | Freestanding Tub / Jacuzzi / Stand-up Shower |
| Ceiling: | Painted / Popcorn / Tray | Closet: | Coat / Linen / Pantry |
| Communication: | Antenna / Cable / Ethernet | Door: | Pet / Screen / Single/Standard |
| Fireplace: | Faux / Gas / Wood Burning | Floor: | Carpeted / Concrete / Hardwood |
| Lighting: | Chandelier / Fluorescent / Halogen | Oven: | Double |
| Sink: | Pedestal | Walls: | Painted / Paneled / Tiled |
| Windows: | Bay / Casement / Double-paned | | |

Miscellaneous:

- ☐ Balcony
- ☐ Bidet
- ☐ Built-in Shelves
- ☐ Butler's Pantry
- ☐ Carbon Monoxide Detector
- ☐ Ceiling Fan
- ☐ Clothes Dryer
- ☐ Clothes Washer
- ☐ Dehumidifier
- ☐ Dishwasher
- ☑ Exhaust Fan
- ☐ Garbage Compactor
- ☑ Garbage Disposal
- ☐ Humidifier
- ☐ Ice Maker
- ☐ Indoor Pool
- ☑ Island
- ☐ Radon Detector
- ☐ Smoke Detector
- ☐ Washer/Dryer Hookups
- ☐ Wine Cooler

[ Save ]

FIG. 27C

REAL PROPERTY INFORMATION MANAGEMENT, RETENTION AND TRANSFERAL SYSTEM AND METHODS FOR USING SAME

RELATED APPLICATIONS

This application is a continuation of co-pending U.S. patent application Ser. No. 15/156,552, entitled REAL PROPERTY INFORMATION MANAGEMENT, RETENTION AND TRANSFERAL SYSTEM AND METHODS FOR USING SAME, filed May 17, 2016, which is a continuation of co-pending U.S. patent application Ser. No. 13/856,703, entitled REAL PROPERTY INFORMATION MANAGEMENT, RETENTION AND TRANSFERAL SYSTEM AND METHODS FOR USING SAME, filed Apr. 4, 2013, which is a divisional of U.S. patent application Ser. No. 12/451,946, entitled REAL PROPERTY INFORMATION MANAGEMENT, RETENTION AND TRANSFERAL SYSTEM AND METHODS FOR USING SAME, filed Aug. 25, 2010, now U.S. Pat. No. 8,442,921, which is a national stage entry of PCT Application Serial No. PCT/US2008/007172, entitled REAL PROPERTY INFORMATION MANAGEMENT, RETENTION AND TRANSFERAL SYSTEM AND METHODS FOR USING SAME, filed Jun. 6, 2008, which claims priority to U.S. Provisional Application Ser. No. 60/933,728, entitled REAL PROPERTY INFORMATION MANAGEMENT, RETENTION AND TRANSFERAL SYSTEM AND METHODS FOR USING SAME, filed Jun. 8, 2007. The entirety of each of the preceding documents is incorporated herein by reference.

BACKGROUND

The maintenance of, and transactions in, real estate are mostly conducted by archaic, inefficient means, namely by person-to-person communications between the owner and the service providers (e.g., tradespeople) or a prospective buyer or a broker. There are very few, if any, homes that have a complete history maintained for them over a significant period of time because it is a manual, paper-intensive process. Most homeowners are not great at keeping records, let alone doing so over long periods of time.

Yet, homeownership for many people represents the single largest, most important investment they will make in their lives. Quite importantly, when a property owner sells its property, good records of work done on the property can have considerable value. Such records may influence how much a buyer is willing to pay for the property.

Somewhat surprisingly, someone searching for a home to purchase has access only to minimal information available about the prospective homes for sale and even less for homes not currently for sale. Once someone purchases a home, the purchaser (except in the case of a new home or in a few exceptional cases) assumes ownership of the home with incomplete information about the home's systems, inventory and the history of services and projects executed on the home.

Accordingly, a need exists for a system that facilitates the input and accumulation of information pertaining to real property, updatable by the owner, under the secure control of the owner and preferably transferable to a potential or actual buyer.

Technology has heretofore been employed only to a quite limited extent to aid prospective or actual home buyers or homeowners. In general, current computing systems supporting real property management are focused on facilitating advertisement and sale of property. The property owner can often post property for sale on-line on a multi-list service. Buyers can search for for-sale properties meeting their criteria.

Some computerized systems can also be used for predicting property values. These computing systems attempt to assess the historical buy/sell information about a home compared to like homes in its area and estimate a present-dollar value for a home. The estimates based on home improvements are not specific to the actual work performed or to the target market of the home nor are the definitions of the home and actual and/or potential improvements transferable to a new buyer of the home. Such numbers cannot provide basis-adjustment data.

Other real estate-related software/computer systems have been developed, such as those incorporating special algorithms for disclosing detrimental conditions affecting property; allowing for managing and preparing documentation for real estate transactions; those for coordinating real estate sales and rentals; etc.

Potential home buyers have many computing systems available to them to research available homes. However, these systems provide few, if any, historical or ancillary details that would aid the potential home buyer in his or her decision-making process. A new tool emerging for homeowners and buyers attempts to facilitate home price comparisons, but price fairness is only one of many factors relevant to a purchase decision.

Some computing systems help homeowners to connect with service providers. These various computing systems include those that provide for posting projects to an open market of providers (e.g., on a web site) who connect with the homeowner if the project interests them. Some also provide tools for the homeowner to review providers by viewing the reviews of other homeowners. These computing systems, however, don't provide a complete, or at least somewhat comprehensive, cohesive, historical view of a home's projects and the results and details of those projects, including who executed the project, which can be shared with other homeowners and/or passed on to subsequent owners of the home.

There are other computing systems supporting documentation of a home's inventory. These computing systems, so far as we are aware, do not provide for the transferal of this information to a new owner; neither do they provide mechanisms to tie into the point-of-sale of goods bought and sold either on-line or otherwise.

Current computing systems thus do not provide a mechanism or methodology for documenting, retaining, presenting and managing real property, its projects, and its contents as an asset which ultimately may be conveyed from the owner of a home to the next purchaser of that home.

SUMMARY

To address the foregoing needs and deficiencies of prior art, there is described herein a system, method and apparatus for documenting, managing, searching, and presenting real (and related personal) property information in an on-line network, supporting ultimate transfer of this information from an owner-seller to a buyer.

One aspect of the present invention is a method, computer system and computer-implemented procedure and data structures enabling a property owner or a designee of a property owner (e.g., renter or a lessee), herein referred to as "user", to describe one or more properties in a database. The database may be private or public, network or stand-alone, open or controlled access. Selected information may be locked down for only authorized access even if the database is on a public server. The database may be accessed via, or published on, a public online forum, for example, the worldwide web. A related aspect of the invention is a method, computer system and computer-implemented procedure and data structures enabling the user to identify which aspects of their home description are to remain private and which are to be public. Another related aspect of the invention is a method, computer system and computer-implemented procedure and data structures enabling an interested party to find real properties stored in the public forum and to display information about those real properties.

Another aspect of the invention is the data structures and computer-implemented procedures providing the ability to define one's belongings, or inventory, in the home or otherwise. A related aspect of the invention is computer-implemented procedures to support either manual entry of inventory item information through interaction with the user interface or partially or completely populated item information and downloading such information obtained by decoding a universal product code (UPC) associated with the item.

One aspect of the invention is a system for maintaining property information, comprising (a) one or more databases configured to receive and store property information; (b) a server operatively connected to one or more databases for receiving data to be written to the database and for delivering to a user data from said database; (c) a communication system operatively connecting one or more remote users to the server for writing to or reading from the database; (d) a property ownership locking mechanism limiting control of certain property information to a current record owner of said property; and (d) a property ownership transfer mechanism operable to change the current record owner of a property from a first user to a second user.

In one embodiment, property may be real property and/or personal property related to the real property. Property information may include property history data. Property history information may include, for example, one or more of purchase price, tax assessments, details of improvements made (e.g., plans, cost, contractors), equipment purchase details (e.g., appliances), tradespeople who provided services, etc. A communication system may include one or more communication devices, such as, for example, modems, network cards, faxes, phones and combinations thereof.

In some example embodiments for practicing at least some aspects of the invention, one or more databases are provided for storing property history information comprising real property information and information relating to one or more projects executed on the real property. And in some example embodiments, one or more databases may also be provided for storing information relating to one or more projects not yet executed on the real property.

In one aspect, the system may further include a subsystem comprising, for example, a server and a communication device which captures (preferably automatically, from time to time) at least some of the property history information directly or indirectly from publicly accessible data.

In one aspect of the invention, the property ownership locking mechanism is adapted to be operated by the current record owner of the property to establish user access controls to limit access to selected property information to specific users or groups of users.

In another aspect of the invention, the property ownership locking mechanism is further adapted to be operated by a current record owner of the property to establish user access controls to limit the type of access selected users or groups of users have to selected property information.

In one aspect, the invention relates to a method comprising acts of capturing property information on one or more storage devices operably connected to a computer system, where the property information is or may be related to multiple properties of (e.g.,) multiple users, and the capturing of the information includes establishing access controls configurable by a record owner of a property to control access to the information by users of the computer system; a record owner of property configuring access to the information; and transferring record ownership of the property from a first user to a second user. Such a computer system may, without limitation, include two or more users at a same or in different locations, using computing devices such as personal computers, cellular phones, personal digital assistants or the like in direct or indirect communication with each other and/or one or more servers via one or more communications networks. The one or more storage devices may be at a single location or multiple locations, as well.

In one aspect of the invention, capturing property information includes capturing information about a property at different times over a span of time. In another aspect of the invention, capturing property information includes receiving input from the record owner. Yet, in another aspect of the invention, capturing property information includes obtaining at least some of the property information from publicly accessible records.

In one aspect of the invention, transferring record ownership of the property from a first user to a second user comprises changing record owner information pertaining to the property in a database. In another aspect of the invention, transferring record ownership of the property does not transfer ownership of information marked as private.

In one aspect of the invention, prior to transferring record ownership of the property from a first user to a second user, information is removed from the property information by the record owner, to maintain privacy of the removed information. An embodiment of a method according to the invention may include a step of archiving the property information so that the removed information remains accessible to the previous record owner of the property.

One aspect of the invention is a method for maintaining property information, comprising steps of operating a computer system to create a first data structure in a data store, in some non-limiting examples referred to as a Property Table, containing information comprising an identifier of a physical location of a real property component of the property and a description of the real property; operating the same or a different computer system to create a second data structure in the same or a different data store, in some non-limiting examples referred to as a Property Area Table, which contains information comprising an identifier of a structure and/or a layout of the structure at said physical location; and operating the same or a different computer system to create a third data structure in the same or a different data store, in some non-limiting examples referred to as an Inventory Table, containing information comprising an identification of one or more items of personal property located at the real property, and optionally, in a computer system, identifying a first user and creating an association between the information in the first, second and third data structures with the first user, the association establishing the first user as the owner and controller of access to the information; and, also, optionally, in a computer system, identifying a second user and changing the association from the first user to the second user to change the identity of the owner and controller of the information. The first, second and third data structures may be distinct data structures or two or more of the first, second and third data structures may be portions of a common data structure, such as separate fields in a common table or file.

In one aspect of the invention, the method may further comprise a step of, optionally, operating a computer to create a further data structure accessible to the first user and to store therein a copy of the information in at least one of the first, second and third data structures prior to changing the association. The first, second, third and any further data structures may be stored on one or more computer-accessible storage devices and are configured to form a history of the real property.

In another aspect of the invention, the method may, optionally, further comprise steps of identifying a first user and creating an association between the information in the first, second and third data structures with the first user, the association establishing the first user as the owner and controller of access to the information, in a computer system; and enabling the first user to create a trusted community of users who are granted access to at least portions of the information in at least one of the first, second and third data structures, according to access authorizations defined and administered by the first user, in a computer system.

In another aspect of the invention, the method, optionally, further comprises steps of providing a web site at which a user may interact with the data structures, and via which a user may enter a project specification accessible by service providers, to solicit bids from service providers.

In one aspect of the invention, the method further includes operating a computer system to create a fourth data structure containing a collection of information pertaining to one or more projects executed on the property.

In one aspect of the invention the data structures are stored on one or more computer-accessible storage devices and are configured to form a history of the real property.

Another embodiment of a system for practicing some aspects of the invention involves to a computer-implemented system for property owners and property-related service providers to interact, comprising steps of a first computer-interactable data structure configured and arranged for receiving from one or more service providers indications of their capabilities or types of projects for which the provider is interested in being hired; and a second computer-interactable data structure configured and arranged for receiving from the service provider identifications of one or more associated service providers proposed to operate on behalf of the service provider.

The system may, optionally, include means for serving up to a user a web page containing at least some of the service provider information and a link to a home page for the service provider. The system may, optionally, include means for serving up to a service provider user an interface for entering into the first data structure indicia of the types of projects for which the provider is interested in being hired and means for inserting corresponding text on the home page of the provider. The service provider may fill out a table, for example a table on a web page, to populate the database so that the provider's information could be linked to provider's home page.

The system may, optionally, include a project generation module which receives from a user, via a computer-implemented user interface on a web page, a project identifier and project-related information of the user, and stores the project identifier and project-related information of the user in a data store. The project-related information may include data of various types including text, audio and video data and links to other date, which may be contained in one or more computer-readable files.

In one aspect of the invention, the project-related information may be input by the user at various times, thereby allowing the history of a project to be recorded.

In another aspect of the invention, the system may further include means for receiving project information from a service provider in electronic form to facilitate archiving the information.

In another aspect of the invention, the system may further include a file import module which is usable to import computer files and associate them with a project identifier as project-related information.

Other aspects of the invention will become apparent from the discussion which follows.

BRIEF DESCRIPTION OF DRAWINGS

The foregoing aspects and many of the attendant advantages of this invention will become more readily appreciated as the same becomes better understood by reference to the following detailed description, when taken in conjunction with the accompanying drawings, wherein:

FIGS. 17A-C are illustrations of one example of real property search interface.

FIG. 18 is an illustration of one example of a representation of property search results.

FIGS. 20A-D are illustrations of one example of property information entry supported by the system.

FIGS. 21A-D are illustrations of one example of an interface for entry of property data.

FIG. 22 is an illustration of one example of project table interface.

FIGS. 23A-C are illustrations of one example of an interface for entry of project data.

FIGS. 25A-B are illustrations of one example of an interface for entry of inventory data.

Figure 26B:
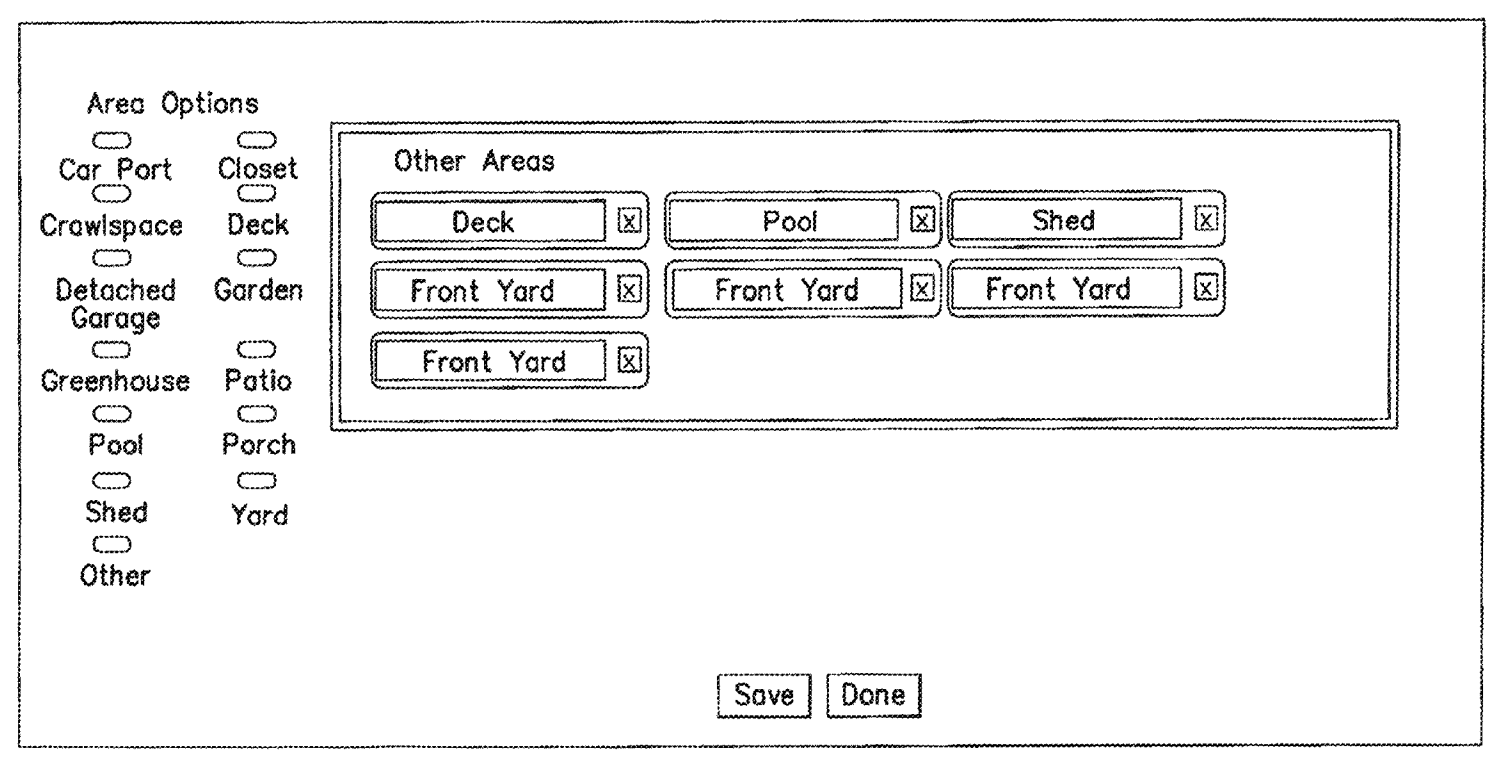

FIGS. 26A-B are illustrations of one example of an interface for entry of property lay out data.

FIGS. 27A-C are illustrations of one example of an interface for entry of property attributes data.

DETAILED DESCRIPTION OF INVENTION

Figure 1:
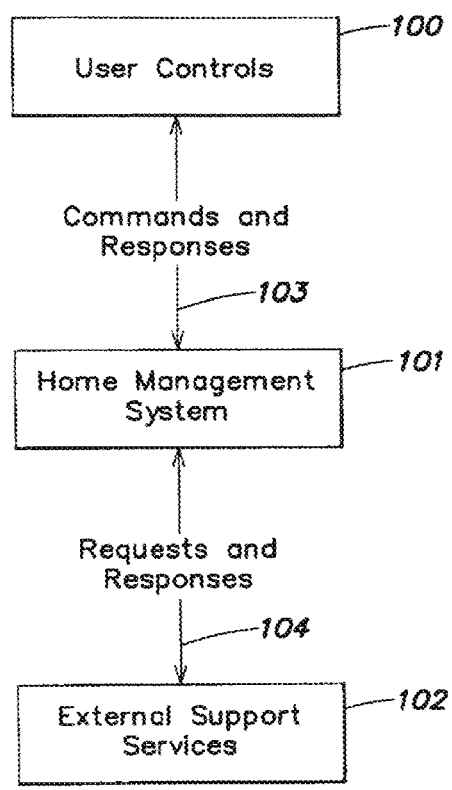
FIG. 1 is a block diagram representation of an exemplary system for implementing a Home Management System as discussed herein.

Descriptions in certain embodiments for practicing aspects of the invention will be discussed below. The examples should not be considered limiting, but are intended to illustrate certain inventive aspects. It will be useful to appreciate, in reading the detailed description, that certain words or terms have defined meanings unless another meaning is apparent.

Except as appears otherwise from the context, a property "owner" is a person or entity who creates and controls a property record in a system according to method taught herein, whether or not owing legal title.

"Computer" or "computer system" as used herein shall mean one or more computing devices, regardless of the number and location of processing elements. For example and without limitation, the term computer or computer system includes personal computers, computer networks, personal digital assistants (PDAs), mobile phones (whether smart phones, PDA phones or regular digital cell phones), web TV, portable e-mail devices, and so forth. A computer system may provide access to two or more users at different computers in a same or different locations, in direct or indirect contact with a server(s) and/or each other via a network (for example, the global internet and its World Wide Web).

"User computer" as used herein shall mean a computer that is employed by a user to perform any function using the property management software.

"Database" as used herein indicates any organized data structure or structures used for storing and retrieving information having a predefined meaning. Without limitation, a database may be a flat file structure, a relational structure, or any other form of information storage.

"Property Information" may include, but it is not limited to information about real property and personal property associated with real property, for example, address, home type, price, number of bedrooms or bathrooms, lot size, architectural style, square footage, age of home, type of air conditioning, closets, driveways, fireplace, garden, plumbing, roof, exterior, floor, heat, parking, pool, sewer, personal property inventory and other information.

"Property History Data" may include, but it is not limited to sales or rental price information from previous transactions, the timing and type and costs of home improvement projects executed on the property, previous damage from Force Majeure to the property and information for home improvement projects marked-up, but not yet executed on the property.

"Property ownership locking mechanism" may include, but it is not limited to, a set of data attributes and/or software protocol limiting access to property history data to the record owner and others, whose access is defined by record owner. As used herein, "property ownership locking mechanism" may also include a server, a set of computer instructions and one or more communication devices, wherein the set of computer instructions restricts communication of property history data to various categories of users.

In one aspect, the invention includes a system, a method and an apparatus for defining, managing and transferring, through either sale or lease, one or more properties, particularly real property and related personal property. The invention also relates to systems for maintaining, trading, selling, and/or leasing property. In one embodiment, a computer network system and software structure and information processing method are provided that enable a plurality of users to maintain, trade, sell, or lease a property or properties and/or transfer the history of a property or properties.

Referring to FIG. 1, according to one example embodiment implementing certain aspects of the invention, a system comprises three components: User Controls 100, Home Management System 101 and External Support Services 102.

The User Controls component 100 represents a mechanism by means of which someone or something may be operatively connected to the Home Management System component 101 to command the application to perform certain tasks. The User Controls component 100 could be operating on a personal computer or a server using a Windows, Linux, Mac OS, UNIX, or other operating system, or a web-enabled cell phone, wireless communication device or other personal digital assistant, and/or any other computer. The User Controls component 100 may be operatively connected to the internet and/or some other private and/or public network(s) via one or more communication devices.

The Home Management System component 101 represents the component that performs the functions supporting the property management functions described herein. The External Support Services component 102 represents any system providing general functionality used by the Home Management System 101 to help realize the property management functions described herein. in one example, the External Support Services component 102 could be a web site supporting integration of scripting language (e.g., Google Maps) directly on the page, a system providing function calls integrated into the Home Application System component 101 either on a page or embedded in the server application, or a combination of same.

In some embodiments, the Home Management System component 101 contains one or more computers, servers and/or one or more storage devices containing one or more databases configured to receive and store property information, a communication system operatively connected to the internet and/or some other private and/or public network(s) and, thus, optionally, operatively connected to one or more remote users, containing one or more databases of one or more of registered owners, registered properties, improvement or repair projects executed and/or to be executed on registered properties, personal property located on registered properties, preferred or registered vendors and one or more service providers such as general contractors, repairmen, plumbers, electricians, security companies, painters, gardeners, mortgage brokers, appliances dealers and installers, etc, and one or more communication device(s) enabling system access through the world wide web and/or some other private and/or public network(s) and system output through world wide web or some other private and/or public network(s), e-mail, telephone, fax systems and/or any other means of communication.

Figure 2:
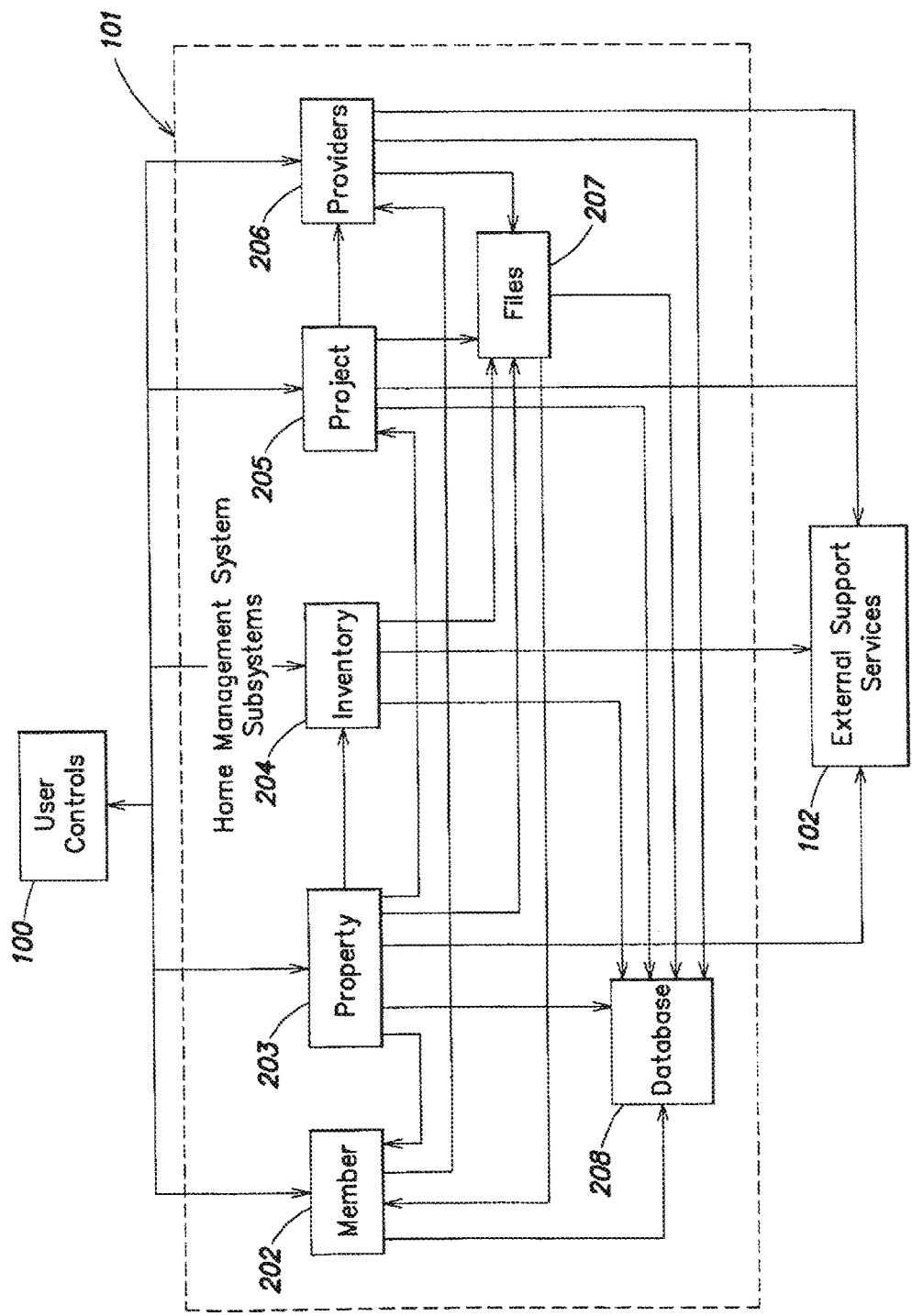
FIG. 2 is a block diagram representation of an example of the subsystems of the Home Management System.

In some embodiments, the Home Management System component 101 may be further decomposed in FIG. 2 into its logical subsystems: Member subsystem 202, Property subsystem 203, Inventory subsystem 204, Project subsystem 205, Providers subsystem 206, Files subsystem 207 and Database subsystem 208. Each of the subsystems is shown with its dependencies on other subsystems identified by the arrow pointing at the subsystem providing services to another subsystem; for example, Property subsystem 203 depends on Member subsystem 202. Member subsystem 202 is the set of computer-implemented procedures, data structures and user interfaces providing the functionality to create, edit, manage and present user information. Property subsystem 203 is the set of computer-implemented procedures, data structures and user interfaces providing the functionality to create, edit, manage, transfer and present real property (for example, home) and related personal property information. Property subsystem 203 provides for capturing information about a property at different instants over a span of time. Inventory subsystem 204 is the set of computer-implemented procedures, data structures and user interfaces providing the functionality to create, edit, buy, sell, discard, manage, transfer and present information on user's personal property. Project subsystem 205 is the set of computer-implemented procedures, data structures and user interfaces providing the functionality to create, edit, submit for bid, transfer, manage and present home project and maintenance information. Provider subsystem 206 is the set of computer-implemented procedures, data structures and user interfaces providing the functionality to create, edit, manage and present service provider information, including providing reviews of various service providers. Files subsystem 207 is the set of computer-implemented procedures, data structures and user interfaces providing the functionality to upload, reference, edit, share, and organize files for the other subsystems on the target operating system file system. Database subsystem 208 is the set of computer-implemented procedures and data structures providing the functionality to create, edit, delete and update data to be maintained persistently for the other subsystems which could be realized with relational database technology (for example, Oracle, SQL Server, DB2, MySQL, and the like), object-oriented database technology (for example, ObjectStore, Objectivity, Versant, or the like), text-based technology (XML, spreadsheets, and the like) or any other mechanism for storing logically organized information in either binary or textual form.

Figure 3:
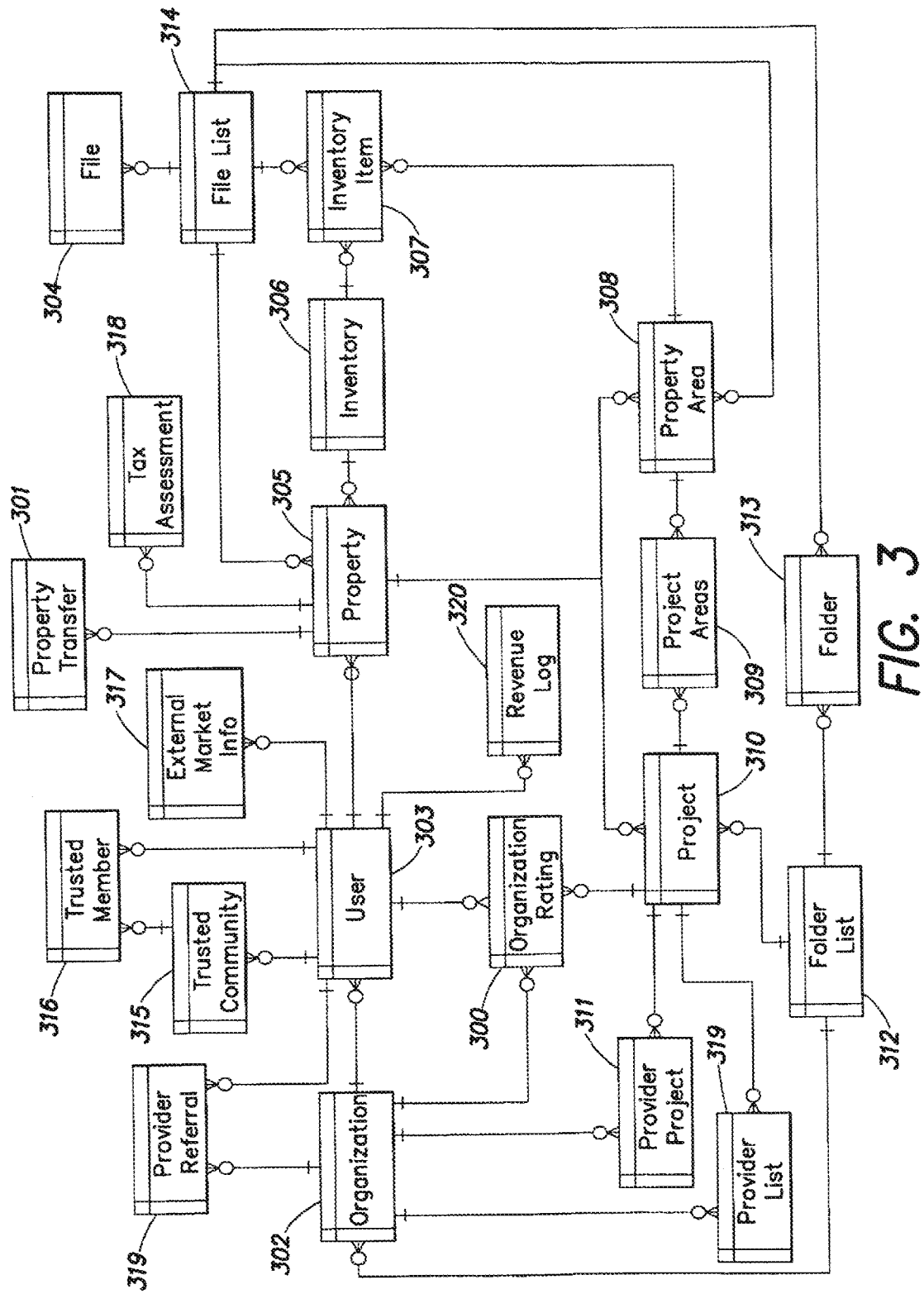
FIG. 3 is a block diagram which illustrates schematically an example of a relational database design for use in the system of FIGS. 1 and 2.

One example of Database subsystem 208 is further expanded in FIG. 3. In this diagram, primary data containers are identified with their referential relationships represented by the lines between containers; a container may contain referential attributes to one or more other containers (without intending any loss of generality, the term "Table" will be used herein synonymously with "container" to refer to an appropriate data structure). For example, Property Table 305 has a referential relationship with User Table 303 and the circle end of the line on Property Table 305 denotes that Property Table 305 will contain a referential attribute that identifies which User Table 303 is associated with a Property Table 305.

According to one embodiment, the system may provide for different categories of users in User Table 303, the categories having different privileges, for example, access and output privileges defined by the system owner. For example, the system may differentiate between guests and secured or authenticated users, and sub-differentiate between secured users using property ownership locking mechanism. In some embodiments, for example, the system administrator may grant only viewing, or limited viewing, privileges to guest users and various limited privileges to secured users who do not have any property in Property Table 305, such as, for example, service providers and prospective home buyers, with authenticator sellers having other privileges.

According to some embodiments, as in FIG. 3, Property Table 305 is at the core of Database subsystem 208. Property Table 305 contains all attributes relevant to a particular physical property (the "Property"). Associated with Property Table 305 is a User Table 303 that identifies the person or entity claiming or just documenting a property listed in Property Table 305. Also associated with a Property in Table 305 is the Inventory Table 306 identified as being located with the Property Table 305, either physically located on the Property listed in Table 305 or organized logically with the Property listed in Table 305. Property Table 305 also has associated with it the layout of the rooms and various other areas on the underlying property record as depicted with the relationship between Property Table 305 and Property Area Table 308; such that, a Property can have zero or more rooms and/or zero or more other areas. Property Area Table 308 represents a generalization of all rooms and other areas of the Property; where, room could be a kitchen, dining room, bedroom, bathroom, living room, or whatever other room typically makes up a Property while also providing for a room not pre-defined, i.e., "other," which could be named whatever the user desires to name it, for example, other area could be a front yard, back yard, patio, deck, garden, or whatever other area either in the home or on the Property that the user desires to describe. While providing for a non pre-defined area, "other" which could be named whatever the user desires to name it. Property Table 305 also has associated with it a File List 314 which contains all Files 304 uploaded to a property record or referenced by a Property Table 305. Such files could be images, video, audio, documents or any other electronic form of supplemental information about a Property. Property Area Table 308 also has associated with it a File List 314 so as to provide for organizing Files 304 with the relevant room or other area. Property Table 305 also is associated with Tax Assessments Table 318 which provides for a historical rundown of all the tax assessments provided by a county for a Property. Property Table 305 also is associated with Property Transfer Table 301 which provides for a historical rundown of all the sales transactions conducted on a Property. And finally, Property Table 305 has associated with it in Projects Table 310 information on projects executed on a Property.

According to one aspect of the invention, Database subsystem 208 initially may be populated using a Populater subsystem (unmarked) which captures the property history information directly or indirectly from publicly accessible data. Capturing directly or indirectly includes, but is not limited to, receiving information from websites, such as county websites, or electronic feeds in either electronic form that can be imported into the system according to an algorithm, or in a form of a printout. As used herein, publicly accessible data includes public and private records accessible to the system such as, for example, freely accessible records and records accessible on a fee-for-service or subscription basis. Alternatively, or before or after capturing the property history information directly or indirectly from publicly accessible data, Database system 208 may be populated by the record owner, or a user whom the record owner delegates the authorization to update property information. For example, such a delegate might be a service provider who executed a project on a property; that person would enter information about one or more properties—e.g., at different times over a span of time.

In one type of embodiment, as exemplified in FIG. 3, User Table 303 as previously mentioned is associated with a Property Table 305 and may be associated with zero or more Properties. "Users," identified in User Table 303, could include, but are not limited to, registered owners, preferred vendors and registered service providers such as general contractors, repairmen, plumbers, electricians, security, painters, gardeners, mortgage brokers, real estate brokers, appliances dealers, installers, etc. A user may also have zero or more accounts with other marketplaces, both electronic and in-person, and they may desire to share information between those markets and this system in some automated or semi-automated fashion. These accounts are represented by the relationship between User Table 303 and External Market Info Table 317. A user may also set up a Table (e.g., the Trusted Community Table 315) defining a trusted community of people with whom they desire to share in greater detail the specifics of their Property using a property ownership locking mechanism. The trusted community is represented by the associations between User Table 303, Trusted Community Table 315, and Trusted Member Table 316. A user could have any number of trusted communities with any number of members in each trusted community. A member would also be a user of the system, but doesn't necessarily have to have a member's property defined in the system. A user, for example, could have made a plurality of referrals to providers; as recorded in Provider Referrals Table 319, wherein the user creates Organizations Table 302 to be added to the system. The system may email (or otherwise send, such as by a short messaging service (SMS) text message) an activation request to identify the user as the referrer. A user also may be, or be affiliated with, a service provider. This relationship is captured by the association between User Table 303 and Organization Table 302. A particular user could be both affiliated with a service provider and be a normal user defining a Property. This association could also be constrained such that a user affiliated with a service provider may not be a normal user defining a Property. Finally, each User Table 303 could have captured for it a Revenue Log 320 which identifies the activity on the system attributed to the user's Property. Such activity may directly generate revenue for the system. For example charge may be imposed for requests for aggregated data from the system, the viewing of targeted ads, the viewing of general ads, the viewing and/or interaction with market surveys, and/or the viewing and/or interaction with any content provided to the system.

In some embodiments, the User Table 303 may contain a flag or other indicator which may be used to provide a signal that allows or requires the taking of the inventory and populating an Inventory Table 306 to record personal property located on a Property listed in Property Table 305. The requirement for an inventory may be linked to, or limited by, the presence of an indicator that the home owner has an insurance policy for an inventory covering destruction or damage of personal property. The system may provide for an automated inventory delivery to an insurance company upon a user's request. The system may, optionally, provide to the user an assessment of the insurance coverage the user currently has compared to the value of the items maintained in the Inventory Table 306.

According to some embodiments exemplified in FIG. 3, the details of a user's personal property are captured in Inventory Items record 307 and Inventory Table 306. Inventory Table 306 provides a list mechanism for a Property Table 305 to capture the set of personal properties associated with a Property. An Inventory Item record 307 is one item in the Inventory Table 306. Each Inventory Item 307 has associated with it a File List 314 which contains all Files 304 uploaded to an item or referenced by an item. In this context, at least, files could be images, video, audio, documents or any other electronic form of supplemental information about an item.

The User Table 303 may contain a flag or other indicator used to signal that periodic and or 'event-triggered' updates to the Inventory Table 306 and Files 304 are required. "Event-triggered" updates, as understood herein, include, but are not limited to, updates after capital improvements, natural disasters, damage done to personal property, or purchase of assets in excess of a threshold amount, for example, $1000.00.

According to some embodiments, a user may conduct and/or define any number of home projects or maintenance activities. In FIG. 3, Project Table 310 captures the information associated with a home project or maintenance activity and is associated with a particular Property in Property Table 305. A particular project in Project Table 310 may also be conducted on one or more rooms or other areas on the property and this relationship is captured in the association of Project Table 310 with Project Area Table 309 and the association between Project Area Table 309 and Property Area Table 308. Project Area Table 309 provides a list mechanism to Project Table 310 for defining the set of Property Areas affected by a particular home project or maintenance activity. Finally, Project Table 310 may also have any number of files uploaded to or referenced by the Project and these files may be organized in any number of Folders 313 as defined in the relationship between Project Table 310 and Folder List 312. In turn, Folder List 312 provides for a set of Folders 313. Folders 313 contain a File List 314 which in turn contains all the associated Files 304. A particular Project may be performed by zero or more service providers and Provider List 319 provides a list of organizations in Organizations Table 302 that performed or are performing the Project.

In some embodiments there may be a plurality of service providers as members in the system. In some embodiments according to FIG. 3, service providers are represented by Organization Table 302. Each Organization Table 302 will have one or more administrative users and any number of affiliated users as defined by the administrative user in User Table 303. An Organization Rating Table 300 may also be provided to store ratings (in one example, ratings by users) of services delivered by organizations An Organization Rating in Table 300 is provided by a User and could be associated with a Project in Table 310. A User affiliated with an Organization should not be allowed to provide ratings related to that Organization. Finally, an Organization in Table 302 may receive one or more Project leads as submitted by a User based on the Project types in which the Organization has expressed interest. These leads will be captured in Provider Project Table 311, providing a list of all leads received by the Organization.

Figure 5B:
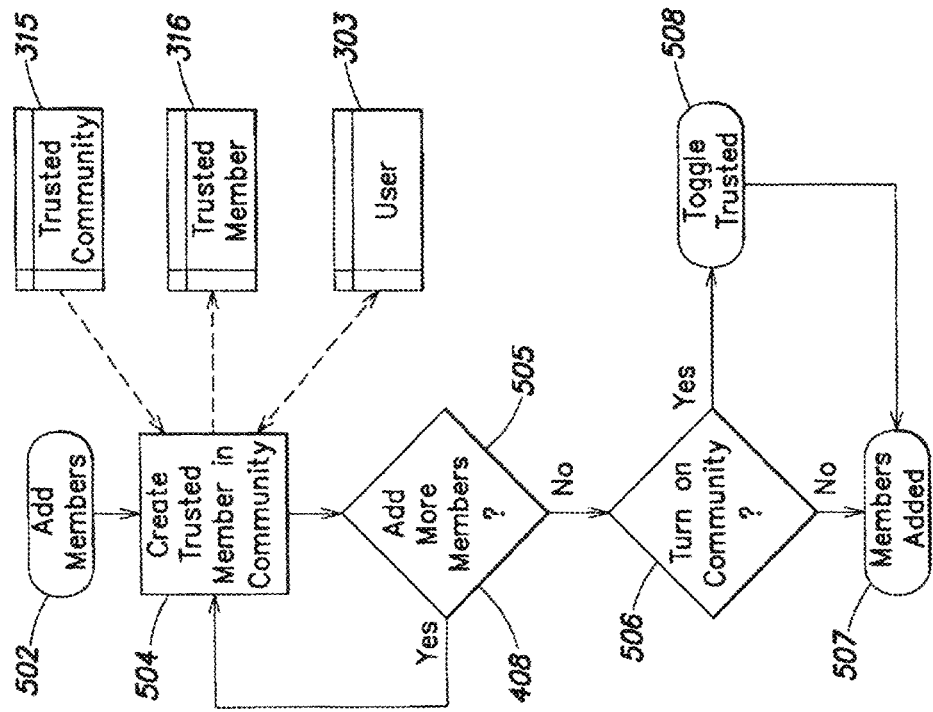
FIGS. 5A-E are flowcharts defining an example of the processing for setup and management of a trusted community of users for a particular user.
Figure 5A:
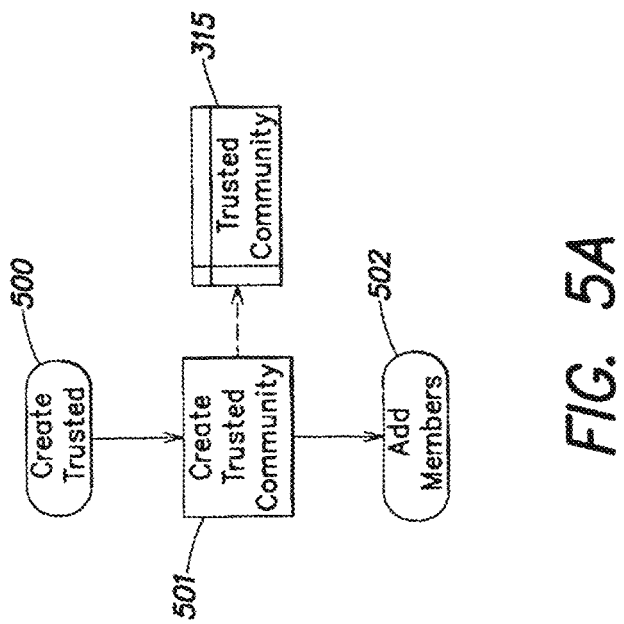
Figure 10A:
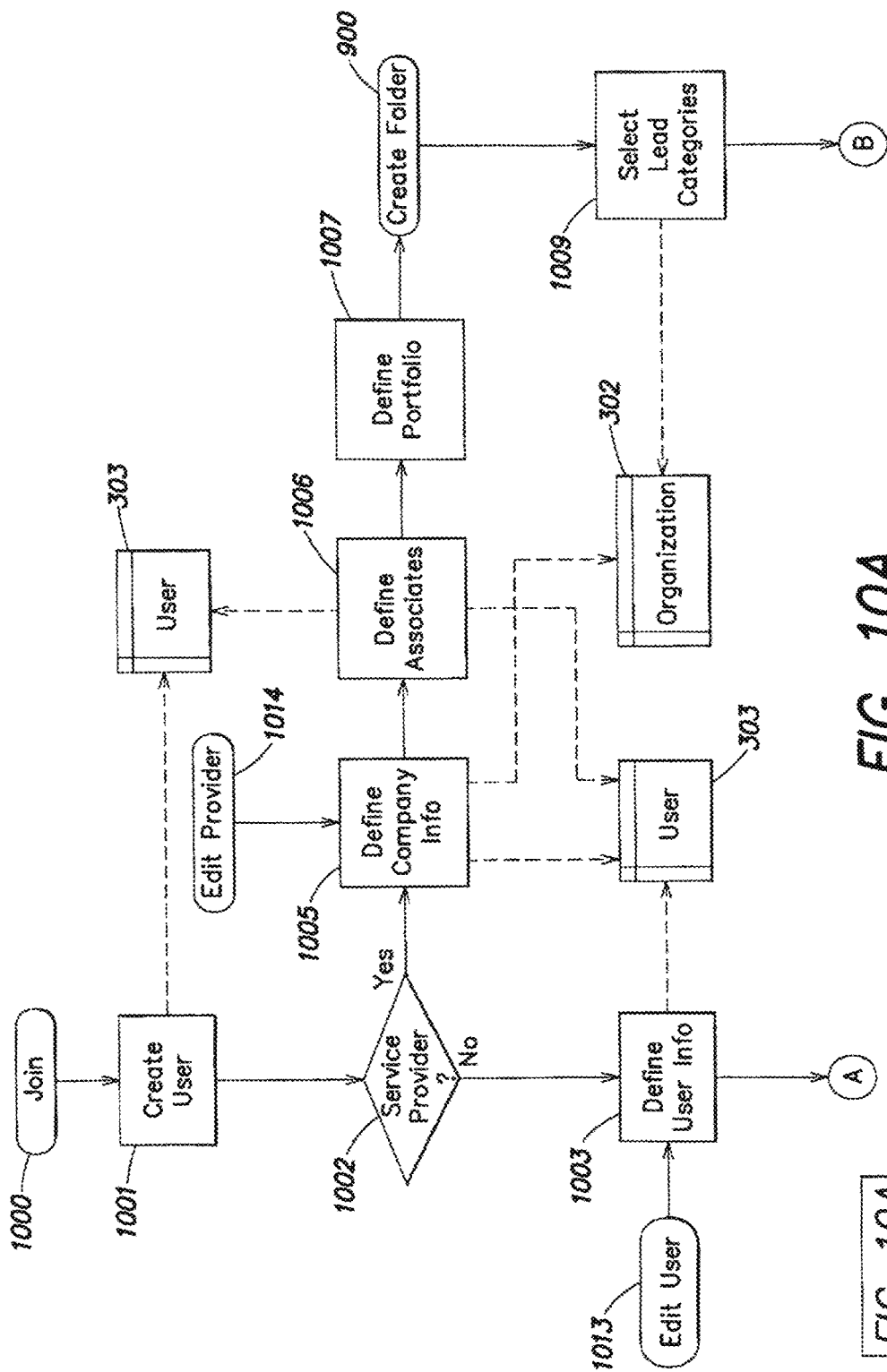
FIGS. 10A-B are flowcharts defining an example of processing for users becoming a recognized member of the system.
Figure 10B:
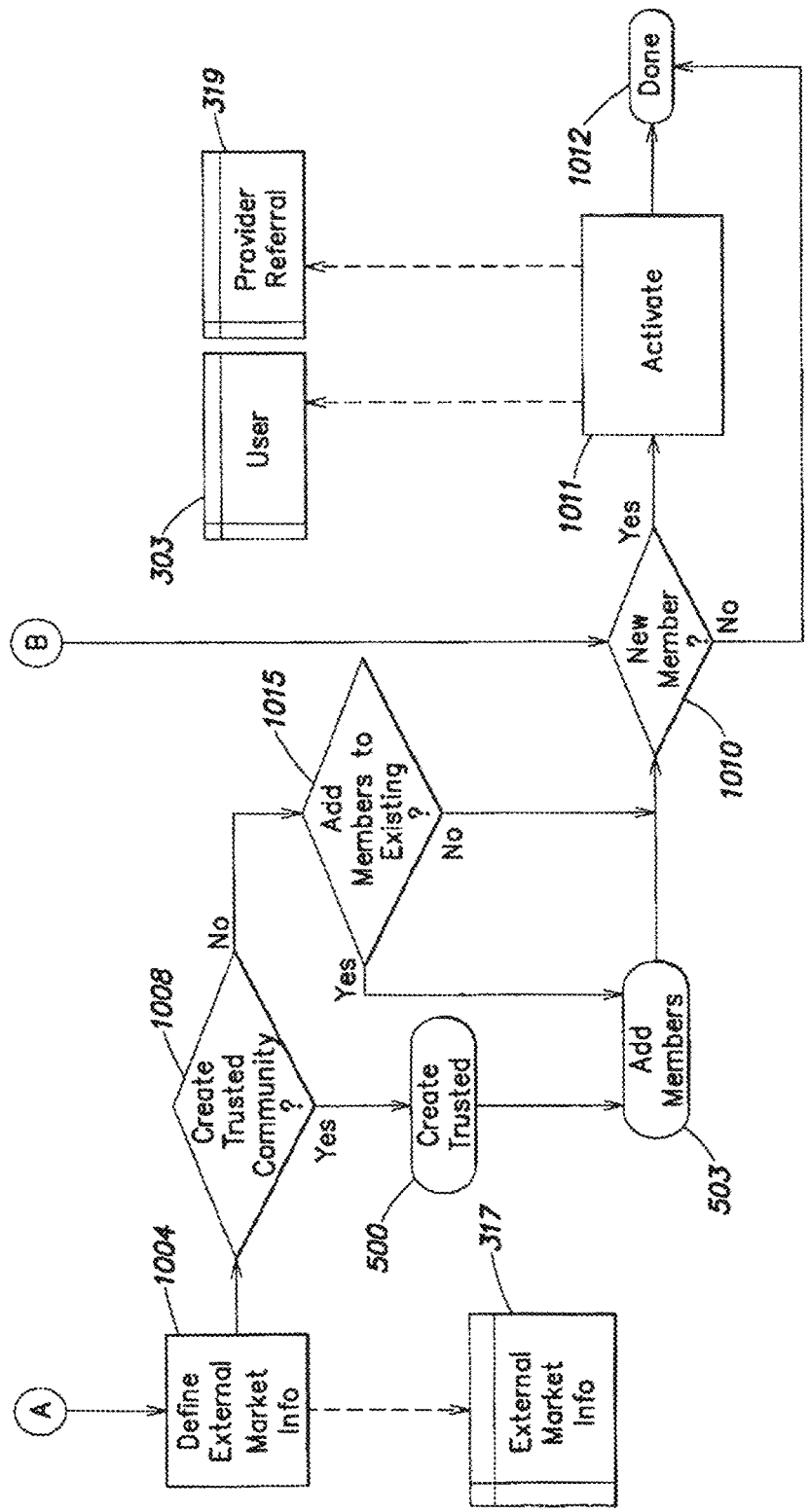

One aspect of the present invention is the ability for a property owner, manager or renter, herein referred to as "user", to describe one or more properties to be published on a public online forum, for example, at a site on the worldwide web. Prior to publication, a person or entity preferably is required to join the system using a process such as the process defined in FIGS. 10A-10B. When a user executes step 1001 to "Join", the system creates an entry in User Table 303, or creates a new User Table. If the user is not a service provider, as checked in step 1002, the user is given an opportunity to define his information in step 1003, storing the information in User Table 303. Next, in step 1004, the user, optionally, defines account information for integration with various third-party marketplaces, and the information is stored in External Market Info Table 317. If, in step 1008, the user, optionally, decides to create a trusted community, the processing is continued through step 500 in FIG. 5A to create the community and the processing continues through step 503 in FIG. 5B to add members to the community. Editing user and provider information is provided through steps 1013 and 1014. Step 1015 enables a user to add members to an existing community and step 1010 checks to only initiate the activation process in step 1011 if the user is new. Once complete and activated, the user may begin defining his property or properties.

Other aspects of the invention include a method, computer system and computer-implemented procedure and data structures providing the ability for a user to define a trusted community of people who are to be informed once the user publishes a property and who may subsequently view all or limited details of the property. The level of viewing privileges is set by the property owner using property ownership locking mechanism. On publishing a property, all participants in the public forum, trusted or not, can view the property, but only on the basis defined by the owner of the property, e.g., the owner may limit the information seen by various categories of users using a property ownership locking mechanism.

Figure 5D:
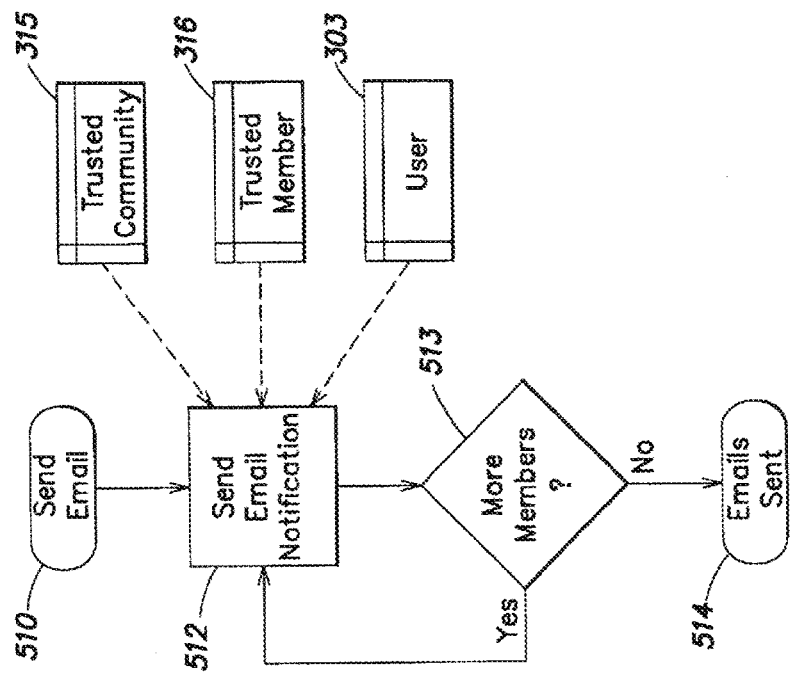
Figure 5C:
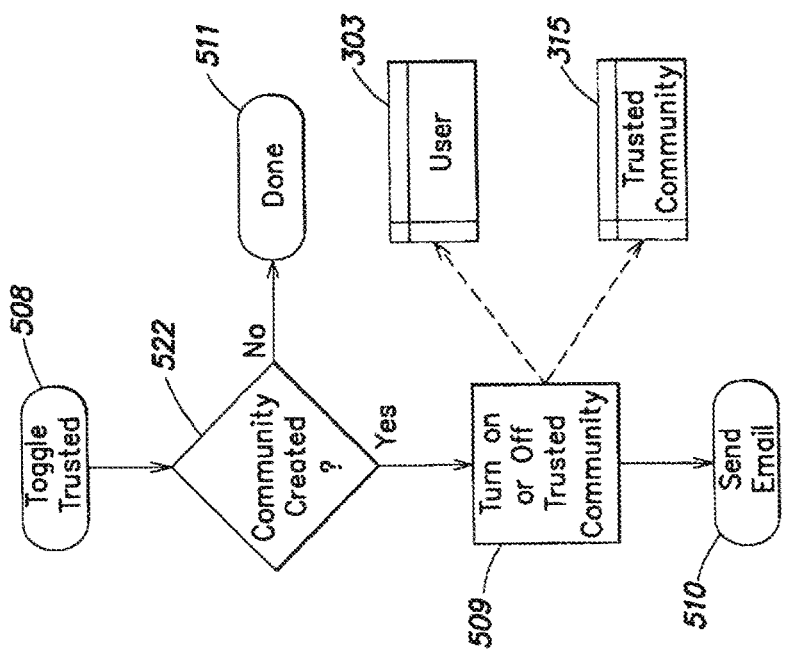
Figure 5E:
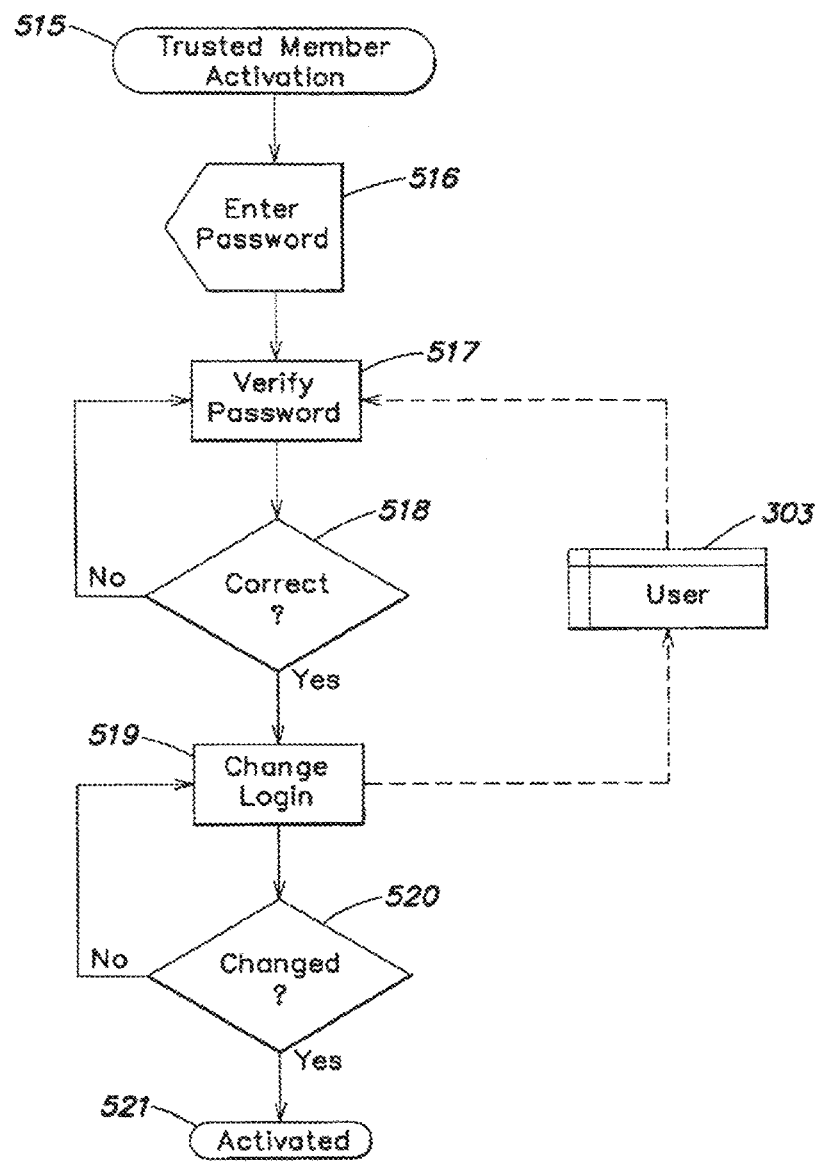

According to some embodiments for practicing aspects of the invention, the system may provide a network-based bulletin board system to exchange information on, for example, property maintenance, improvements, and/or service providers. Such a bulletin board also provides a forum for property owners to ask home improvement questions from service providers. As defined in the "join" process exemplified above, a user may define one or more Trusted Communities in Table 315. One example of the process to create and add members to Trusted Communities Table 315 is defined in FIG. 5A and FIG. 5B. The Trusted Community creation process starts at entry point 500. A Trusted Community data record is created in step 501, and a member is added in process 502. Process 502, in turn, is shown in greater detail in FIG. 5B, wherein members are added with iteration between steps 504 and 505 until all desired members are added. A user must exist in User Table 303, or be created, to generate a corresponding entry in Trusted Member Table 316. Once all the members have been added, step 506 checks to see if the Trusted Community entry in Table 315 should be turned on, then processing flows through step 508 on FIG. 5C to enable the Trusted Community. Step 522 first checks that the desired Trusted Community is created in the case where enabling is invoked outside of the create case. if the community is created, step 509 either enables or disables the community and then processing passes through step 510 in FIG. 5D to send notification of community status change to all community members. In steps 512 and 513 all the Trusted Members in the Trusted Community are iterated and an email (or other form of electronic message—such alternatives hereafter subsumed into and understood to be intended within the term "email") is sent to each member using their account data from Table 303 informing them of on or off status, dependent on how the status was changed. Finally in FIG. 5E the process for activating a Trusted Member who is not already an activated User is defined. First, in step 516, the user is presented a pre-defined user name and he must enter their pre-defined password. This password could be the same as his pre-defined user name, the home address or the name of the person who added them as a trusted member, as defined in the notification email, or some other easily passed on password such that the new User can log in. in some embodiments, Trusted Member could be an affiliated user, e.g., property co-owner, family member, co-worker, bank and/or insurance company employee, etc.

Figure 4A:
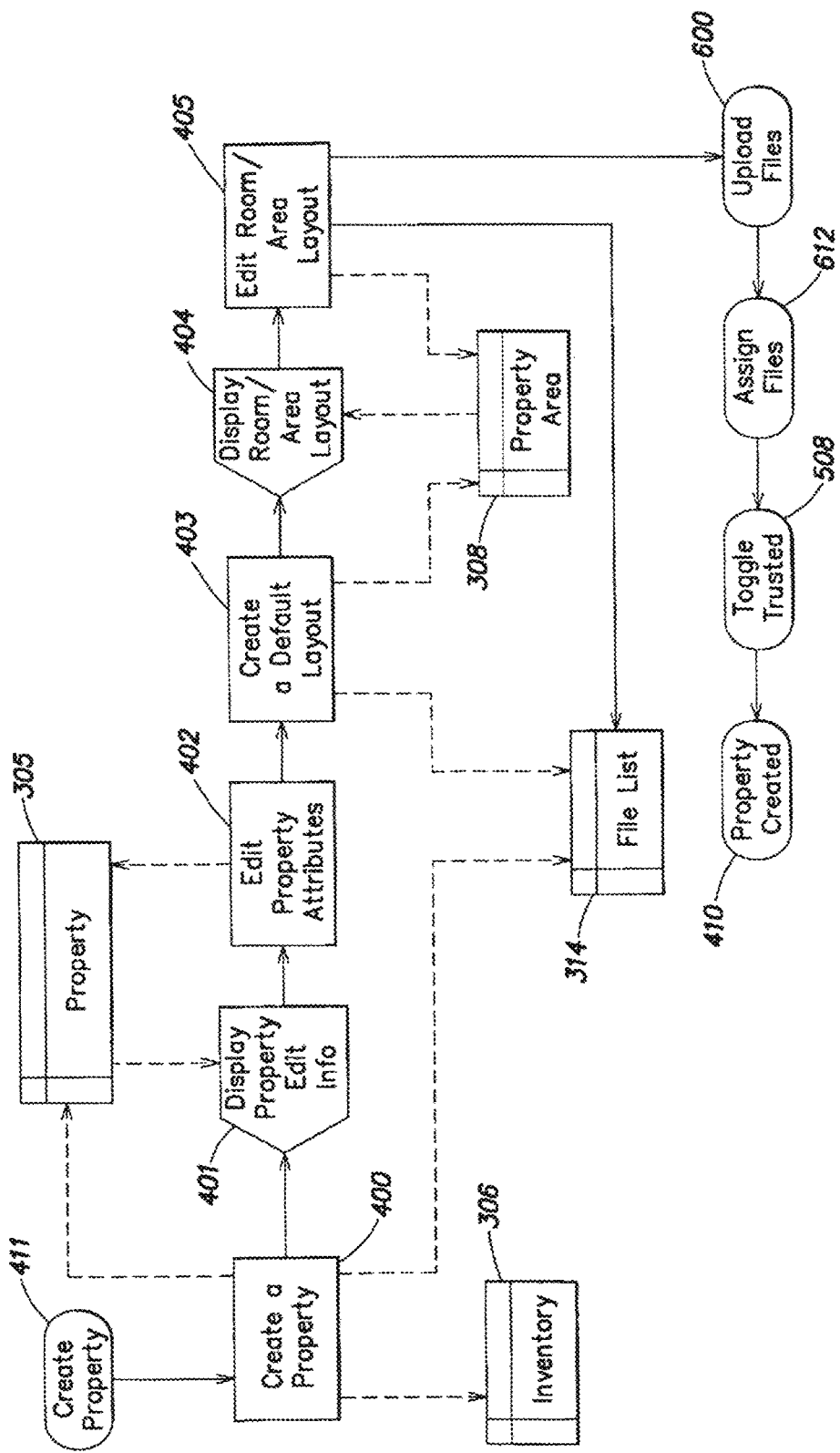
FIGS. 4A-B are flowcharts defining an example of processing for creation of a property in the example system and then viewing the property after it is created.

In some embodiments for practicing aspects of the invention, the property owner may register property on a system using User Controls 100, as illustrated in a non-limiting example of FIGS. 21A-D. An example of a process of creating a property in the system is defined in FIG. 4A. In step 400, the user creates a Property Table 305 along with a default empty Inventory Table 306, for example, through an interface illustrated in a non-limiting example of FIG. 21A. The Property Table 305 could have a type of property information, e.g., commercial or residential property, or the property could be land only. Each of these types of property may be further characterized. For example, a residential property could be described in a free-form text style or by selecting from a list such as single-family homes, town homes, condos, apartments, lofts, mobile homes, trailers and so forth, as illustrated in a non-limiting example of FIG. 21C. In step 401, the user is prompted to enter property information, also as illustrated in a non-limiting example of FIG. 21C. This information may include, for example, address, property features, emergency contact information, preferred payment methods, etc. The property owner may provide such information as building details, such as construction date, type of construction materials used, gross area, real estate tax, liens on the property, restrictive property covenants and easements appurtenant to the property, year-to date vacancy rate and whether or not pets and children are allowed for rental properties, as illustrated in a non-limiting example of FIG. 21D. This description could also include the systems in the home; such as, air conditioning, heating, electrical, plumbing, cable, telephone, network, and the like, also as illustrated in a non-limiting example of FIG. 21D. As part of the home description, the user could specify what information from this description should be made public about the home. The description can be provided as user-supplied text, as picks on a menu(s), or as some combination. The system may advantageously provide for password protection of the accounts.

Figure 27A:
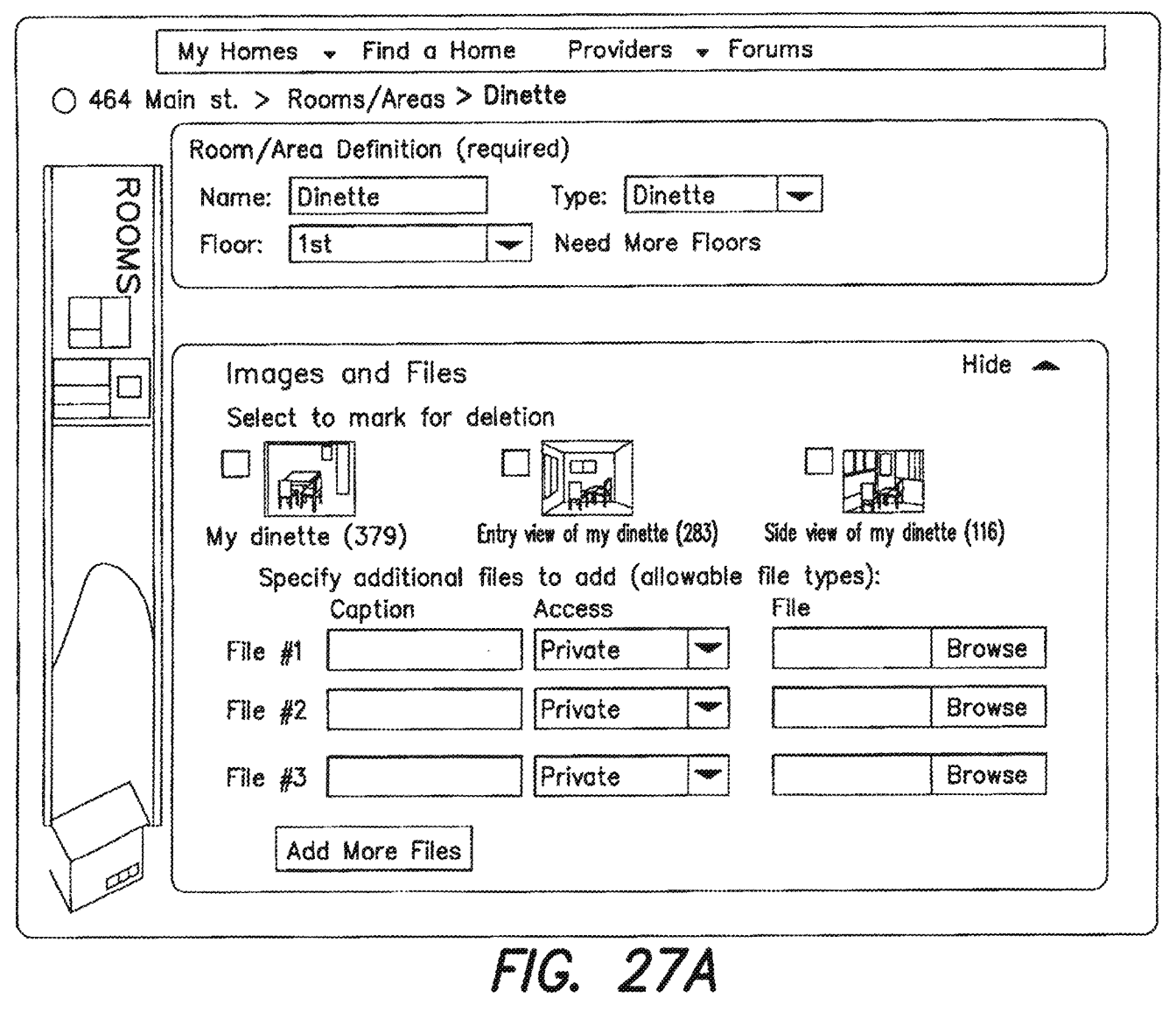

Next, in step 403 a default room/area layout is created, either based on the style of dwelling defined or on a single default layout, preferably then displayed to the user in step 404. The point of the pre-creation of the room/area layout is to simplify the initial creation of a Property Table 305. The user may edit the layout in step 405, deleting/adding rooms, areas and/or floors, while also renaming rooms and/or areas as they desire, as illustrated in a non-limiting example of FIGS. 26A-B and 27A-C. Next the processing advances to step 600 on FIG. 6A for uploading computer files to associate with a Property listed in Property Table 305 and/or Property Areas Table 308, as illustrated in a non-limiting example of FIGS. 21B and 27A. After all desired computer files are uploaded, the user now is requested to assign the uploaded computer files through step 612 of FIG. 6B to the appropriate Property Areas Table 308 or leave associated with the Property Table 305. Once computer file assignment is complete, the Property Table 305 is created and through step 508 the trusted community defined by the user is informed of the property creation.

Figure 4B:
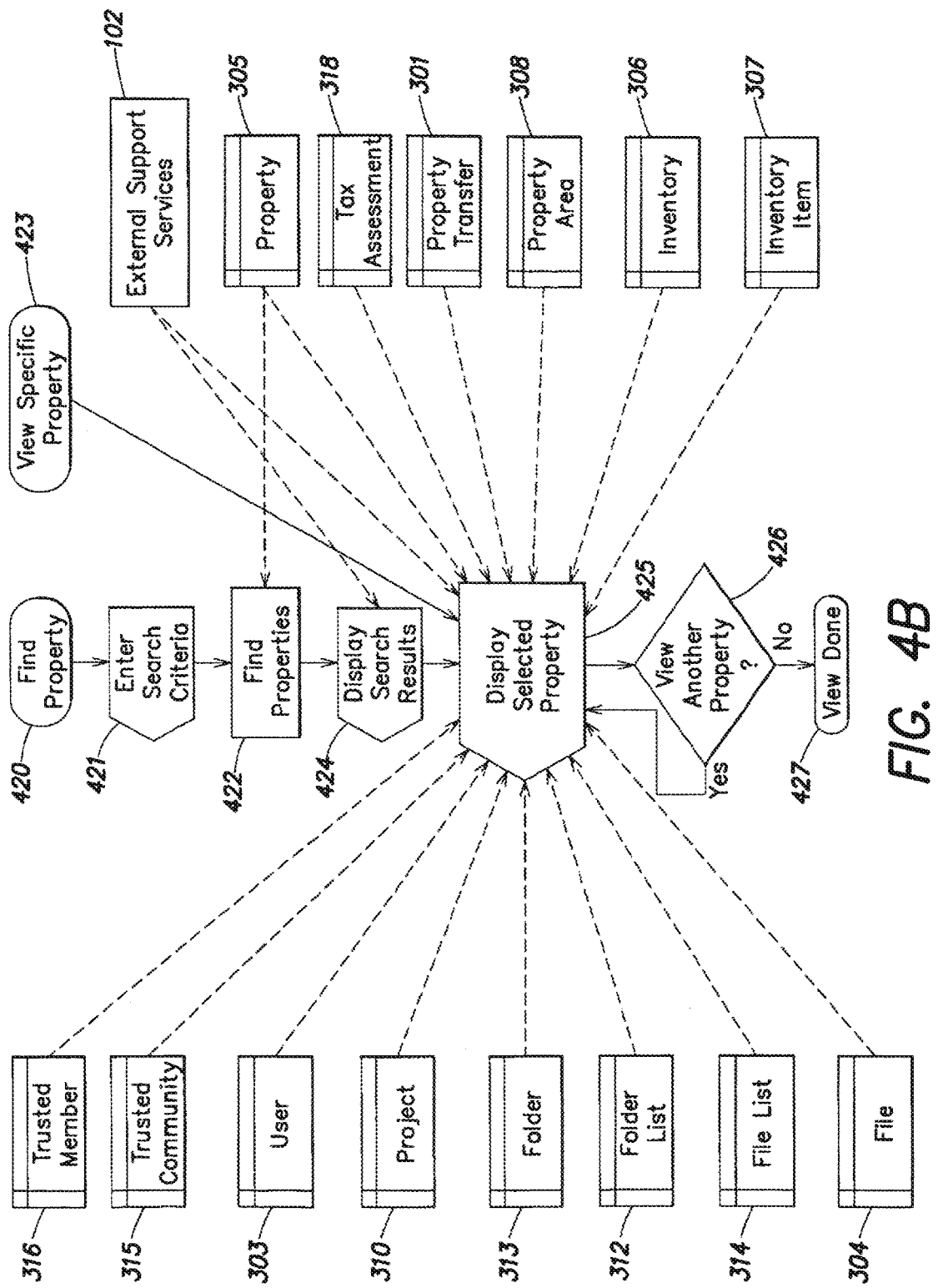
Figure 16:
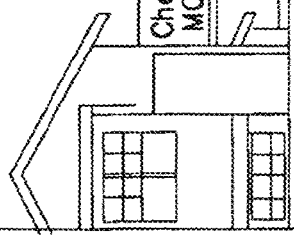
FIG. 16 is an illustration of one example of an initial user system interface through a World Wide Web homepage.
Figure 17A:
Figure 17C:
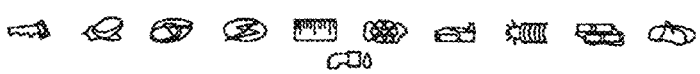
Figure 18:
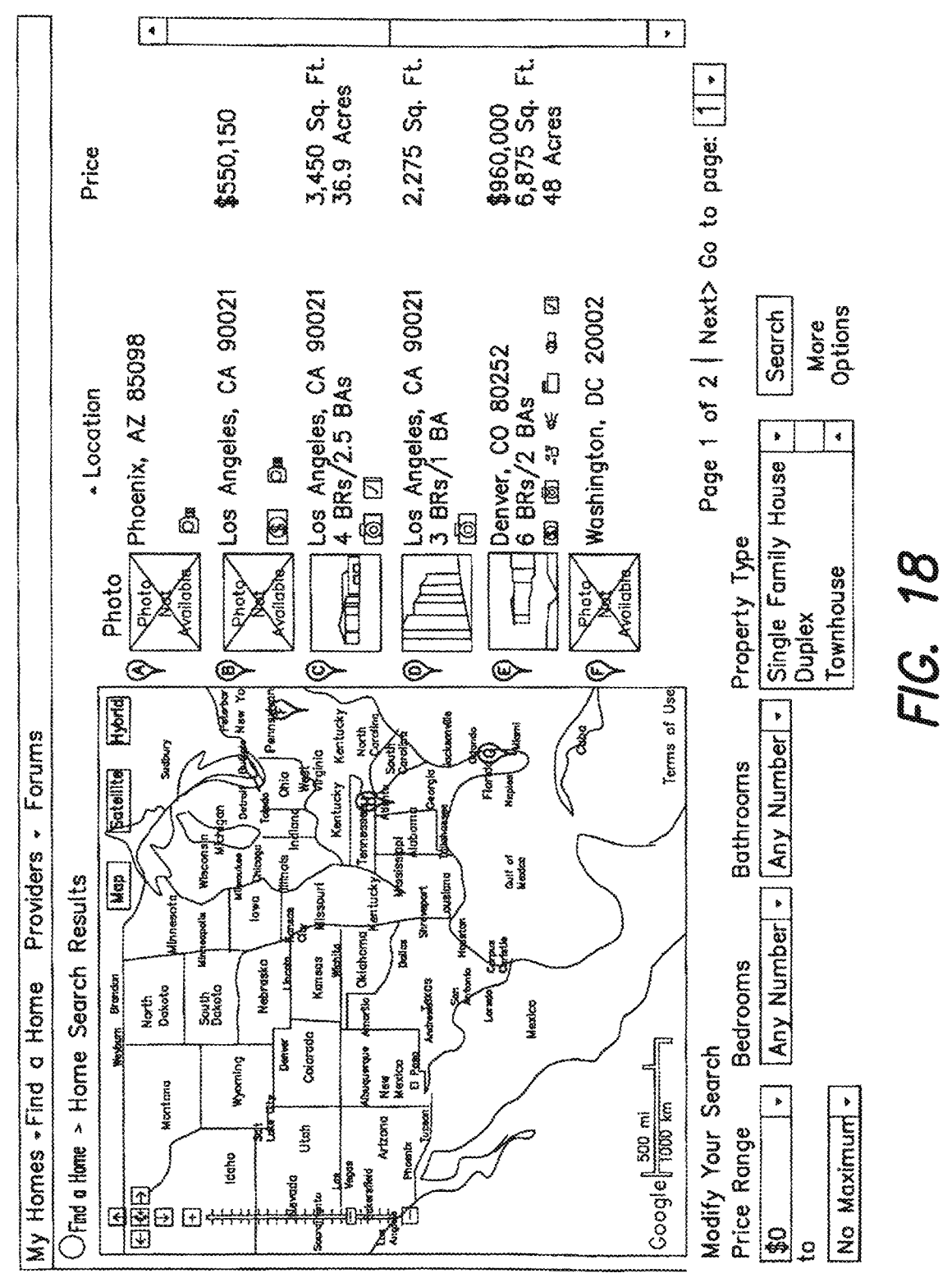

As illustrated in FIG. 4B, one aspect of the invention is the process by which properties are found and viewed. A user initially contacts the system using a system interface, for example, a homepage on a world wide web, as illustrated in a non-limiting example of FIG. 16. A user, either a member or non-member, may search properties in the Database Table 208 and could do so by specifying some search criteria in step 421, for example, street, city, state, zip, or some combination of same. One non-limiting example of the initial search interface is illustrated in FIG. 17A. The user may also refine the search by using search attributes of a Property listed in Table 305, for example but not limited to, one or a combination of home style, property feature, lot size, home size, home price, home tax assessment, physical community the property is located in, and/or any other key specifying attributes of a Property listed in Table 305, as illustrated in non-limiting examples of FIGS. 17A-C. In one non-limiting example illustrated in FIG. 17C, a user may search and/or refine his search using types of projects, such as, for example, repairs or improvements, executed on the real property. Once the criterion is entered, step 422 executes a search of Property Table 305 (using any appropriate search tool) and creates a list of properties and displays that list in step 424. Step 424 may also pull from External Support Services Table 102 additional content to display with the results, for example but not limited to, a geographical map with some or all results pinpointed on the map, gross potential and/or market potential of the property, as illustrated in a non-limiting example of FIG. 18. By way of non-limiting example, gross potential of the property may be determined based upon average sales price or average rental rate for the geographic area times the overall area of the real estate unit. Market potential may be based upon market studies based upon the type of property. In step 425, a selected Property from Property Table 305 is displayed, pulling from all relevant data sources. Since homes are a matter of public record, by default a basic description of the home could be provided for general public consumption which shows only basic information about the home, but does not display private files or details of rooms and/or other areas. This basic information could include the city, state and zip code of the property, the property features, the rooms and other areas of the home but no ability to see the particulars of the various rooms and other areas nor any information which specifically ties the property to a specific address. For the User in Table 303 all the details of the Property from Table 305 and the associated data containers are visible and editable. For the user's Trusted Communities Table 315 only the details which are generally public or marked as viewable by the community are visible to the Trusted Member 316, but no data is editable by anyone or anything other than the owning User in Table 303.

Figure 20A:

Another aspect of the invention is the data structures and computer-implemented procedures providing the ability to upload images, videos, sounds or documents, herein referred to as "files", to associate with the property, with a room in the home, with an area of the property, with an inventory item or with a home project, as illustrated in a non-limiting example of FIGS. 20A-D. In one embodiment, the user may email files to a data store, e.g., a Property Table, for attachment to an existing entity, including but not limited to real property, personal property, a room in a home, an area of the property, an inventory item or a home project. A related aspect is computer-implemented procedures enabling the user to create a presentation of the home from the associated files. In one aspect of the invention, computer files can be uploaded to or referenced with a Property Table 305, with a room in the property, with an area of the property, with an inventory item or with a home project, as illustrated in FIGS. 20A and D. The files may include, but are not limited to, video footage and/or photo documentary of the property. In one example, the videos include interior, exterior and ground views of the real estate unit, as illustrated in a non-limiting example of FIG. 20B. The videos may, optionally, include videos of the surrounding properties and the general overview of the area.

Figure 6A:
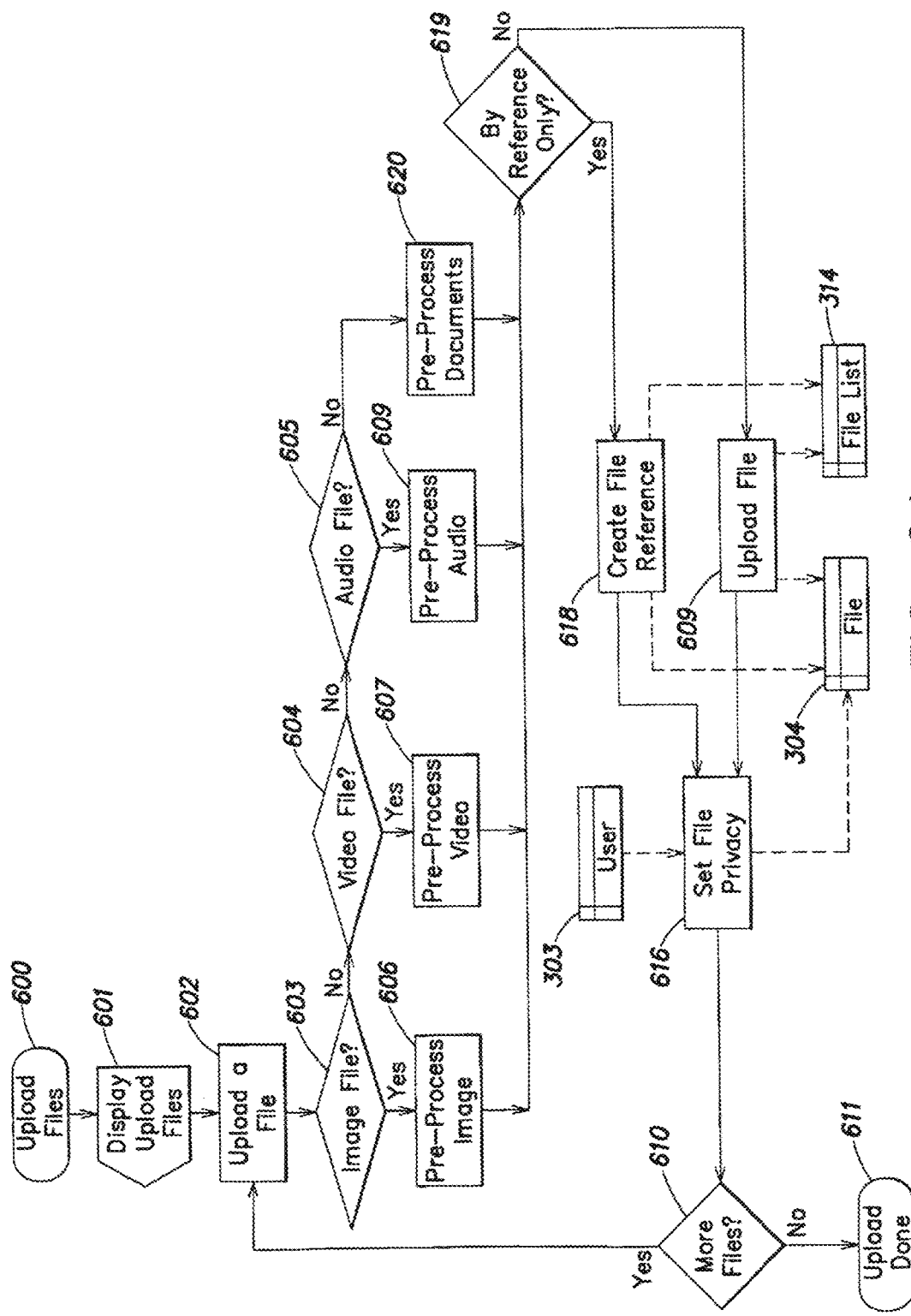
FIGS. 6A-B are flowcharts defining an example of the processing for the upload of files pertaining to a particular property and assignment of the uploaded files to various rooms and other areas of the property.

An unlimited number of computer files could be stored or limits could be placed to allow only a certain number of computer files and/or a limited amount of absolute storage provided to each type of computer file or collectively across all computer file types. FIG. 6A defines one example of the process by which this occurs. In step 601, the user is presented an upload-files display which enables the user to manually enter a path to a computer file or browse their onboard computer storage for a computer file while also providing a binary decision to only reference the computer file from an external system and not upload the computer file directly to this system. The computer files themselves could be uploaded one-by-one or through a group selection. In one embodiment, the user may email files to a data store, directly or indirectly, e.g., to a Property Table, for attachment to or association with an existing entity, including but not limited to real property, personal property, a room in a home, an area of the property, an inventory item or a home project The user defines one or more computer files to upload or reference and then through step 602 they upload or reference the selected computer files. These computer files could be images, videos, audio and/or documents, herein referred to as files. Steps 603, 604, and 605 provide the checks to lead the processing down file-type-specific processing. In step 606, an image is checked for the appropriate file extension; where, an image could be any format used for image storage and recall such as TIFF, JPEG, GIF, PNG, BMP and the like. In step 607, a video is checked for the appropriate file extension. A video could be in any format used for video storage and play, such as QT, MPEG, AVI, WMF, and the like. In step 609, an audio file is checked for the appropriate file extension. An audio file could be in any format used for audio storage and play, such as WAV, MP3, AAC, WMA, DRM, and the like. In step 620, a document file is checked for the appropriate file extension. A document could be in any format used for document storage and recall, such as DOC, PDF, RTF, TXT, XLS, MPP, ZIP, PPT, XML, HTML and the like. In step 619, the by-reference check is made and if the file is not to be uploaded, then step 618 is executed to create a File 304 which is a reference only in the File List 314; no upload occurs. But, if the upload is to occur, then step 609 executes to pull the file from the target source, store the file on the system and create the appropriate File 304 and File List 314 references. Once a File 304 is created, either by reference or upload, step 616 sets the privacy attribute on the File 304 to a default based on a User 303 preference, but the user may change the privacy state at any time after upload. Each file may be deemed as private (only the user), semi-private (only the user and his/her trusted communities) or public (everyone), but this design does not intend to limit the design to just these three privacy states but rather provides this merely as an example for the preferred embodiment. As defined in step 610, processing continues until all identified files are uploaded or referenced. Files may be uploaded or referenced directly to a property, room, other area, project, or inventory item, as illustrated in FIGS. 20A-D. One or more property and home photos may also be uploaded or referenced directly on the property and then distributed to the various rooms and other areas.

Figure 6B:
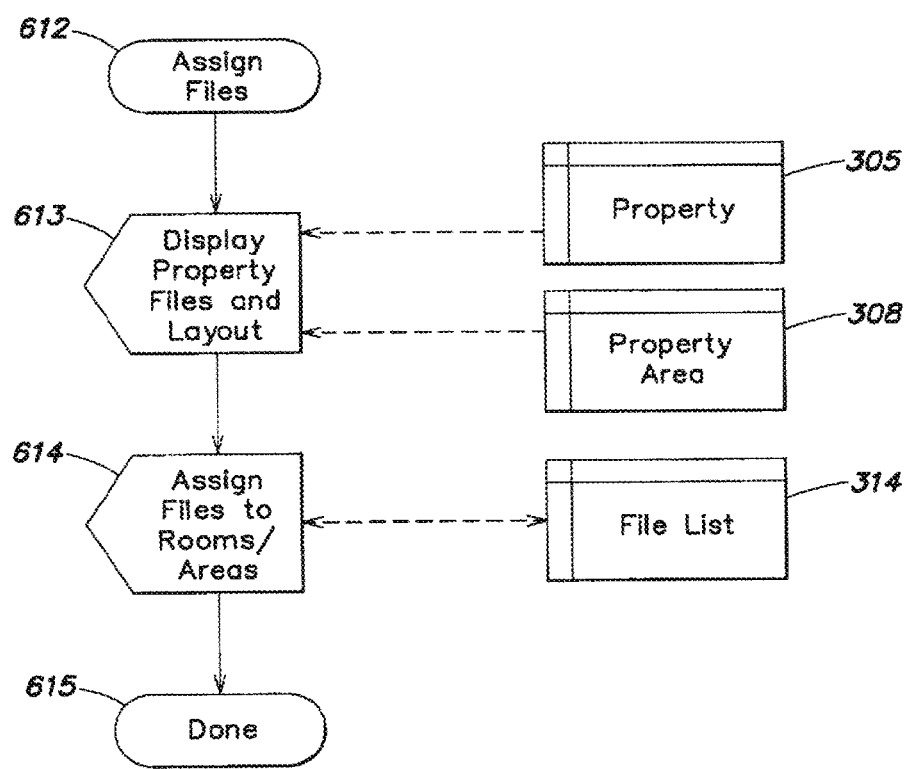
Figure 6C:
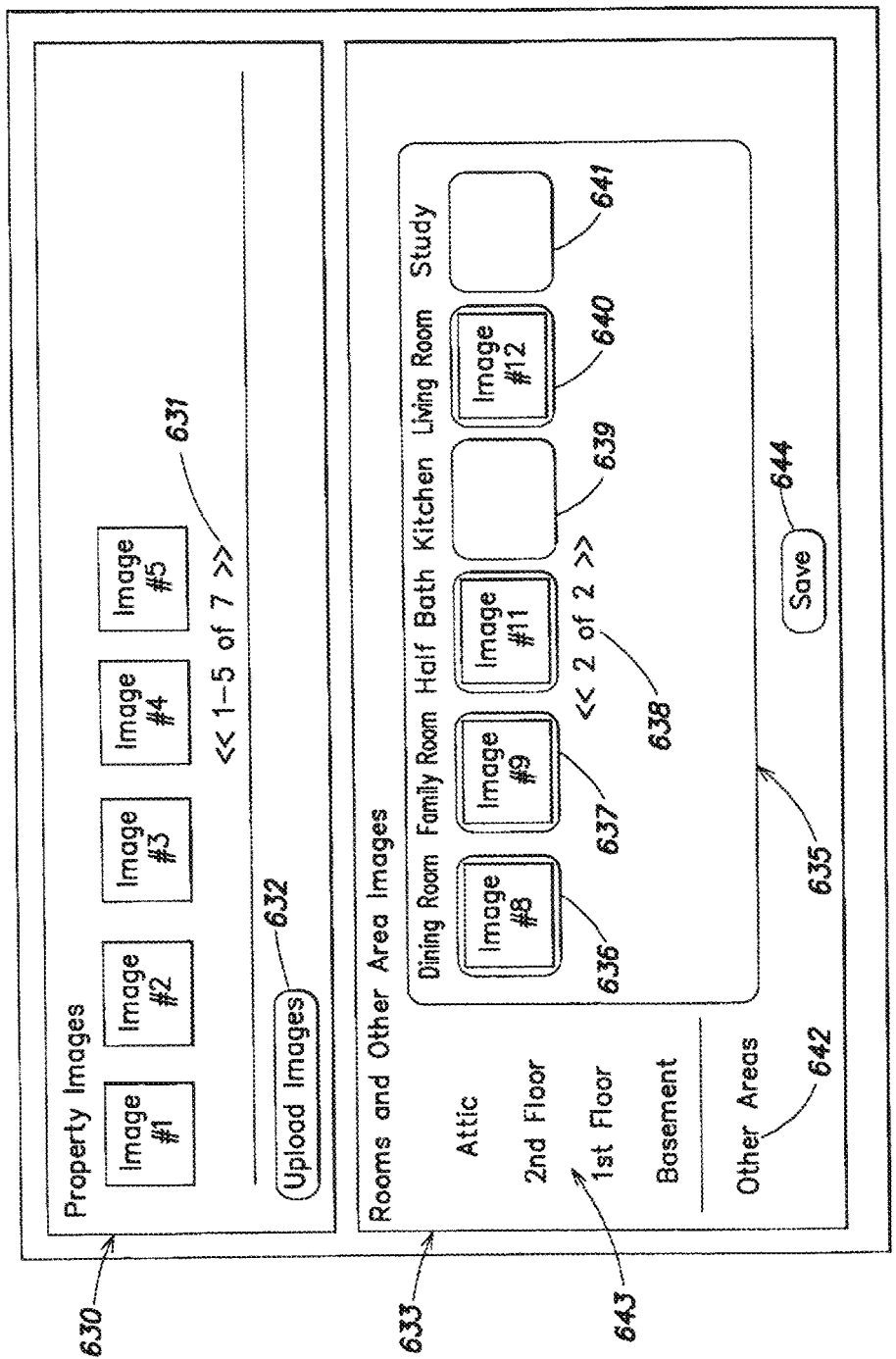
FIG. 6C is a schematic illustration of a user interface design screen providing an example for use in assigning uploaded files to various rooms and other areas of a property.
Figure 20B:
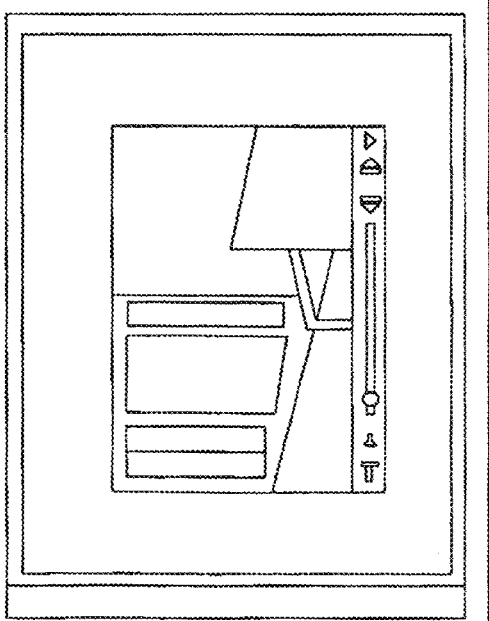
Figure 20C:
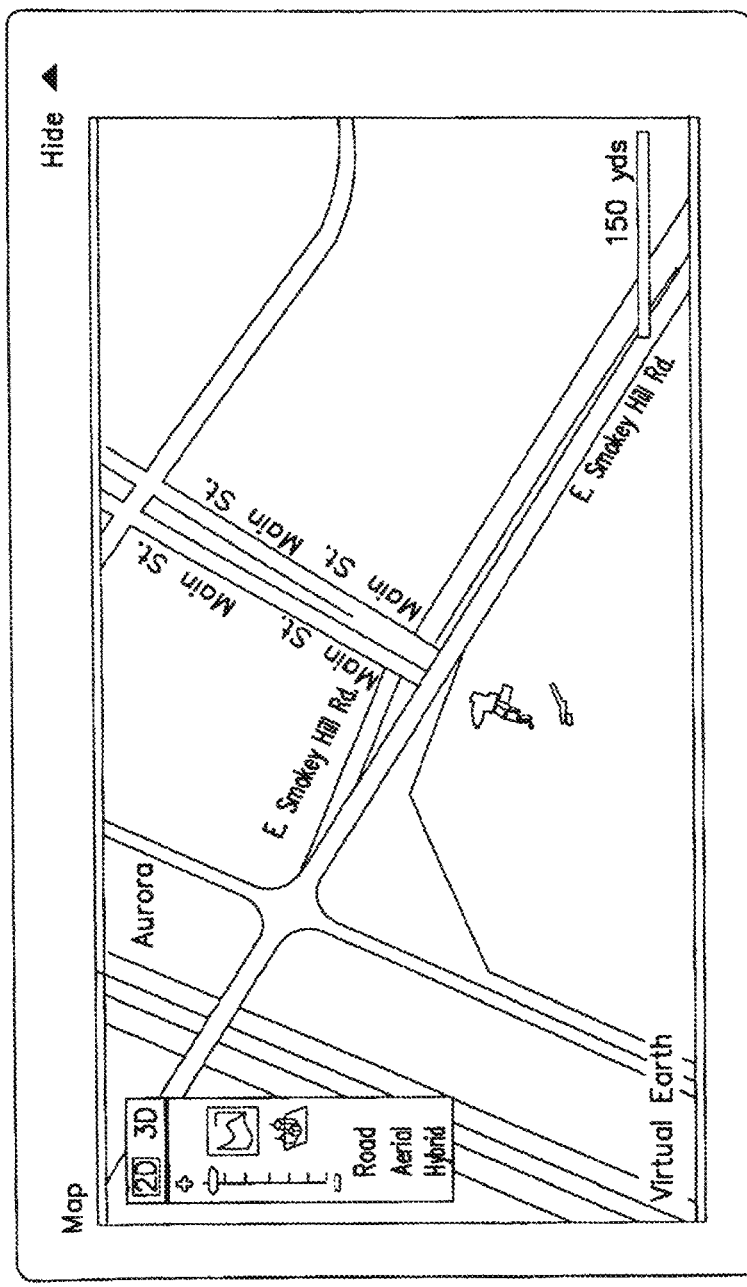
Figure 20D:
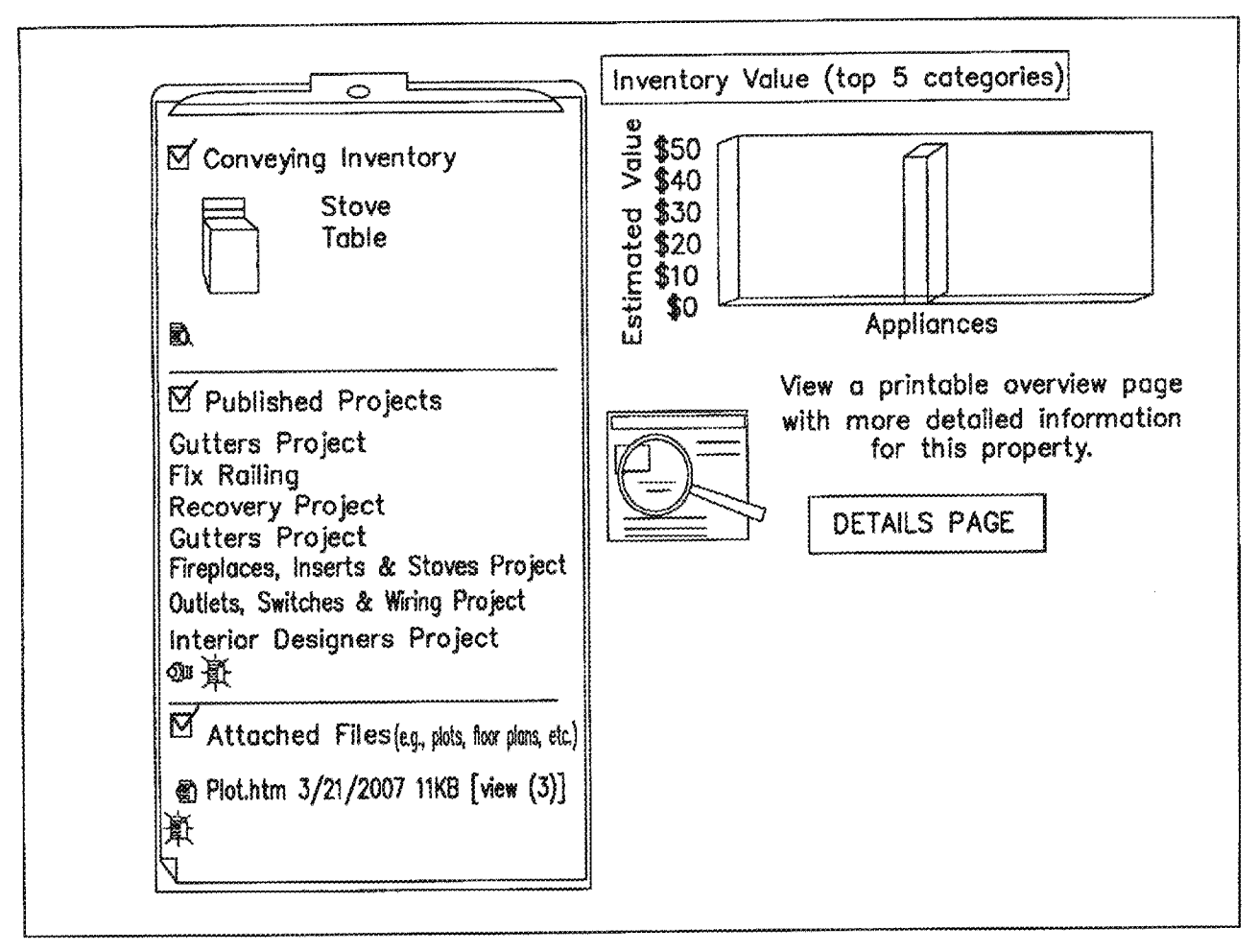

Some embodiments, for example, as illustrated in FIG. 6B, provide a process for assigning property photos to the property itself, as illustrated in FIG. 20B, or the associated rooms or other areas, as illustrated in FIG. 20A. In step 613, the user views all the images uploaded to Property Table 305 and Property Areas Table 308 through their associated File List 314. In step 614, the user then selects an image from the File List 314 and assigns it to another File List 314 which is to say moves it from either the Property Table's 305 File List 314 or the Property Area Table's 308 File List 314. The user does this until he/she is done and then the changes are saved in step 615. There are many ways to implement the user interface for this file assignment, but one exemplary embodiment is defined in FIG. 6C. In this diagram there is a section for the property images 630 at the top with the list of images currently assigned to a property. If the list of images is too long to view in one screen there is a scrolling function 631 to support navigation to all images in the list. To add more images there is a control 632 to initiate the upload process. Below the property images 630 there is a section 633 for the rooms 643 and other areas images 642. This section is divided up into the various floors of the home with the active home being uniquely identified so as to stand out. The rooms 636-641 in a particular floor are listed in the section 635 which is attached to the floor. The layout of the rooms 636-641 is only an example and not meant to be the exhaustive definition. Each room or other area has zero or more images assigned to it. When a room or other area has multiple images 638, a navigation control is provided to be able to view all images in the room or other area. The moving of images to the property, the rooms or the other areas could be done many ways. For example, the user could click an image to make it active and then click a room or other area which would then assign the image to that room or other area; or, on selection of an image a menu becomes available, either drop-down or popup, to pick the room to which the image is to be assigned; or, the user could grab an image and drag it to the appropriate room or other area and let go to assign it. When the user is done the user can save 644 user's assignments.

Once the files are uploaded or referenced, one embodiment enables the user to create a presentation of the home. This presentation could be constructed from one or more of the files associated with the property, the areas, the projects and/or the inventory items. The presentation could be on the property, one or more rooms in the home, one or more other areas of the property, one or more inventory items, and/or one or more home projects, or any combination of same, really whatever the user would like to present. The user could create either a limited or unlimited number of presentations and associate a particular presentation with the property, with a room in the home, with an area of the property, with the inventory, with an item in the inventory or with a particular project in the home. In one specific example, the presentation may be a virtual tour of the property exemplified by sequential presentation of files. A virtual tour may be made available for viewing by members of the Trusted Community. A virtual tour may or may not be active until the property is placed "on sale" or "for "rent." Subsequent to placing property "on sale" or "for "rent," a virtual tour may be conducted by a prospective buyer, prospective renter or a real estate agent from a remote terminal operatively connected to the internet and/or other private or public network, after a prospective buyer, renter or a real estate agent selects a number of properties on the system for a comparative review. Optionally, the virtual tour feature may allow the user to select between 'furnished' video option, where the original files are of the furnished property, and 'unfurnished' option, where any furniture present in the files is digitally removed from files.

Optionally, the virtual tour feature may allow the user to select a "my furniture" option or the like that allows the user to place digital emulations of the user's furniture into an unfurnished version of the virtual tour. The system may allow the user to print out the floor plan of the Property 305 with the 'my furniture' selections marked up to the plan, or directly communicate the plan to the moving company to facilitate desired placing of furniture during the move.

Figure 7A:
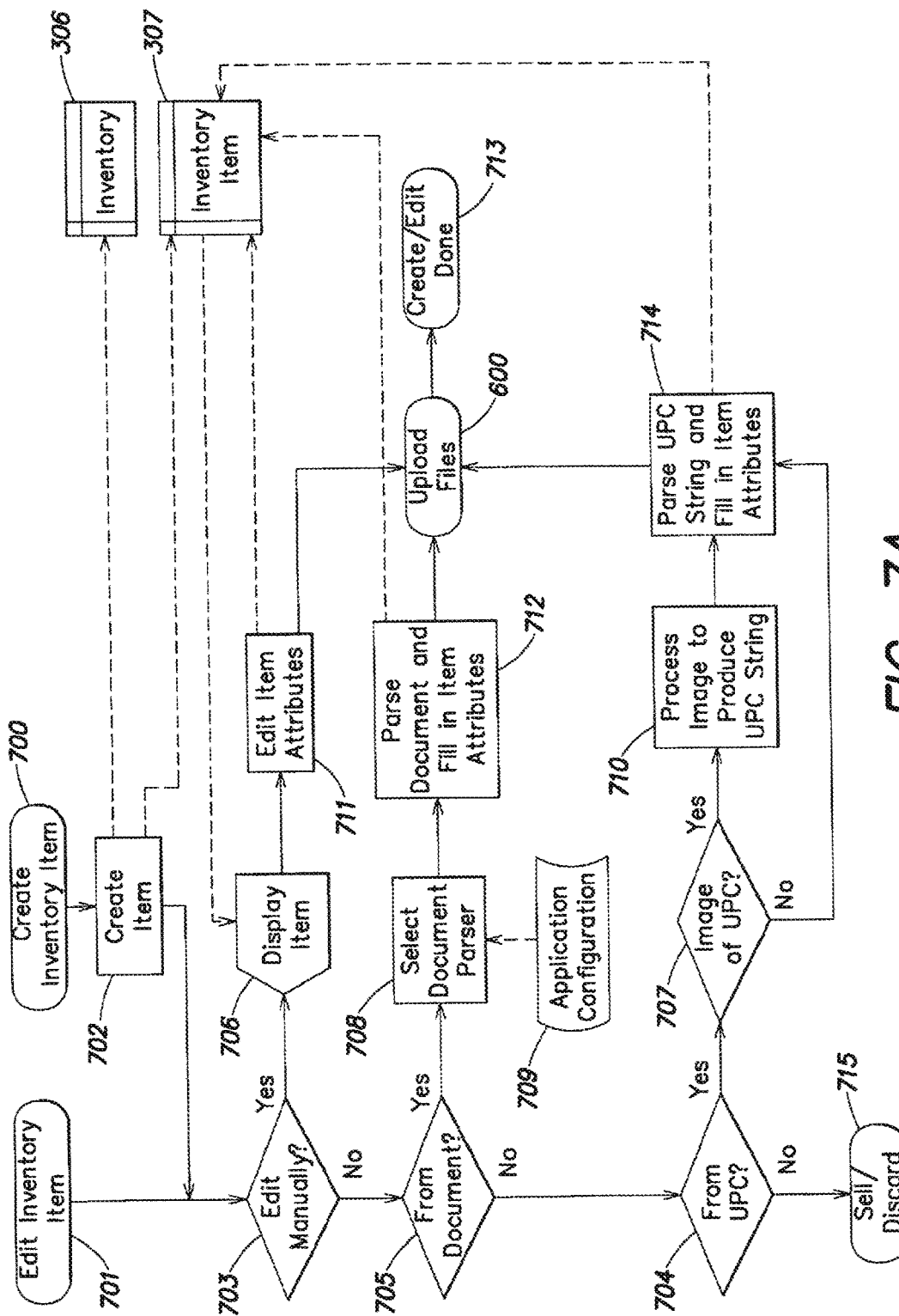
FIGS. 7A-D are flowcharts defining an example of processing for creation, editing, buying, selling and discarding of inventory items.
Figure 24:
FIG. 24 is an illustration of one example of inventory table interface.
Figure 25A:
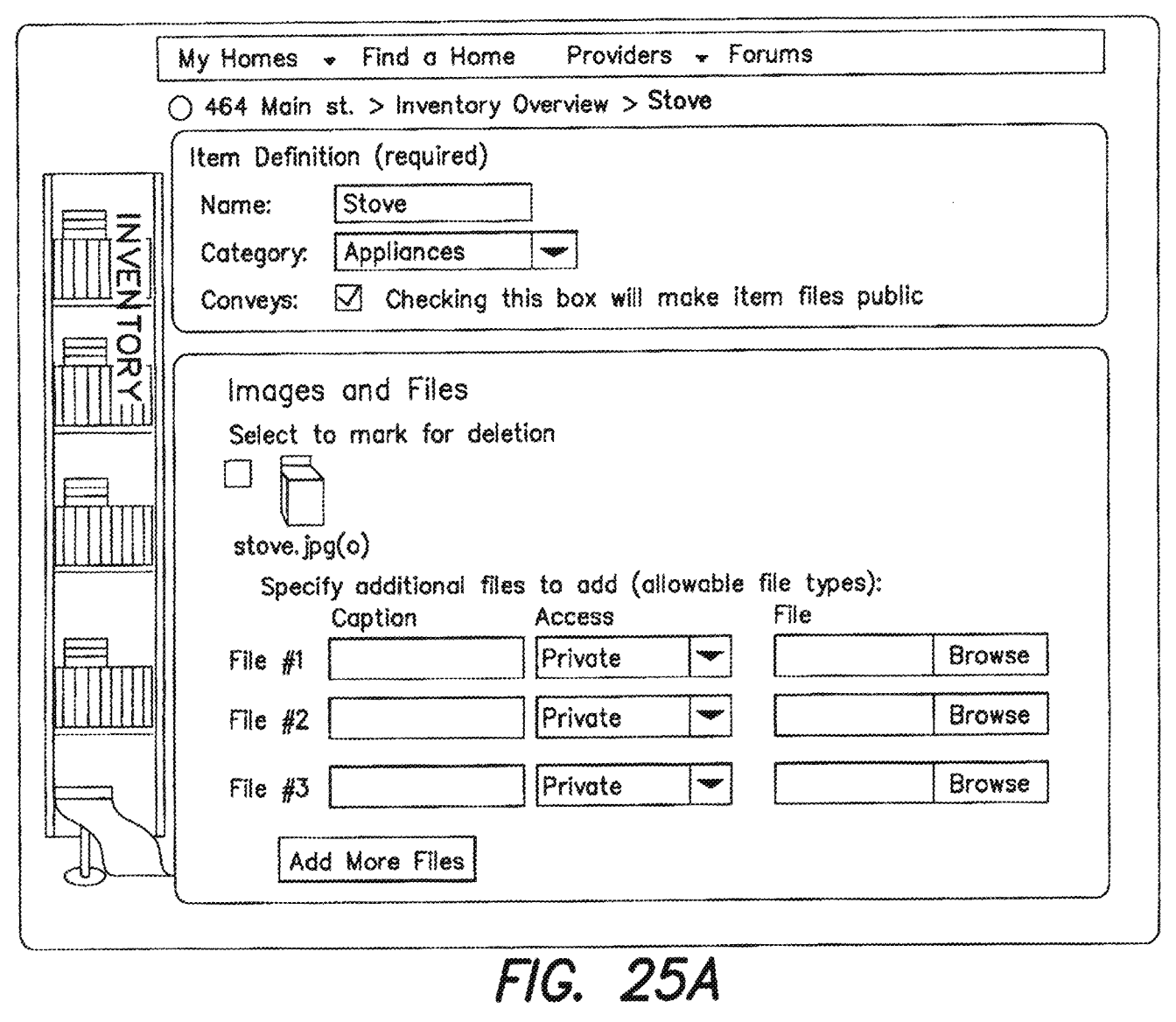
Figure 25B:
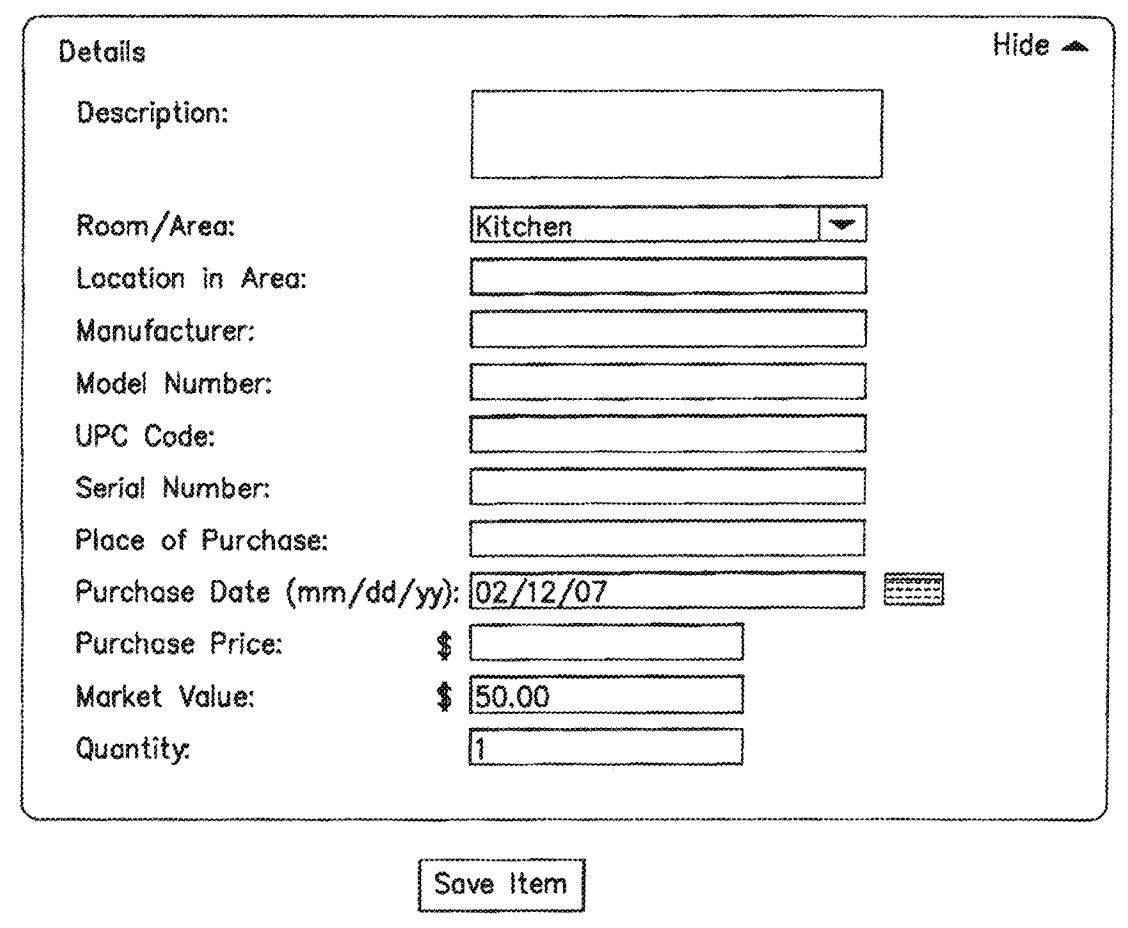

Another aspect of the invention is the ability to define one's belongings, or inventory, in the home or otherwise, as illustrated in a non-limiting example of FIGS. 24 and 25A-B. One example of the process for creating and editing inventory items is defined in FIG. 7A. In step 702, an Inventory Item entry 307 is created, as illustrated in a non-limiting example of FIG. 25A and saved in Inventory Table 306, illustrated in a non-limiting example of FIG. 24.

In step 703, if the user is editing the inventory manually, the item is displayed, 706, and the user is allowed to edit the attributes, 711, as illustrated in a non-limiting example of FIG. 25B. These attributes include but are not limited to item name, type of item; such as, but not limited to, antiques, appliances, artwork, building/craft material, built-ins, cameras, clothing, collectibles, computers, cutlery, decorations, dishes, electronics, or anything that can be purchased, borrowed or loaned; the room or other area in which the item is located, manufacturer, model number, universal product code (UPC), serial number, place of purchase, purchase date, purchase price, market value, quantity and the like. Also included with the item's definition is the item's attribute 'for sale' or not. All Inventory Item entries 307 that are marked as 'for sale' show up with the property details as public information.

If not editing manually, as determined at test 703, and the item details are coming from a document, as determined at 705 then the system will select at 708 passer that is a pre-configured using configuration 709 for the source of the document. The valid document types provided by the source may be any formats used for document storage and recall such as DOC, PDF, RTF, TXT, XLS, MPP, ZIP, PPT, XML, HTML and the like. The contents of the document from a source would be specific to the source and would have to be enabled for logical parsing indicated at 712 such that the item details are readily extracted from the document and applied to Inventory Item entry 307. The format of the source document could be agreed upon by the source and the system as, for example, with an interface definition. This source document can be downloaded by the user or sent automatically by the source to this system.

If not parsing a document, determined at 705, and the item details are determined to be coming from a universal product code (UPC) at 704, then either an image of the UPC code is to be processed or the UPC string is available and processed directly. If processing an image, per test 707, then first the UPC string must be extracted from the image, act 710. There are many commercially-available solutions for act 710. The next act 714, is executed which now parses the UPC string in character form to extract the product information from the string and populate an Inventory Item entry 307. The UPC is an international standard with many commercially-available (and in some cases, free) software solutions which should be applied. Once the Inventory Item entry 307 is created and/or edited either manually or from a document or from a UPC then the user can upload at act 600 zero or more files to associate or reference with an Inventory Item entry 307. When done, step 713, the Inventory Item entry 307 is saved.

Another aspect of the invention with regard to inventory is the data structures and computer-implemented procedures providing the ability to manage the monetary value associated with the inventory, both from a purchase-price point of view and market value. This aspect may include providing the user with the ability to automatically integrate with both online (e.g., Amazon.com) and traditional "brick-and-mortar" stores (e.g., Home Depot, Sears, and the like) and buy/sell marketplaces (e.g., eBay, auction houses, et. al.) to track their buying and selling of inventory items.

Figure 7B:
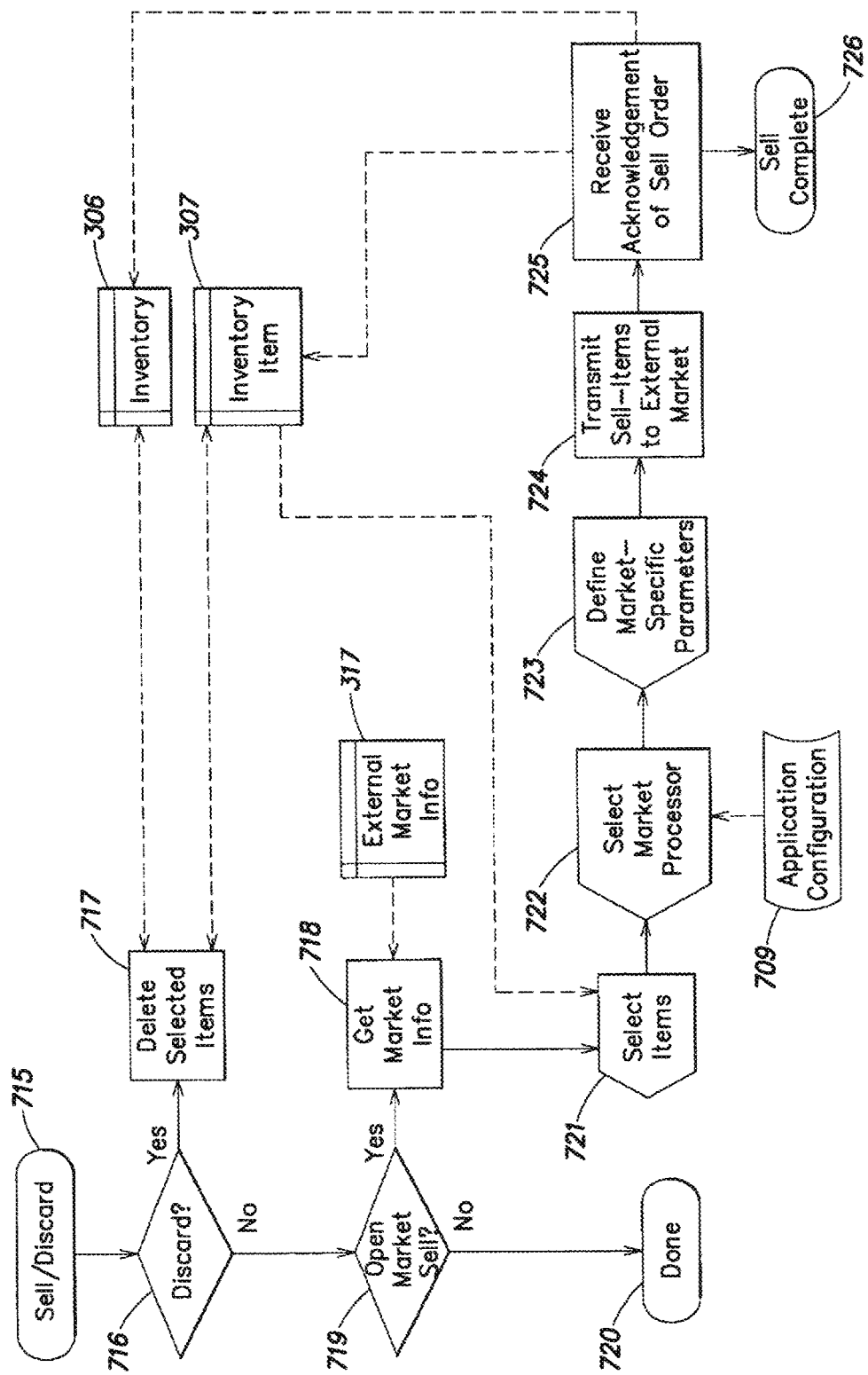
Figure 7C:
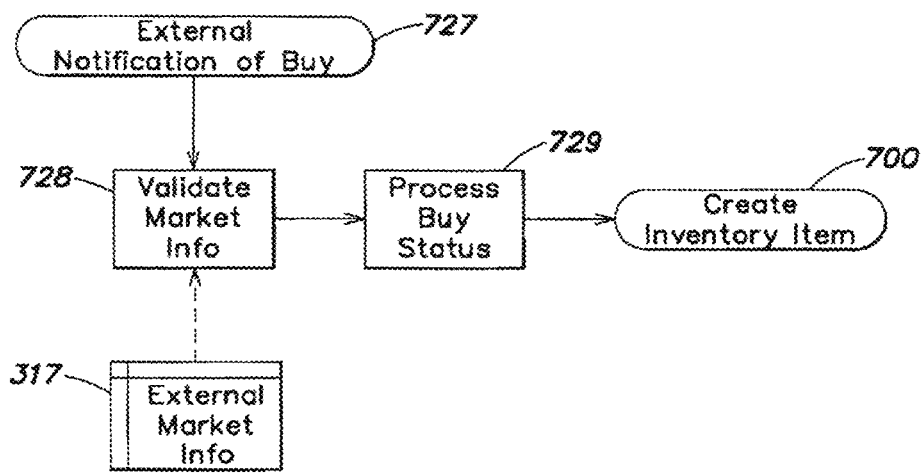
Figure 7D:
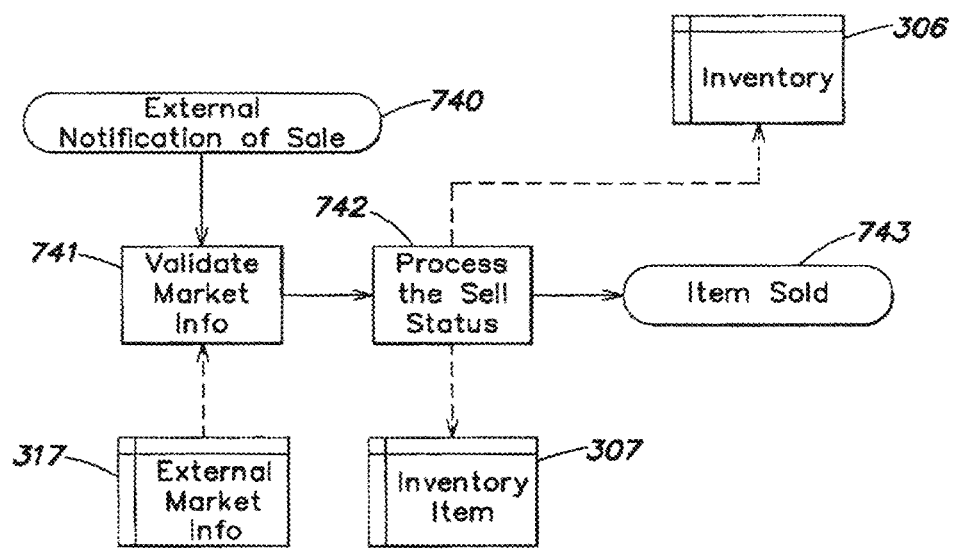

Another aspect of the invention with regard to inventory is the ability to integrate the selling of items in the inventory with one or more third-party buy-sell online forums (e.g., eBay). FIG. 7B defines one example of the processing for selling. Prior to initiating this process, the user would have had to set up an account on the third-party buy-sell forum and to inform the system of that account information as previously defined in FIGS. 10A-10B. To sell, the user would select the items in the inventory to sell, step 721, then select the market from a pre-defined configuration of integrated markets to which to transmit the sell, step 722, then define any market-specifics attributes; such as, for example but not limited to, lowest acceptable price, selling period and the like, and then transmit, step 724, the sell order to the buy-sell forum. To close out the transaction, the system should receive, step 725, an acknowledgement of the sell order. The transmission of sell orders could be conducted over the internet, telephone, cell phone, satellite or some other dedicated or generally-available communication link. After closing sales transaction, as exemplified in FIG. 7D, the third-party buy-sell forum would communicate back the sale particulars of the item(s) sold. The system would first validate, step 741, the user/market info against the External Market Info Table 317 and then update market value and sell date of the Inventory Item entry 307 and Inventory Table 306 accordingly.

Another aspect of the invention with regard to inventory is the ability to integrate the buying of items from one or more third-party, online marketplaces (e.g., Amazon.com) and either automatically or manually update the user's inventory on purchase. To use automatic services, the user would have to have setup an account on the third-party marketplace and inform the system of the account information as previously defined in FIGS. 10A-10B. On purchase, the online market could communicate directly with the system, indicated at 727, via the internet, telephone, cell phone, satellite or some other dedicated or generally available communication link providing the user's online-market account information along with the purchase information. The system would associate its user with the External Market Info Table 317 and validate the market data's correctness at 728. Valid purchases are extracted from the buy status step 729, and new inventory items are created accordingly, step 700. The online market may also only provide the purchase information on their forum or some other customer communication from which the user could manually enter the inventory information into the system.

Another aspect of the invention with regard to inventory is the ability to integrate the buying of items from one or more third-party, in-person marketplaces (e.g., Home Depot, Lowes, Sears, et. al.) and either automatically or manually update the user's inventory on purchase. To use automatic services, the user would have to set up an account on the in-person marketplace and inform the system of the account information FIGS. 10A-10B. The processing of connected, in-person marketplaces would be identical to the previously defined online marketplaces. Additionally, in both connected and non-connected in-person marketplaces, the user may have access to their account while in the in-person marketplace to view aspects of their property and/or inventory. Possibly the in-person marketplace enables the user to scan the UPC off of a purchased item and perform the automatic processing of the UPC string as defined in FIG. 7A. The access to the user's account could be through a web-enabled computer in the in-person marketplace or through a web-enabled cell phone or web-enabled personal data assistant or some other communication-enabled device through which access to this system can be achieved. These communication-enabled devices could be provided by the in-person marketplace or by the user themselves. The user may also have "smart-card" technology which could capture the in-person marketplace buy information which the user would bring to the system and from which the system would extract the buy information. The buy information on the smart-card could either be stored as one or more documents (e.g. the types of documents as defined in the description of FIG. 6A) or as some other persistent storage easily migrated from the smart-card to the system, for example, a relational database from which the data could be exported from the smart-card and imported to the system.

A further aspect of the invention with regard to inventory is the ability to integrate the user's inventory with one or more third party, in-person marketplaces (e.g., a so-called "brick and mortar store such as a lumber yard, hardware store, building supplies store, etc.). In a non-limiting example, the in-person marketplace provides customers/users electronic information about the inventory of the marketplace at a specific location, i.e., a marketplace inventory (e.g., an inventory of items offered, ongoing sales, and inventory layout within a specific location). Customers may access their account while in the marketplace to view aspects of their property and/or inventory, e.g., a supply inventory comprising one or more lists items generally need or desired, e.g., for the home or other personal property items unrelated to the home, e.g., items that may be needed to complete a particular project. Simultaneously, customers may access the information provided by the in-person marketplace to locate an item listed in the user's inventory within the specific in-person marketplace. In one embodiment, the user accesses the user's property, inventory or home project information contained in a data table via any suitable portable internet-capable device, e.g., smart phone, wireless personal digital assistant (PDA), mobile phone or other handheld communication device, etc., and the system notifies the user visiting a selected in-person marketplace of the current supply inventory listed in a data table. Alternatively or additionally, the portable device queries the system as to whether an item listed in the user's inventory is available in a given in-person marketplace or a section of a particular in-person marketplace. Once the sales transaction is completed, the in-store marketplace can email a receipt or a duplicate receipt for the transaction directly to the user's account. In addition, the in-store marketplace can email additional product information to the user's account, including but not limited to, product specifications or a product or service quotation or bid.

Thus, according to this aspect of the invention, a method is provided for managing property information comprising operating a computer system to create a data structure in a data store containing information comprising a supply inventory pertaining to for example, items generally needed or desired, e.g., for the home or other personal property items unrelated to the home, or items needed or desired for one or more projects to be executed on said property. The method may further comprise operating a computer system to create an additional data structure in a data store containing information comprising a marketplace inventory of a third party marketplace. The additional data structure is optionally provided by a computer-interactable data structure configured and arranged for receiving from the third party marketplace said marketplace inventory. In one embodiment, a user may access said supply inventory via a portable internet-capable device. The user may also access said marketplace inventory via such a portable internet-capable device. Optionally, the user may access said supply inventory and said marketplace inventories simultaneously. In an alternate embodiment, the user may revise said supply inventory via said portable internet-capable device and in some embodiments, the user may supply information to a data structure via email. In addition, the third party marketplace may email product information to a data structure, wherein said product information is selected from the group consisting of a receipt, a quotation for a product or service, product specifications, and combinations thereof.

Another aspect of the invention with regard to inventory is the ability to manage the monetary value associated with the inventory, both from a purchase-price point of view and market value. The market value could be manually set by the user or automatically set by an algorithm which monitors one or more third-party open buy-sell online forums (e.g., eBay) to determine the current market value for an item.

Another aspect of the invention is the data structures and computer-implemented procedures which provide the ability to document and execute home projects. Such procedures include, for example, tracking changes to the homeowner's tax basis in the home based on past and present project work. They may also include submitting entered projects for bid to service providers participating in the public forum, such as, for example, by communicating this information via the World Wide Web or a public or private network.

The ability to document and execute projects on the property is another aspect of the invention, illustrated in a non-limiting example of FIGS. 22 and 23A-C. Home projects could include but are not limited to home improvements, repairs, extensions, one-time maintenance, periodic maintenance and the like. These projects could be associated with the property, on the home exterior, interior, one or more rooms in the home, one or more areas of the property, and/or some combination of same. These projects could be just a description by the user for historical purposes not meant to be executed by a service provider or to be posted to service providers for ultimate execution. FIG. 22 shows an example of a user interface screen 2200 to display from a database of projects associated with Property 2201 an overview of those projects. The user/homeowner has previously created the project entries shown in this example (e.g., Gutters Project 2202, Fix Railing project 2204, etc.). Projects may be created in any convenient way depending on the underlying database. For example, a click on a New Project icon 2206 may bring up a project input screen. On screen 2200, the user may be provided, for example, with a selection box 2208 that may be checked to delete a project and a status pull-down selection box 2210 to permit status updates; entry fields 2212 and 2214 for project start and end data entries, and a check box 2216 where the user may choose to publish the project (e.g., to receive bids). More detailed per project information may be input, for example, on one or more "Edit Project" screens such as screens 2302, 2304 and 2306 of FIGS. 23A-23C, which together provide a "snap shot" of one project. These screens capture typical information that might be used to publish a project to receive bids from service provider such as contractors, for example. The fields and organization shown are intended to be exemplary and not limiting. On other screens, actual project results may be entered/captured.

Figure 8A:
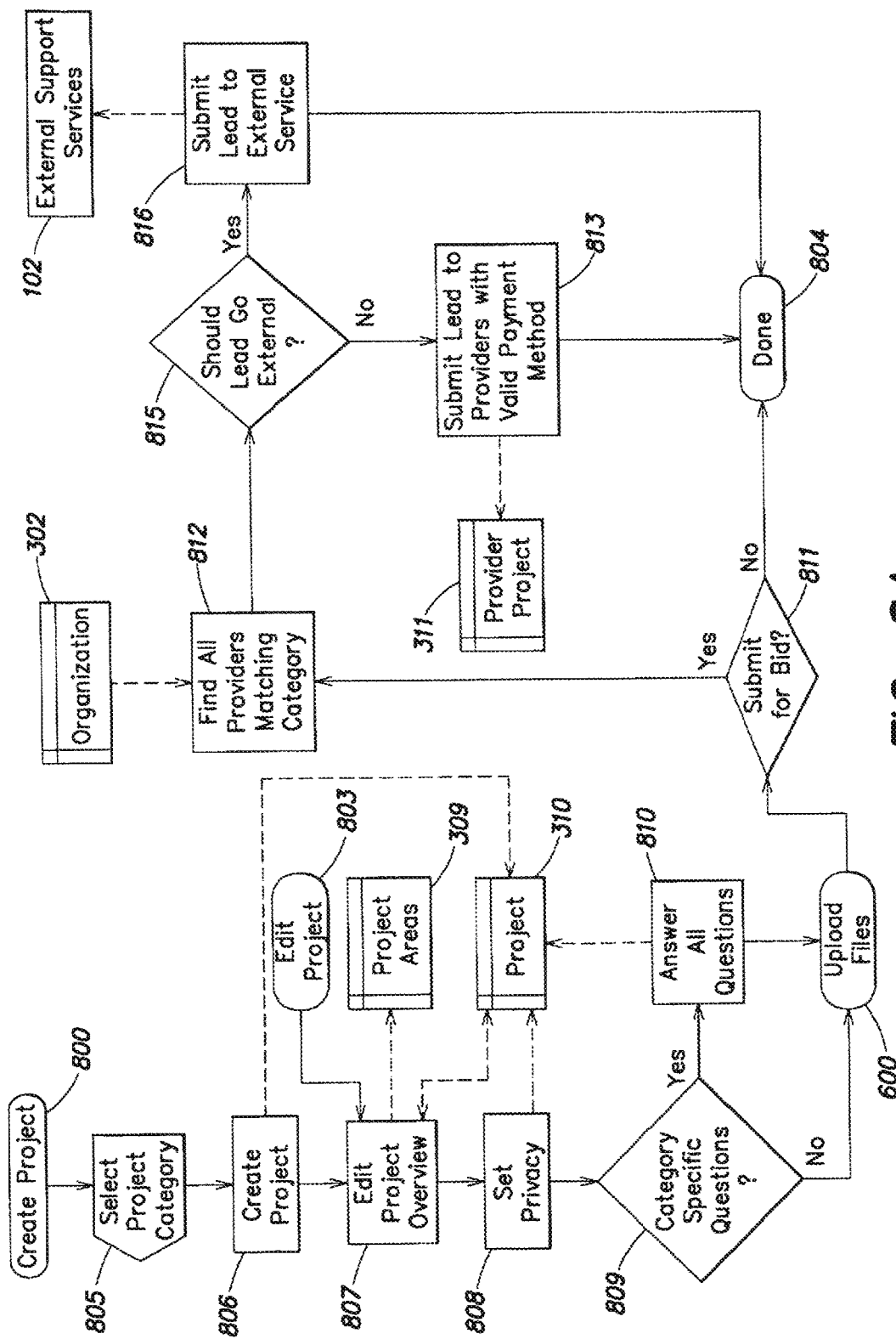
FIG. 8A is a flowchart defining an example of processing for submission of home project and editing thereof.
Figure 23A:
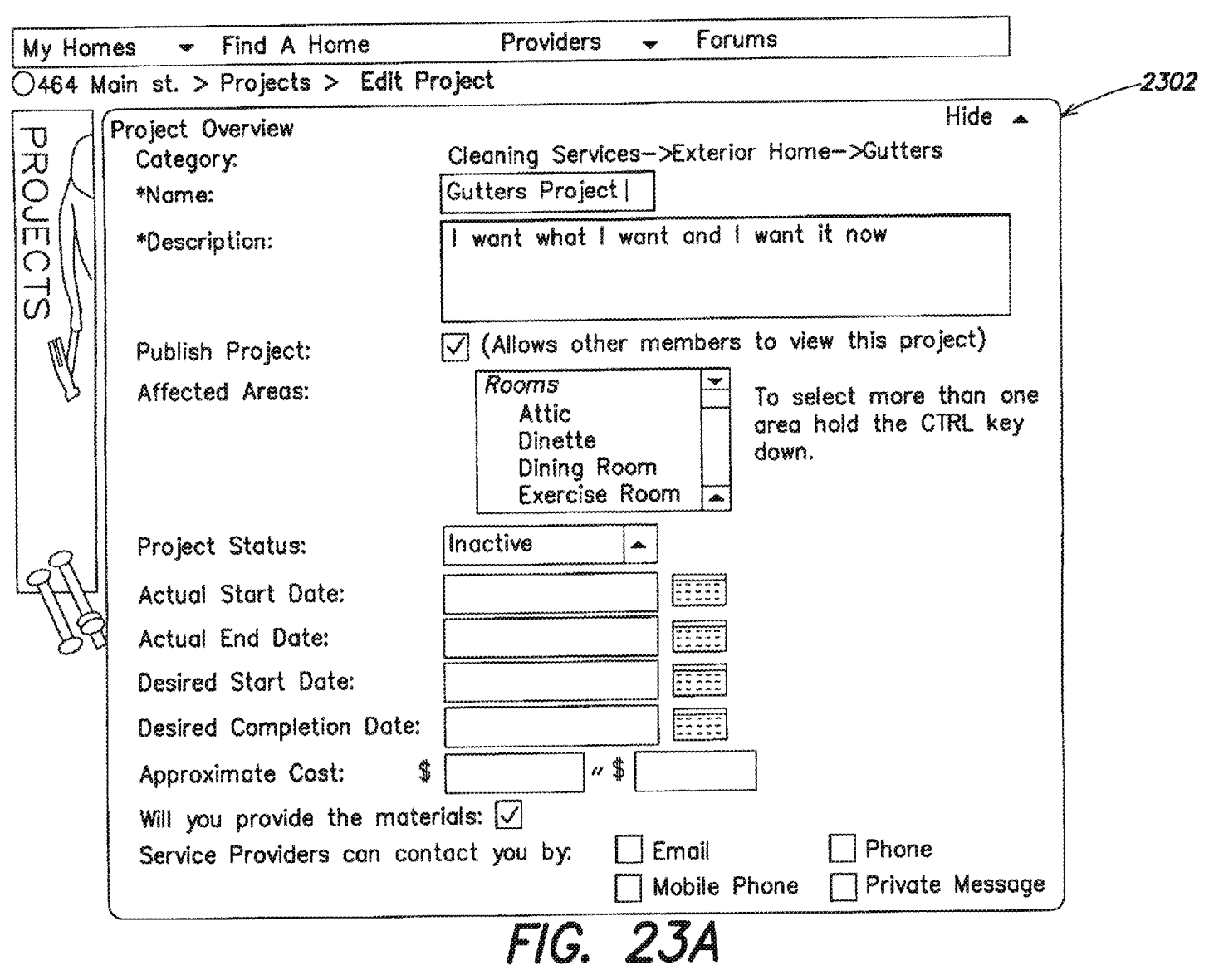
Figure 23B:
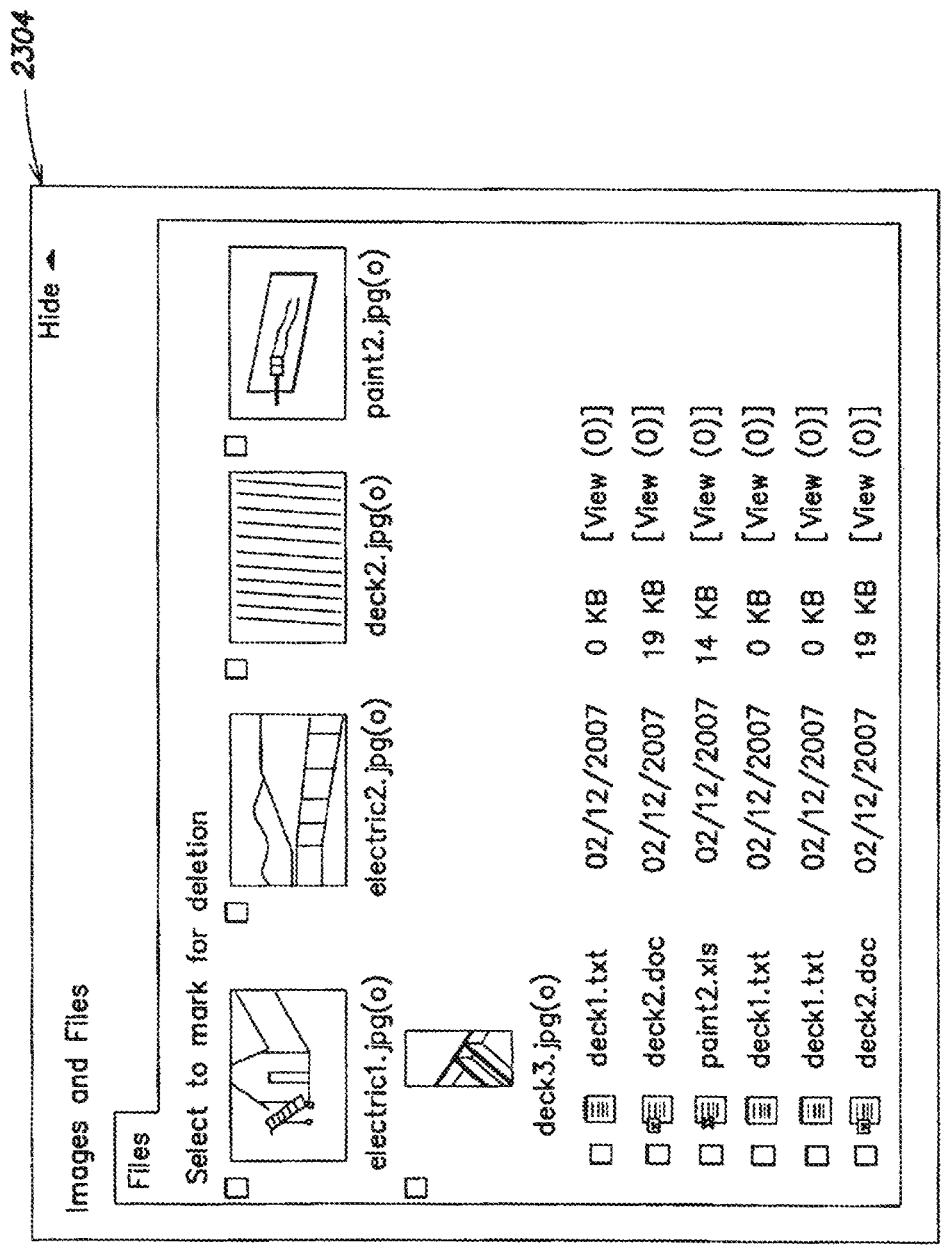

In FIG. 8A, the user would, for example, first select a project category, at step 805, and then, in step 806, create the Project Table or entry in Project Table 310, as illustrated in a non-limiting example of FIG. 23A. From here the user would specify in Step 809 (e.g., on screen 2302) an overview of the project that could include but need not be limited to, for example, a name, a description, entries to the affected Project Areas Table 309 (i.e., rooms and/or areas of the home being involved), desired start date, desired completion date, approximate budget, and/or contact information including but not limited to email, phone, cell phone, and/or private message. The user would then set the privacy she desires on the project, at 808, e.g., either private (no one but the user having access), public (everyone, including the user having access) or semi-private (only the user and his/her Trusted Community having access). If the type of project selected requires supplemental questions to be answered, determined at test 809, the user would answer one or more questions that are specific to the project, step 810. Each question could require an answer of a predetermined type. Next, the user could upload or reference one or more files to help describe the project 600, such as video, audio, picture, text or other files, as illustrated in a non-limiting example of FIG. 23B. The information on the project may be input by the user at various times, thereby allowing the history of a project to be recorded in increments. Optionally (and not shown), the system may automatically populate a routine maintenance calendar for the user's review and approval, e.g., scheduling gardening, gutter cleaning, heating oil delivery, air conditioning maintenance and other routine services and record the completion of each routine maintenance event (in some instances, automatically or semi-automatically), with or without verification by a user. Yet in other embodiments, the user may manually populate a routine maintenance calendar. Yet in another embodiment, the system may contain a 'reminder' module which populates reminders to the user to schedule desired or recommended maintenance tasks.

At this point, the definition of the project is complete and the user decides, in step 811, to either submit the project for bid or just save it for a later submission, possibly never submitting the bid. According to some embodiments, the system may automatically formulate a project bid and forward it to registered service providers using communication devices and/or post it for service providers in the Trusted Community. The system may then collect bids and allow the user to review bids and select a service provider. The selection may be assisted by using computer algorithms based on bid price, rank ordering or combination thereof.

Figure 23C:
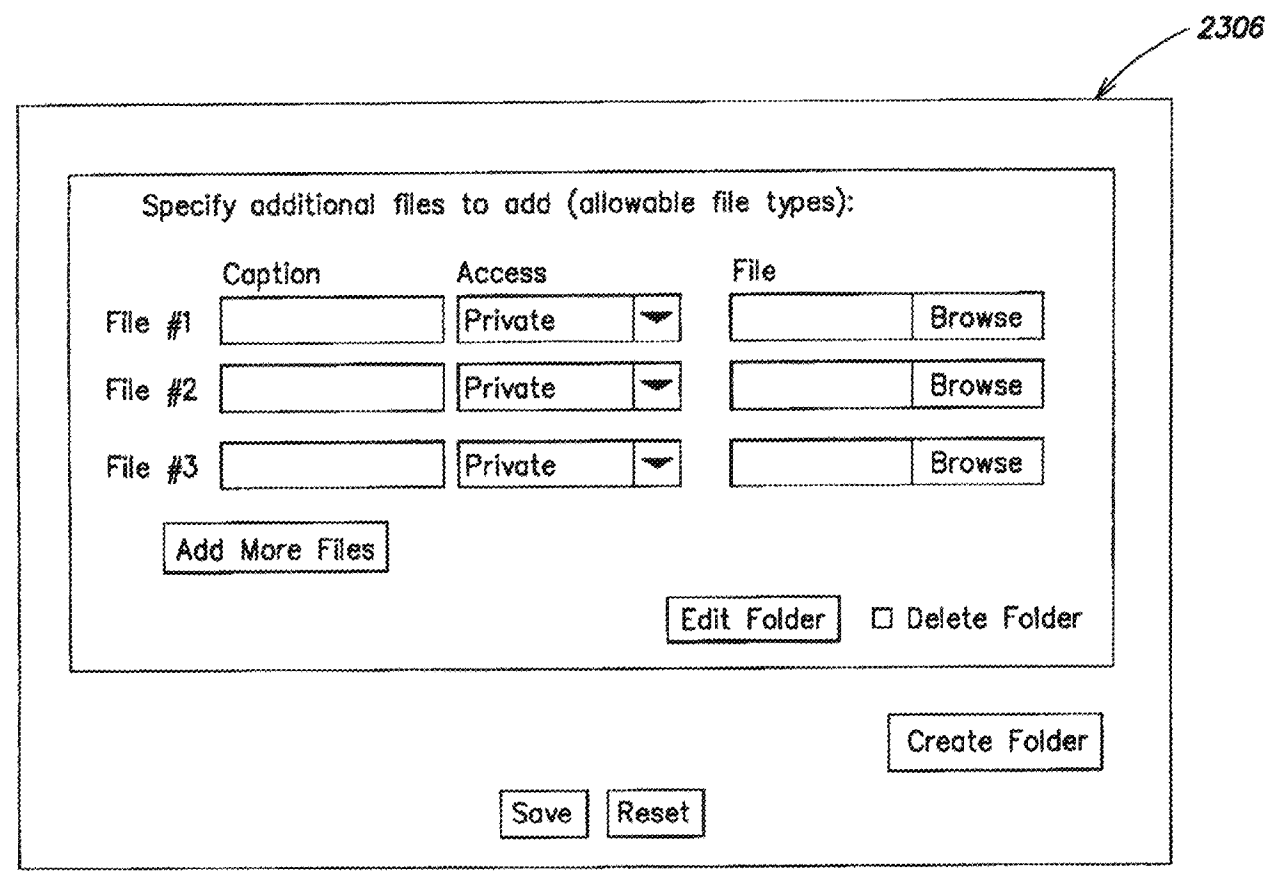

With regard to the uploaded or referenced files, the user could organize the files of the project into one or more folders associated with a project, as illustrated in a non-limiting example of FIG. 23C. For example, the user might create "before," "during" and "after" folders for a project. The user could also have folders for each of the service providers offering bids on a project. The user could also have folders for each service provider executing a project. These examples on the use of folders are not meant to limit the definition of the system but merely to provide context to how the user might use the system.

Figure 9:
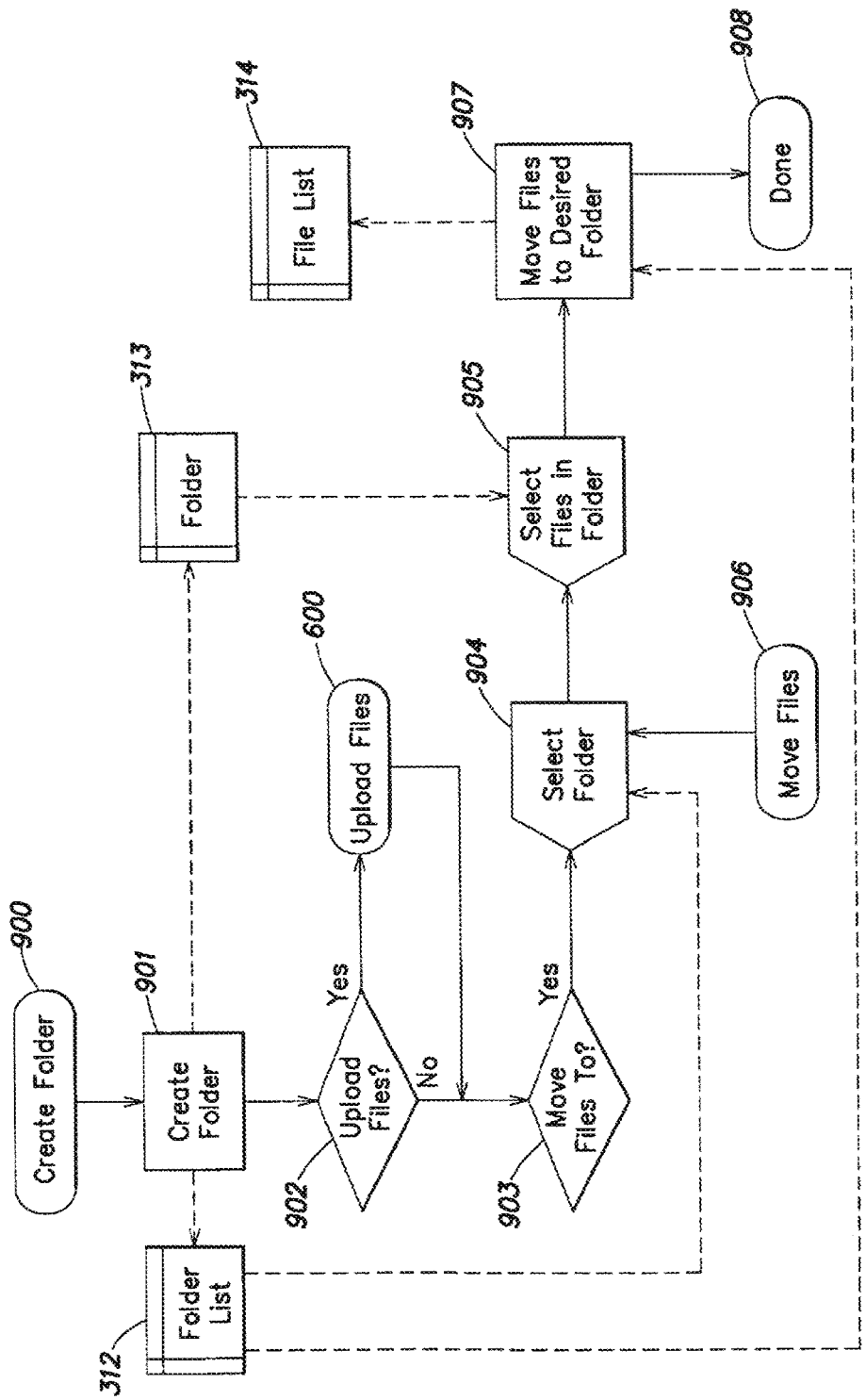
FIG. 9 is a flowchart defining an example of processing for creation and management of folders of files in the system.

In FIG. 9, one example of a process for creating a folder and assigning files to the folder is defined. Starting at 900, the user could, in step 901, create a new Folder 313 and the system would add that folder to the Folder List Table 312 of a project. The user could choose at decision step 902 to upload files to the Folder 313 and in decision step 903 the user could choose to move files to the Folder 313. To move files from one Folder 313 to another the user would, for example, first select the Folder 313 from which files are to be moved, step 904, and then (step 905) select the files in that Folder 313 to be moved and then in step 907 have the system move the files from the previous Folder's 313 File List Table 314 to the other Folder's 313 File List Table 314. The process ends at 908.

Figure 21A:
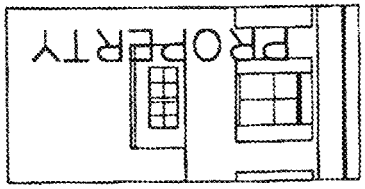
Figure 21B:
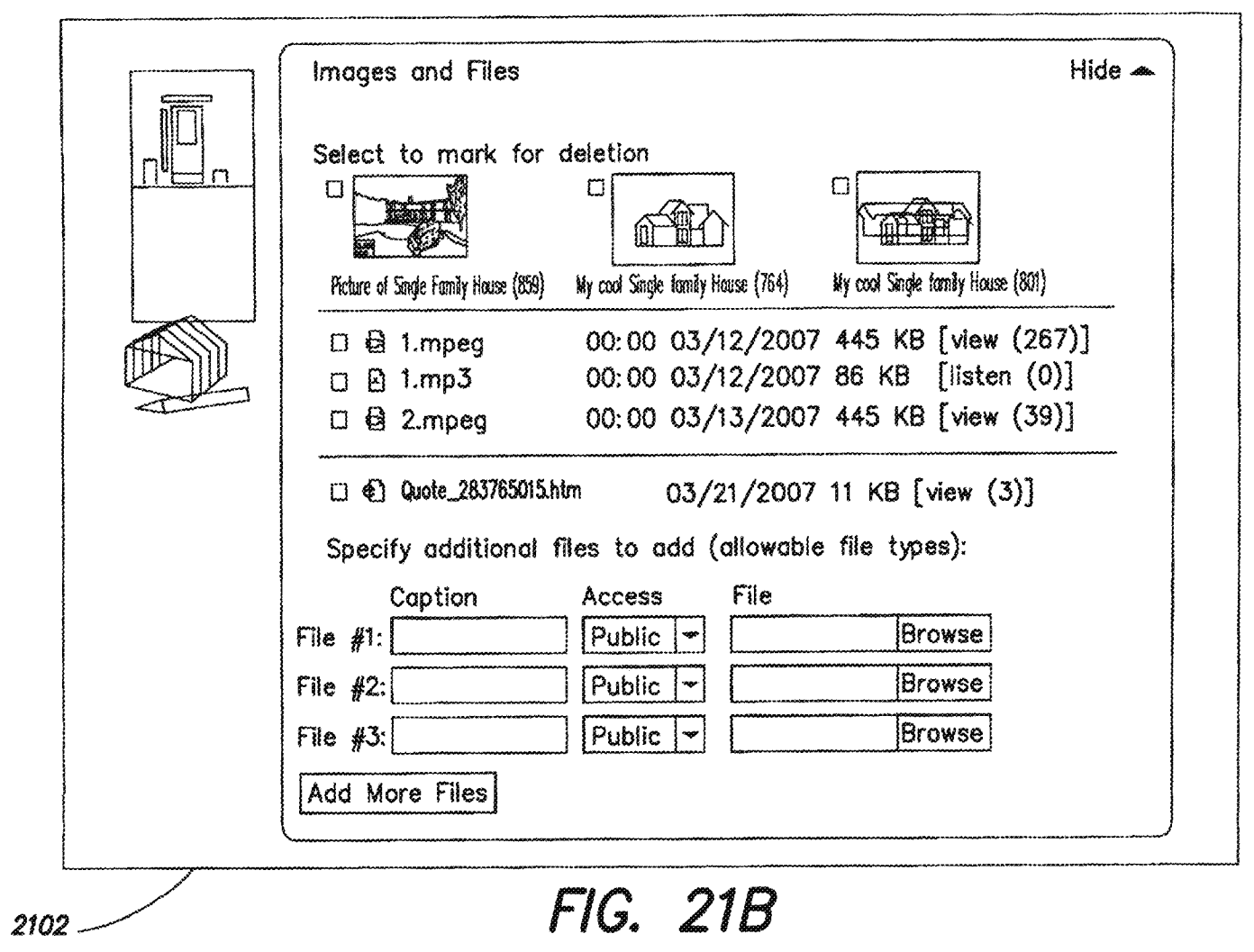

Another aspect with regard to home projects is the ability to track changes to the home's tax basis based on the project work. The user will be able to manually change the basis modification for each project, for example, through a WORLD WIDE WEB page interface, as illustrated in a non-limiting example of "Edit Home" screens in FIGS. 21A-D. The system will also provide suggestions with regard to how the cost basis should be adjusted. By default, the system may define a project as basis-affecting or it may define a project as not basis-affecting. If a project is basis-effecting, all costs of the project may be automatically added to the basis. Preferably, an audit rail will be maintained for all basis adjustments so that it will be easy to document when, how and why the basis changed. Screen 2100 (FIG. 21A) shows an example of a basic input screen for defining a real property location. FIG. 21B shows an example of a screen 2102 for attaching image and other files relating to the property, and adding captions to them. FIG. 21C shows an example of a screen 2104 for inputting property details. The basis number at 2103 may be manually input or identified by the system from purchase price and adjustments supplied by improvement projects. FIG. 21D shows an example of a screen 2106 for inputting various details characterizing the property. When this information is published, some or all of it typically is presented in read-only form.

Another aspect of the system is the data structures and computer-implemented procedures providing the ability for service providers to join the public forum to receive project leads from users. Additionally service providers are providing the ability to help them market their services by providing them the tools to create one or more portfolios with associated files.

According to one more aspect, service providers may also join the system so as to market their services and receive project leads. According to one specific example, a service provider may be a member of the public forum. Service providers include, but are not limited to, carpenters, electricians, plumbers, landscapers, painters, handymen, architects, inspectors, insect and/or rodent exterminators, cleaners, realtors, tax advisors, lawyers or any person, company or organization who provides or wishes to provide services to users of the public forum. A service provider will preferably identify one or more persons as the administrator(s) of the company or organization relative to the system. The administrator would be responsible for the setting up the account for the company or organization and also defining associates of the company or organization who will operate on the public forum as representatives of the company or organization. In one example, in step 1005 a service provider administrator's information would be the same as that for a normal User 303 but additional information will be required with regard to the Organization 302 including but not limited to company name, description, email address, fax number, address, web link, and credit card information for billing purposes. Once the general information is provided, the administrator can create one or more associates in step 1006, who will represent the Organization 302 on the public forum. Next the administrator can create one or more portfolios, step 1007 to help market the company's services, using folder mechanisms illustrated at process 900 in FIG. 9. The administrator also can set up the categories of project leads they desire their Organization 302 to receive step 1009. The categories of project leads should be an easily extendable list of projects a user would desire to execute including but not limited to installing decks, painting the exterior of a house, painting the interior of a house, replacing a toilet, remodeling a kitchen, selling a home, buying a home, build a home, or any type of service anyone would desire to do in or around their home or not even associated with their home or any home. This list of project categories is not meant to be exhaustive but, rather, is provided as an example to help communicate the design. On joining, a service provider could be charged a fee or agree to later pay a fee(s) to participate in the community. This fee could take many forms such as, but not limited to, annual dues, per-lead charge, and/or a percentage of the proceeds taken in by the service provider on various projects executed via leads from the system.

Another (optional) aspect of the system is data structures and computer-implemented procedures providing the ability for the user to post reviews of service providers and share those reviews with the public forum. These reviews can be associated with a project defined by the user or not.

Figure 8B:
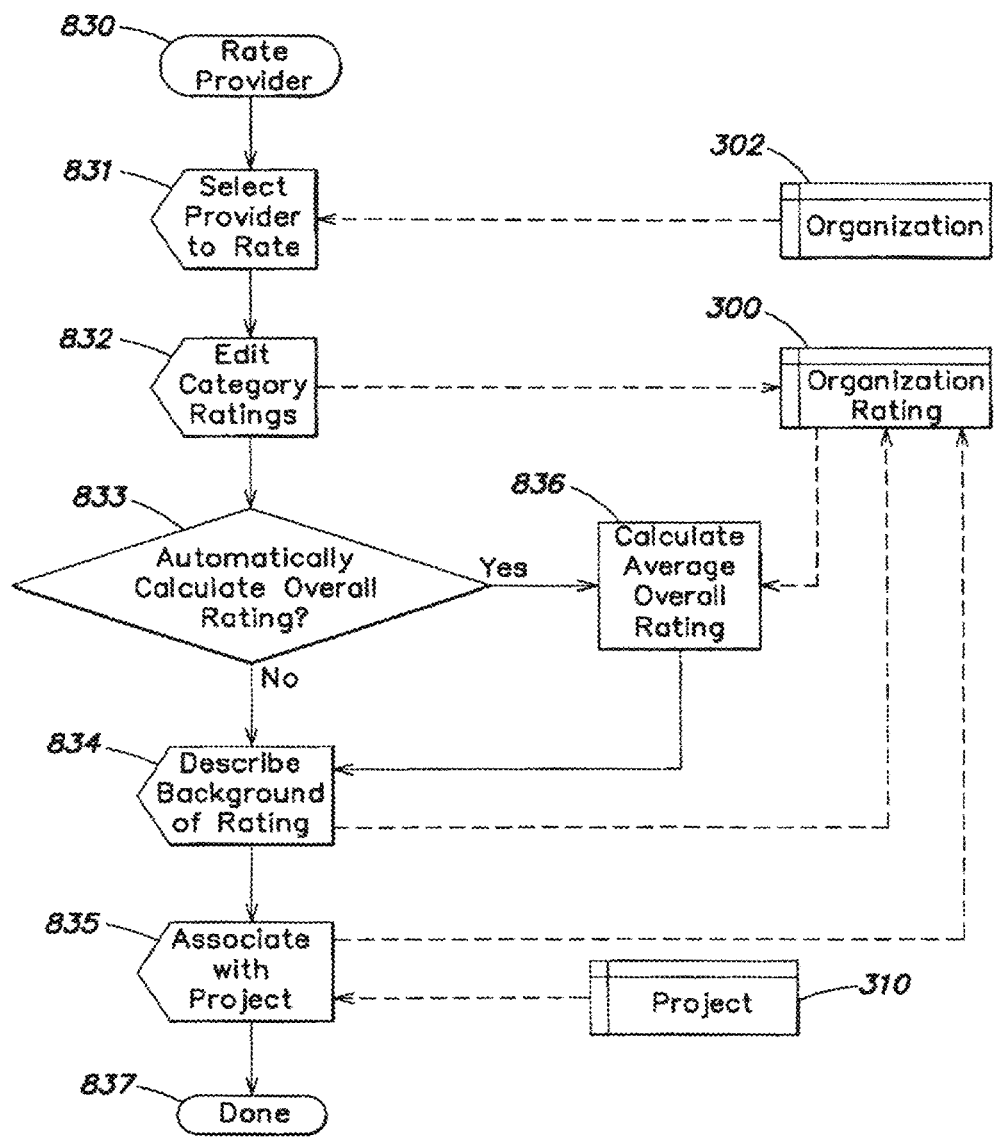
FIG. 8B is a flowchart defining an example of processing for submitting a rating of a service provider.

With service providers in the system, a user may post ratings on one or more service providers as defined in FIG. 3. These ratings may be associated with a project the user executed on their property and stored with the system or it could be a review based on project work or other experience not necessarily associated with a project stored with the system. In an example process 830 illustrated in FIG. 8B, a provider to be rated is first selected, step 831. It is assumed in the example that the provider category ratings must be edited step 832. Provided ratings, for example, could be timeliness on the project, cleanliness associated with the project, price compared to the competition, quality of the work performed, communication before, during and after the project, and/or professionalism throughout the project. In step 832, the user could also manually define a different or an overall rating or automatically calculate an overall rating from the other defined category ratings described, as at 833. If the user decides to automatically calculate an overall average, then the system sums the other rating categories and calculates an average from the sum and applies it as the overall rating. Next, the user may define the background context for the rating, at 834, including, for example, whether the job was completed, whether the user would hire the provider again, the approximate cost of the work, a description of the work and/or general comments about the provider or the project in question. Finally, optionally a Project 310 could be associated with the rating at 835 as supplemental information. Each rating category could be graded, for example, on a 1 to 5 scale. A rating may also be undefined or not applicable. At a minimum, the user should define the category of the provider and an overall rating. A service provider who has a low rating might be allowed to provide a rebuttal to the rating. Once a rating is defined, the new rating and all previous ratings preferably are viewable by all members of the system including the service providers; and each service provider will have a total rating which aggregates all the ratings provided by all the users. This total rating could include an average and/or a median of the all the ratings provided by users.

Preferably, a user may choose to view only the service provider ratings they have captured in the system, or select service providers or service providers with minimum rating values or other filtered information or service providers (e.g., only electricians who complete projects on time and on budget).

The system may enable the user to choose a preferred service provider manually, or allow the system to select a service provider automatically according to the internal ranking system and time availability. The system may enable the user to specifically disallow selected providers from automatic selection. The user preferably may specify the selection criteria, e.g., price, ranking, speed, etc. for automatic selection. The system may enable the user to import scheduling flexibility options and/or set up any searchable cut-off criteria for selecting a service provider.

According to one aspect of the invention, users may add service providers to the system. The user would fill out a user registration for the provider, for example, as defined in FIG. 10A, filling in as much of the information as they have at their disposal, and initiating the activation process at step 1011. The service provider would have to accept the activation 1011 and on doing so the service provider would become an active service provider in the system. If a user initiates the membership, then Provider Referral Table 319 is updated to reflect the activation of the service provider 1011. Once a service provider activates their membership indicated at 1012 the user might, for example, be eligible for a measure of economic benefit to be distributed to the user. This measure of economic benefit could take the form of cash, stock grant(s), stock option(s), bonds (US, municipal and/or corporate), and/or coupons for goods, services, vacations, meals, events, cars, anything an individual might see economic benefit in receiving, or some combination of same or other benefits. The amount associated with the measure of economic benefit could be some set value not based on any monetary return to the service provider, it could be determined based on a percentage of the sign-on fee paid by a service provider, it could be determined based on a percentage of fees paid by or to a service provider for project leads they receive; or it could be determined based on some combination of same or some other algorithm.

With service providers in the system and users submitting projects, the system provides a mechanism to post project leads to potential service providers who perform the type of work being requested. As illustrated in FIG. 8A, a user may submit at 811 a project for bid from one or more service providers. On the user choosing to do so, the system could determine all service providers who have signed up to view the type of project submitted by the user, act 812. The system could then determine in step 815 if the lead is to be handled "in-network"—meaning by providers who are registered with the system or externally. The in-network decision could be based on providers who are registered and/or a configuration of leads not to be processed in-network and/or any other like way to discern in-network handling. If the leads are not in-network then the system, in step 816, could communicate over the Internet, telephone, cell phone, satellite or some other dedicated or generally-available communication link the desired lead to an External Support Service 102 for processing. If the lead is in-network, the system could then at step 823 disseminate the project lead to all service providers who have appropriately set up their payment method in the system. The system could limit the receiving service providers by proximity to the user, for example, certain mile radius, same street, same neighborhood, same zip code, same city, same county, same state, same province, same country, same continent, or any way to limit the field of service providers for a project using geographical references. The field of service providers bidding on a project may also be limited by an overall rating level a service provider may have or by individual ratings a provider may have (for example, quality of service, timeliness, cleanliness, cost, and the like). The field of service providers bidding on a project may also be limited by the user identifying specific service providers as being undesirable i.e., if a service provider's deemed undesirable by the user, it will never see leads from that user. The field of service providers bidding on a project may also be limited by the number of leads they can receive in a certain span of time or from a certain geographical area or by the number of leads of a particular type they can receive or some combination of same or any other like way to constrain the leads received by a provider.

Figure 14A:
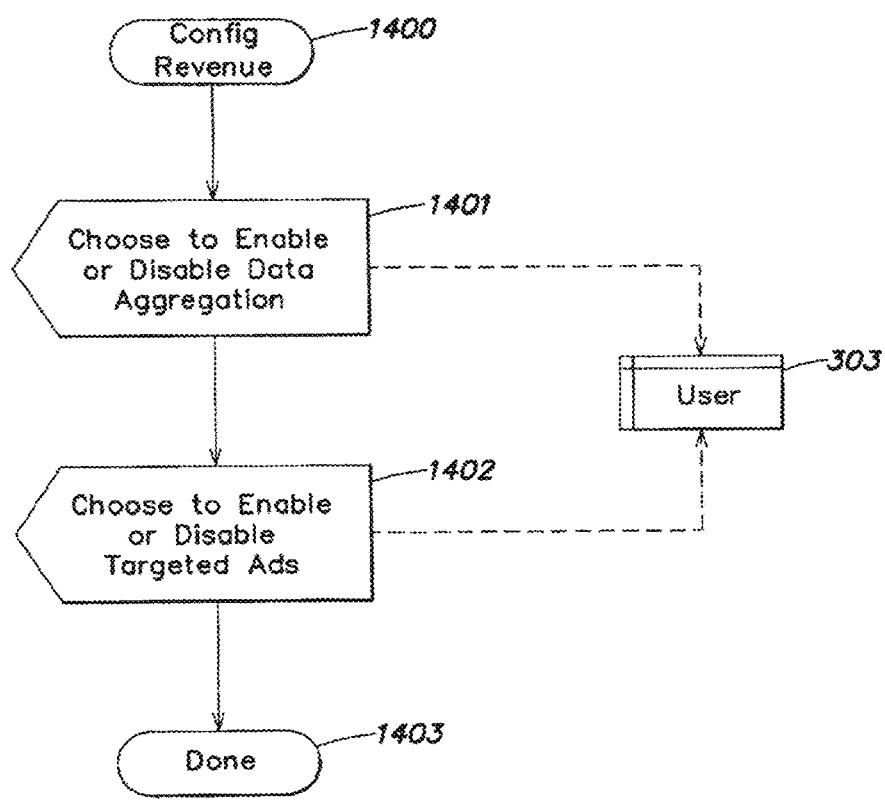
FIGS. 14A-14C together comprise flowcharts defining an example of processing for determining the measure of economic benefit to users.

Manifestly, users provide the system with information that in the aggregate could prove to be of significant value to marketing entities. Selling aggregated, non-personalized information (or, with permission, personalized information) could be a significant revenue source for the system. In one example, the system may generate an activity map of real estate transactions displaying frequency and/or volume of sales/rentals, average price per property or per square footage of property, etc. mapped onto a geographic map or other data structure (e.g., zip code listing). Also, integrated advertisements could be an essential revenue source for the system. These ads could be general in nature (meaning, not specific to the user viewing the information) and/or specifically targeted to an individual based on the data they provide to the system. Open access to an individual's personal data in the system must be controlled by the user to the level they wish to publish their personal information, as previously mentioned. As defined in FIG. 14A, a user's desire for privacy of their data could also carry over to receipt of targeted ads as generated by computer algorithms operating on a user's data. Preferably, the user should get the opportunity to opt out of either data aggregation (step 1401) or targeted advertisement (step 1402).

Another aspect of the invention is the data structures and computer-implemented procedures providing the ability to produce aggregated market data about all users of the system along with providing advertisements for users both general in nature and targeted to a user based on the information the user has provided the system. This includes the data structures and computer-implemented algorithms for determining a measure of economic benefit to be provided to one or more users of the system.

In one aspect of the invention, the system provides a measure of economic benefit to users based on their participation in one or more revenue-generating services. This measure of economic benefit could take the form of cash, stock grant(s), stock option(s), bonds (US, municipal and/or corporate), and/or coupons for goods, services, vacations, meals, events, cars, anything an individual might see economic benefit in receiving, or some combination of same. The measure of economic benefit to a particular user could be established by the level of revenue generated for the company that can be directly attributed to the user's participation in revenue-generating services of the system.

Figure 14B:
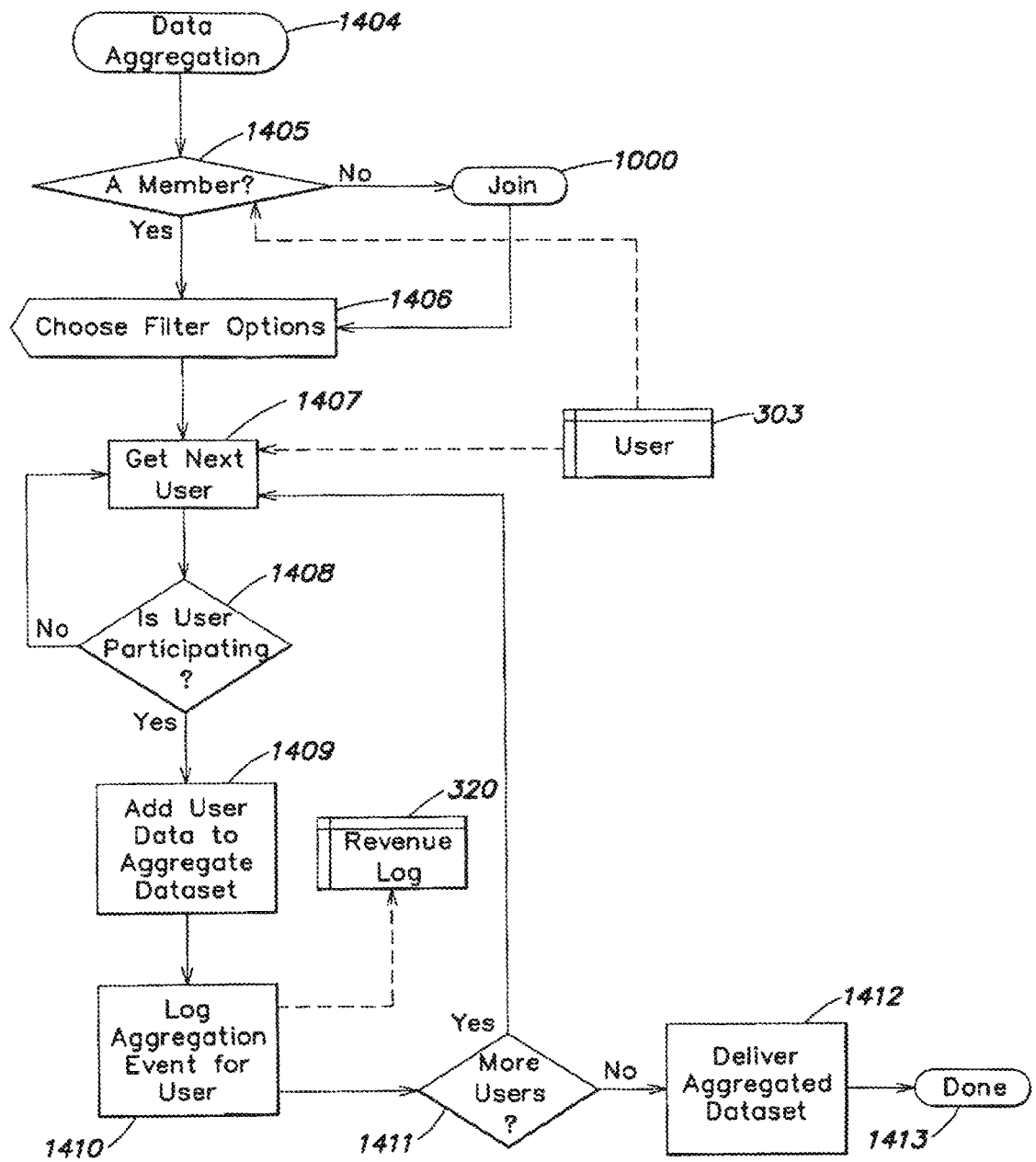

To capture user opt-in or opt-out with regard to data aggregation services, FIG. 14B defines one example of the processing to track data aggregation opt-in. When a registered entity (determined in steps 1405, 1000) desires to receive aggregated data from the system, the entity first chooses the desired dataset filter to be produced, in step 1406. The dataset filter could be set to limit the data by geographical location, wherein the dataset is limited by only certain countries, states, counties or provinces, cities, and/or zip codes. The dataset filter could also be set to limit the data by property type, property cost, property size, inventory category, project types and/or number, and/or any key attributes provided by the system to describe the property, home, inventory and/or projects defined in the system. Once a data filter is selected, the Users 303 in the system are screened in steps 1407-1411 and each user opting in to data aggregation (determined at step 1408 will be added (step 1409) to the list of users providing cleansed data to be aggregated. The system will log for the user a data aggregation participation event (step 1410) to track their participation. Once all the users are chosen (step 1411), the personal-data cleansed aggregated data is bundled and sent to the requesting entity (step 1412).

Figure 14C:
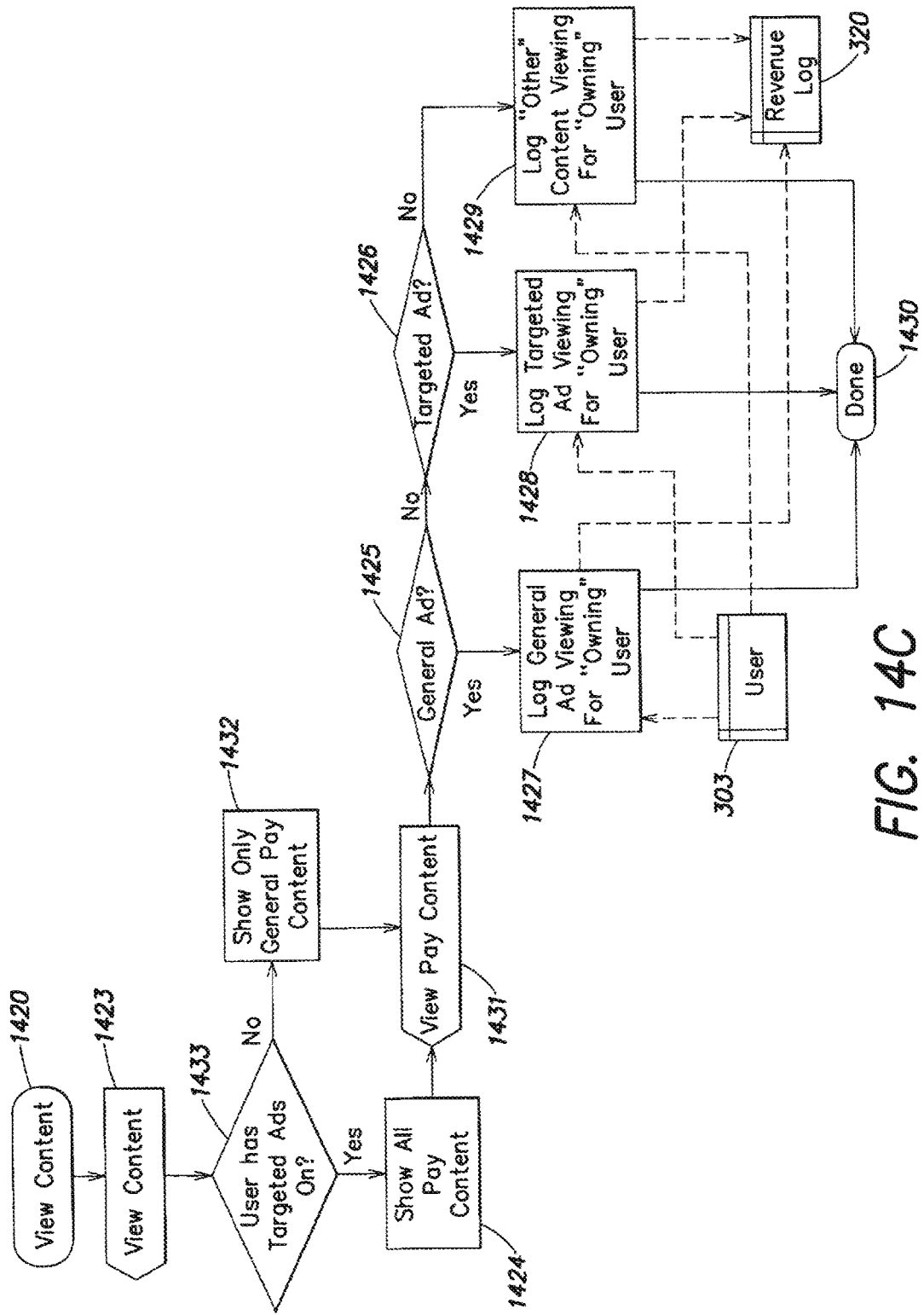

To capture user opt-in or opt-out with regard to advertisements or other pay content, FIG. 14C defines one example of the processing associated with showing pay content to a user and also logging access to the pay content. First, a user chooses to view some content of the system step 1423. If the user configures the system for 'target ads off' (determined in step 1433) then (step 1432) only general pay content is shown along with the normal system content. If the user configures the system for 'target ads on' (also determined in step 1433), then the system shows all pay content along with the normal system content step 1424. A user may decide to view one or more pay content step 1431. On so doing, the system checks the content as being general in nature (step 1425) and, if 'general,' the system logs a general ad-viewing event for the user whose data is being viewed 1427. If the ad was targeted to the user, then the system logs a targeted ad-viewing event for the user whose data is being viewed 1428. If the pay content is something other than a general or targeted ad, the system logs a viewing of other content for the user whose data is being viewed.

According to one aspect of the invention, the system may determine the measure of economic benefit to a user from the opt-in information 320. In one example, this determination could take the opt-in information and the level of participation for each user and base the benefit on that level. In the opt-in information, the system could track the actual revenue generated by each viewing and provide some percentage of each viewing to the user. In another example, the measure of economic benefit could also be uniformly distributed to all opt-in users regardless of level of participation or actual revenue generated. In another example, the measure of economic benefit also could be uniformly distributed to all users regardless of opt-in or opt-out status. This measure of economic benefit could also be limited to certain users of the system, for example, celebrities from movies, music, news, sports, television, literature, business, art or the like. To expand, celebrities or any user could be enticed to provide property information to the system by a measure of economic benefit which could be tied to the revenue their information actually generates and/or could potentially generate.

Figure 11A:
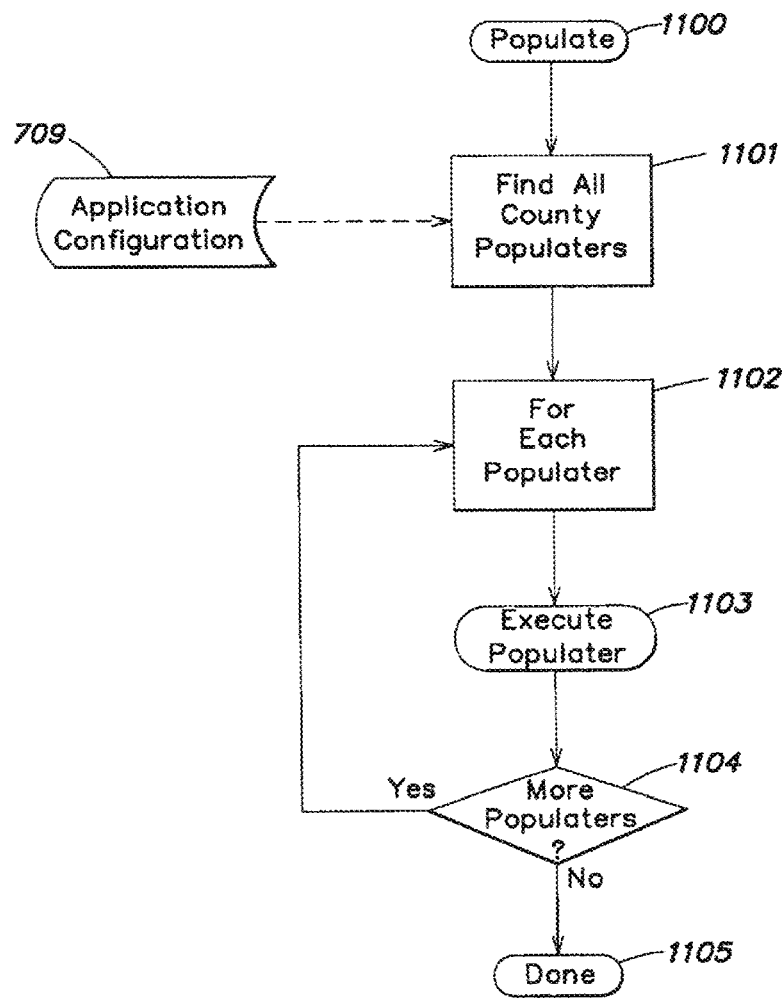
FIGS. 11A-D are flowcharts defining an example of processing for creation of homes in the system from existing county records.

Another optional aspect of the invention is the ability for municipal governments to publish on a public forum the details of properties in their jurisdiction. As exemplified in FIG. 11A, using a county as example of a municipality, a population of county properties is defined. In step 1101 the system determines which counties are configured (in application configuration file 709) to be pre-populated. The system then iterates (steps 1102-1104) over each of the counties. At step 1103, a populater module executes the pm-population of that county's data. This process repeats for each of the county populaters in step 1104. The processing of the individual counties could be executed sequentially on one computer or one or more counties could be executed concurrently within operating system threads or processes on a single computer or the processing of counties could be spread across one or more threads processes on one or more computers.

Figure 11B:
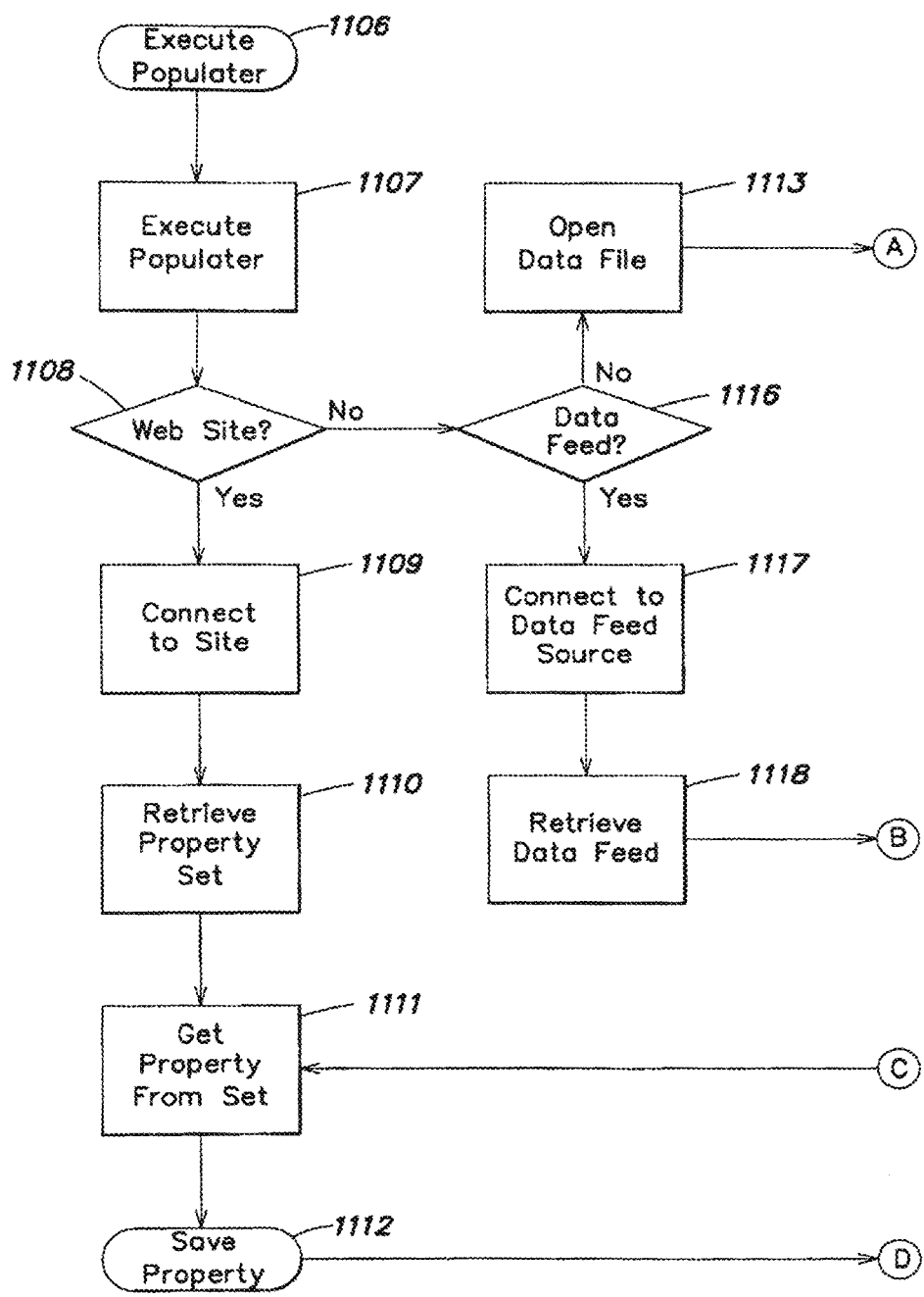

One example, of the processing of each county populater is defined in FIG. 11B. Three examples of populaters are: one that works by scraping a web site (operation 1109), another which works from a data feed (operation 1117) and a third one which works off a data file (operation 1113). In the web site case the "yes" path from decision 1108) the system connects to the web site (step 1109), initiates a query on the site for a set of properties (step 1110) and then takes the resultant web page and extracts the property information one property at a time (step 1111) and saves each property data (process 1112), as defined in FIG. 11C. This processing continues until all properties are retrieved from the web site (step 1126). In the data feed case determined at decision step 1116, the system connects to the data feed source (step 1117), initiates a command on the source to return a set of properties via the feed (step 1118) and then takes the resultant feed data and extracts the property information one property at a time (step 1119) and saves each property data (process 1112), as defined in FIG. 11C. This processing continues until all properties are retrieved from the data feed (as determined at step 1123). In the data file case, the system opens the data file (step 1113) and parses the document to extract the property information one property at a time and saves each property data (process 1112), as defined in FIG. 11C. This processing continues until all properties are retrieved from the data file, per test step 1121.

Figure 11C:
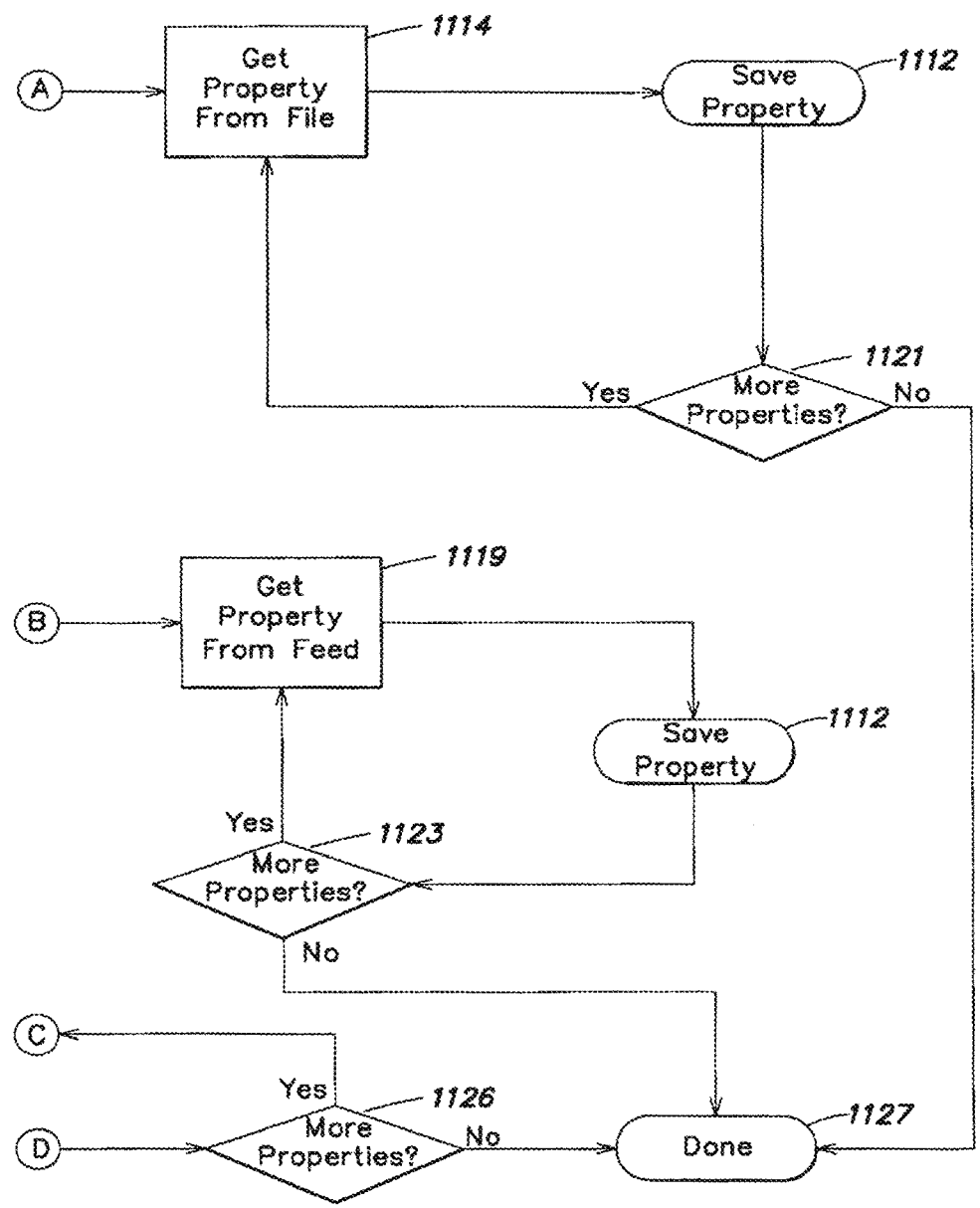
Figure 11D:
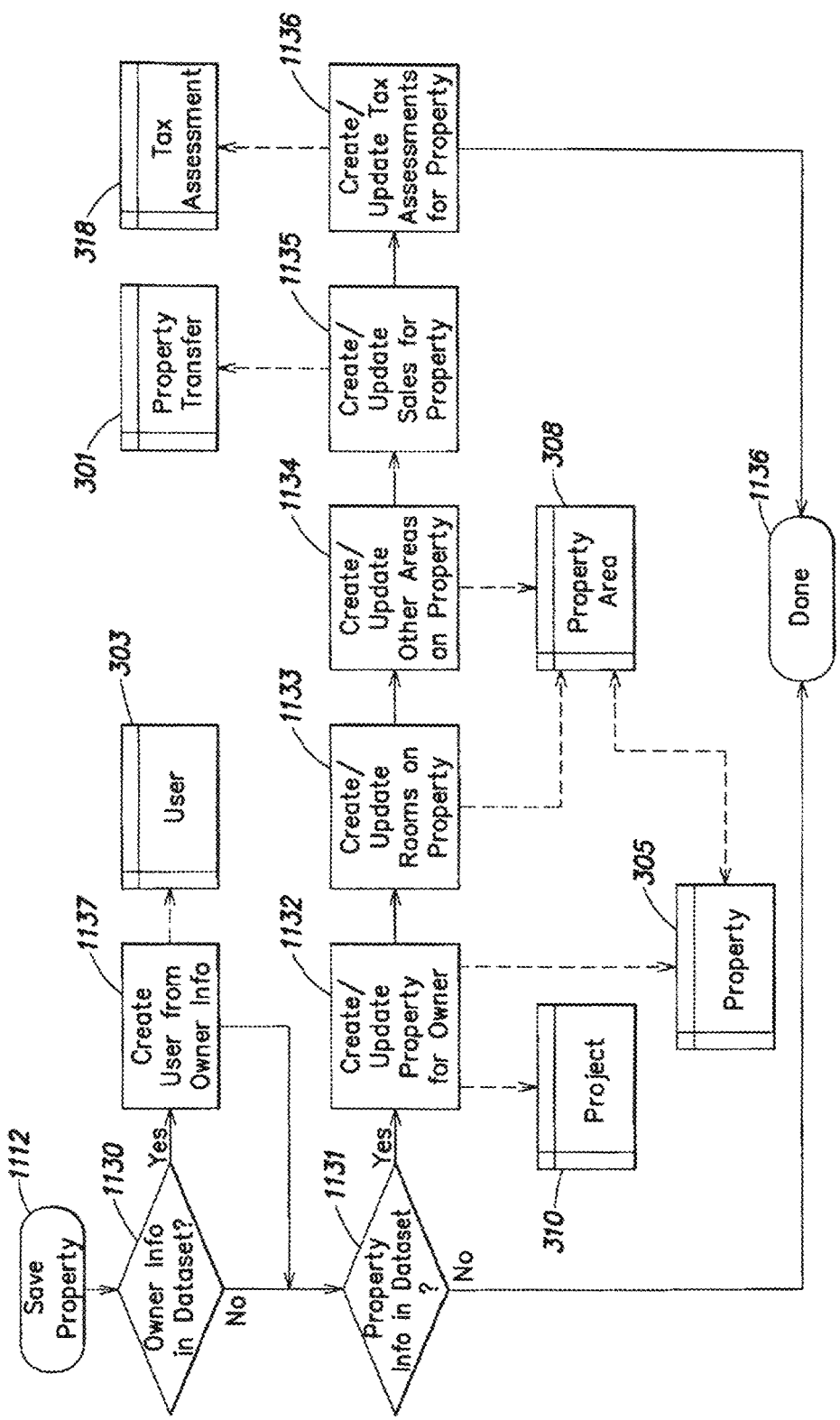

One example of the saving of the municipality property data is defined in FIG. 11C. First, if there is property owner data in the dataset (test step 1130) that data is used to create or update (in the case of the data previously being populated) User 303 information (step 1137). Next, if there is property information in the dataset (tested at step 1131) that data is used to first create or update (in the case of the data previously being populated) Property 305 information (step 1132). Next, room information is pulled from the dataset and used to create or update (in the case of the data previously being populated) Property Area 308 information (step 1133). Next, other area information is pulled from the dataset and used to create or update (in the case of the data previously being populated) Property Area 308 information (step 1134). Next, property sales history is pulled from the dataset and used to create or update (in the case of the data previously being populated) Property Transfer 301 information (step 1135). And finally, property tax assessment history is pulled from the dataset and used to create or update (in the case of the data previously being populated) Tax Assessment 318 information (step 1136).

Figure 13A:
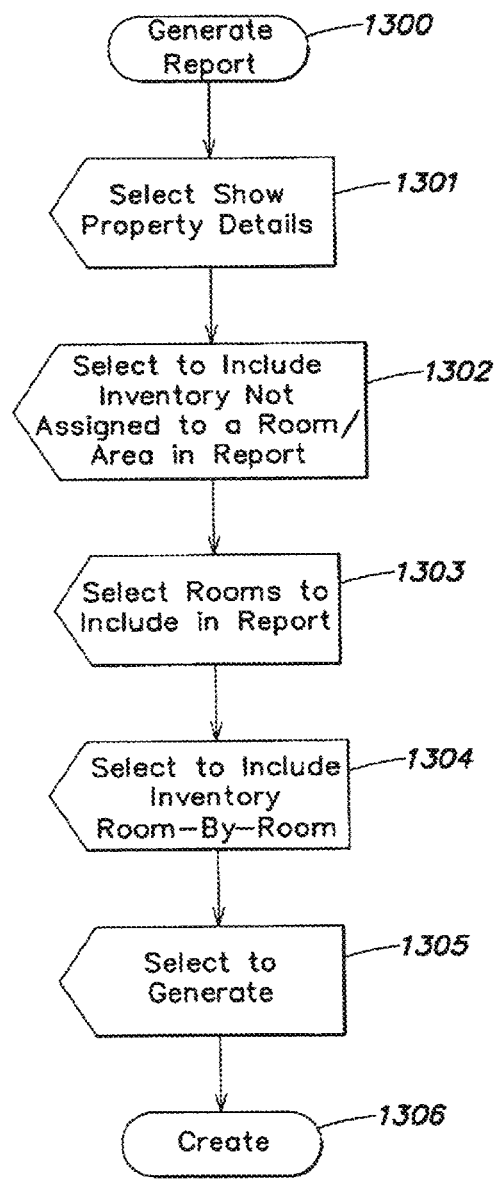
FIGS. 13A-C are flowcharts defining an example of processing for generating a property report.
Figure 13B:
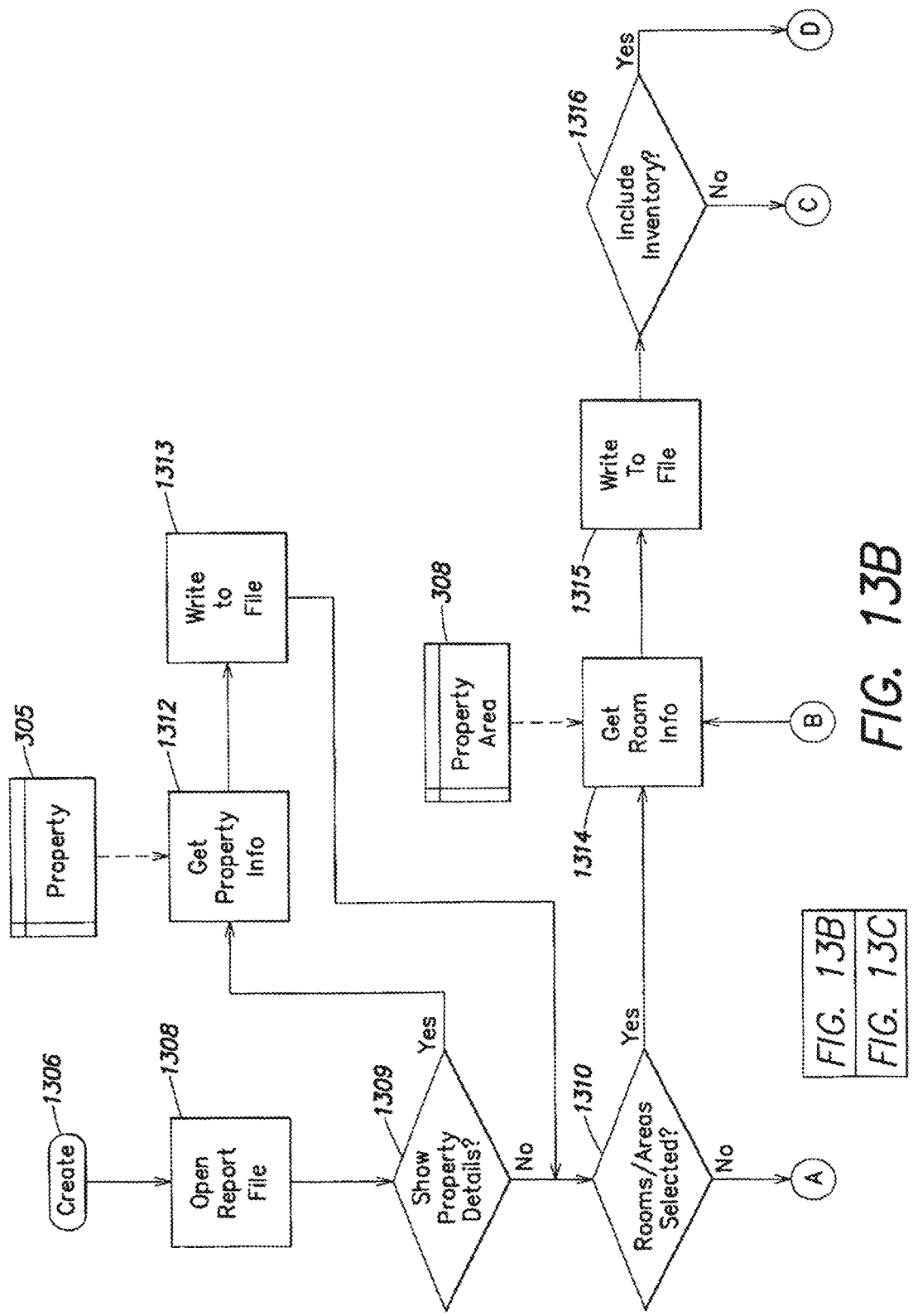
Figure 13C:
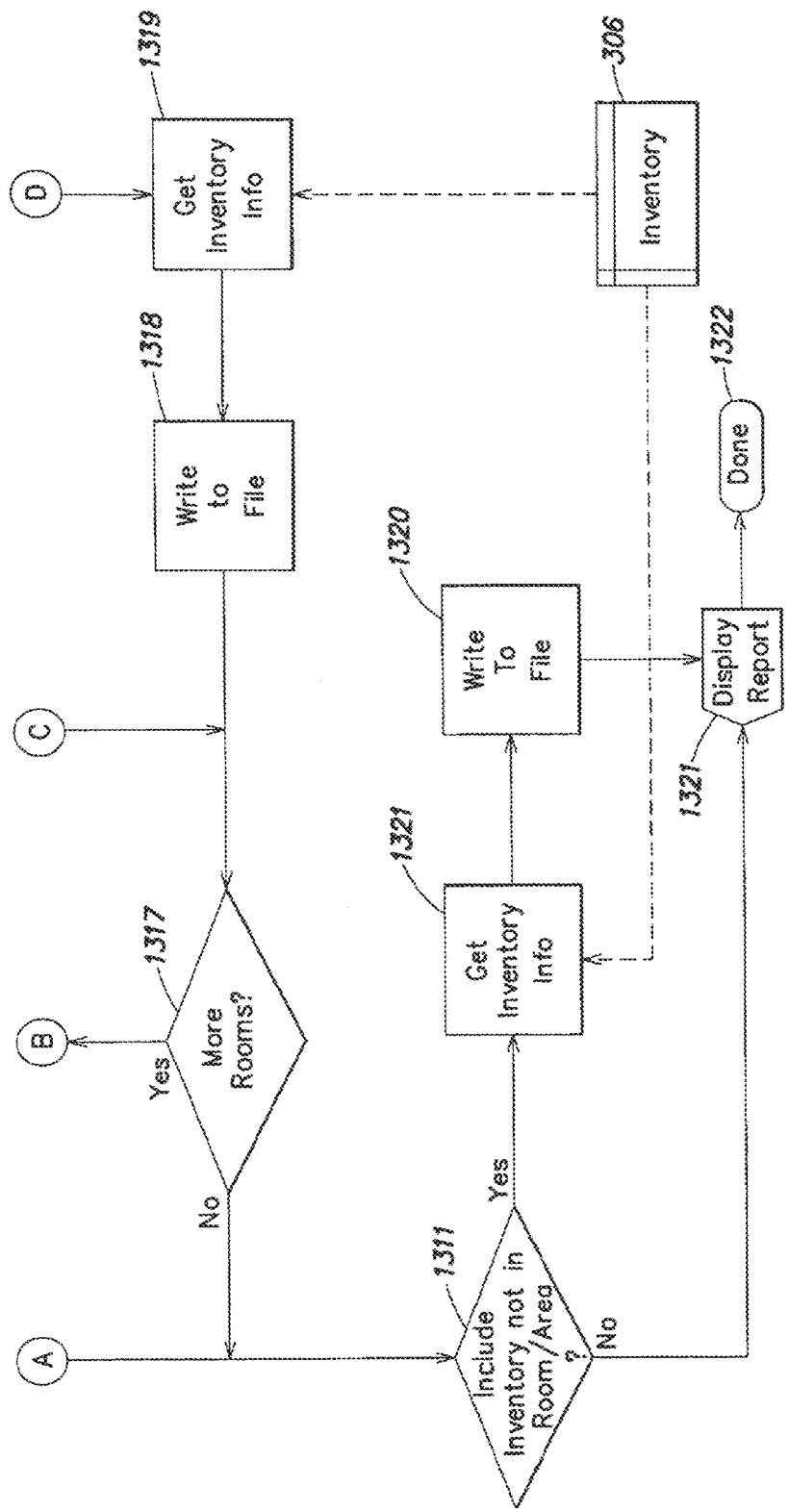

According to some embodiments, a user in the system could generate a report of one or more of their properties as defined in FIGS. 13A and 13B. On choosing to generate a report, the user could select to include in the report some or all of the property details (1301); the inventory not associated in the system with a room or other area (1302); the details of a plurality of rooms and/or other areas (1303), the user could choose individual rooms/other areas or all rooms/other areas; and/or the inventory details on a selected room/other area-by room/other area basis (1304). Once these decisions are made the user could choose to generate the report (step 1305). If generating a report (process 1306), the system opens a report file (step 1308) and if the property details are to be included, retrieves the data from Property container 305 (step 1312) and writes the formatted data out to the report file (step 1313). Next, if rooms/other areas are selected (step 1310), the system gets the room data for each room (steps 1314, 1317) and writes the formatted data out to the report file (step 1315) and then gets the inventory data from Inventory container 306 for the room/other area (step 1319) and writes the formatted data out to the data file (step 1318). When the selected rooms/other areas are completely processed determined by test step 1317), the system checks to see if inventory not assigned to a room is to be included (step 1311) and if so gets the unassigned inventory from Inventory container 306 (step 1321) and writes the formatted data out to the data file (step 1320). Once complete, the system displays the report file (step 1321) and the generation is completed (terminal 1322). The user once having a report could do whatever they wish with the report, for example, sending it to their insurance agent in the case of making an insurance claim.

Figure 12A:
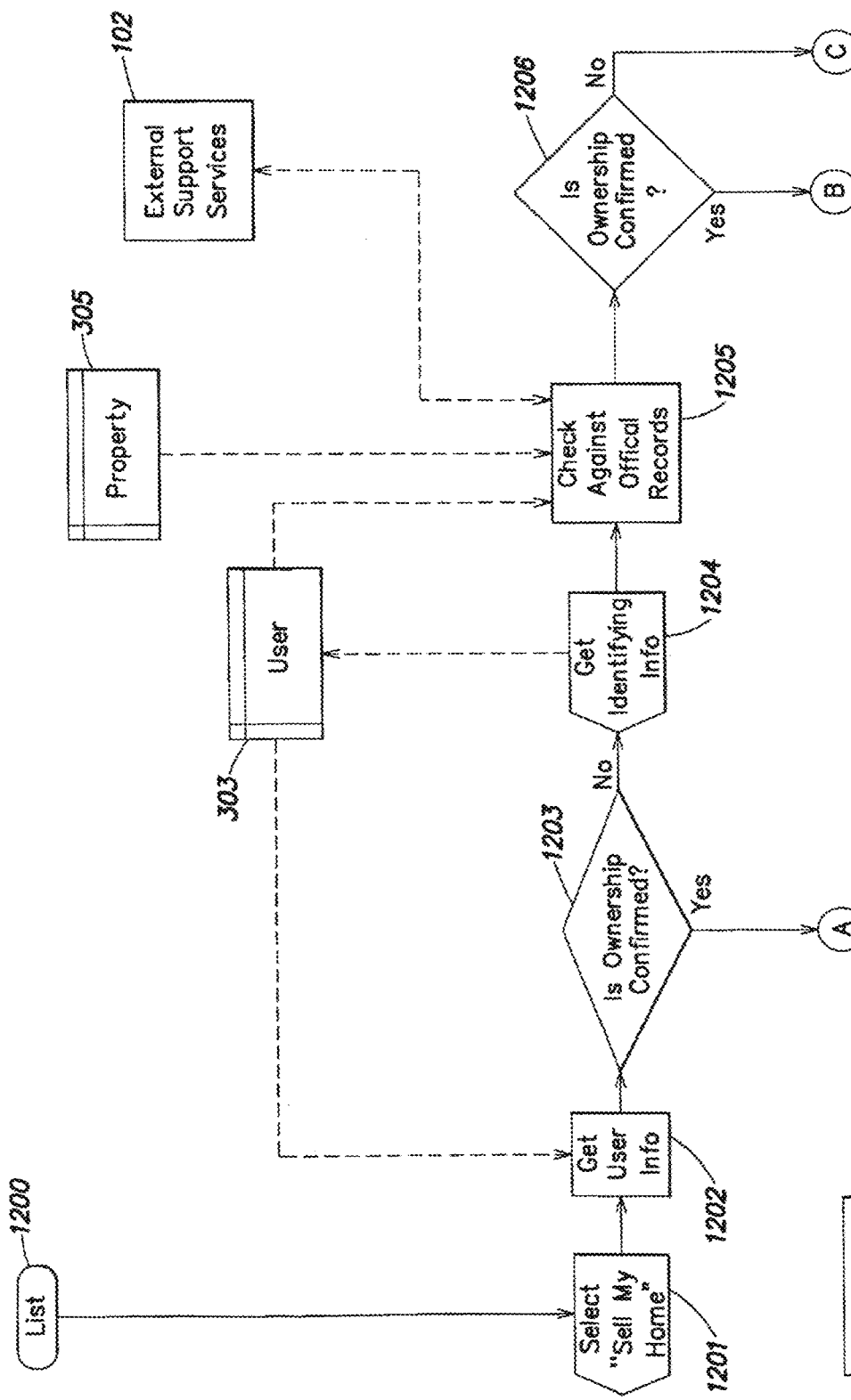
FIGS. 12A-C are flowcharts defining an example of processing for listing a home for sale and transferring the home's records in the system to a new owner.

According to certain embodiments, some properties in the system are viewable by the general public. But at certain times a property owner may decide to sell their property and it would be advantageous for the general public to be so informed. The system may therefore provide the user the ability to "self-list" their property for sale. One example of a process 1200 for self-listing is defined in FIG. 12A and starts with the user selecting to sell their property (step 1201. The system would get the user data from User table 303 (step 1202) to check if ownership has been confirmed (step 1203). If the user has not previously provided key identifying information, he/she must provide this information following the decision to list the property (step 1204). The identifying information could be, for example, a social security number which can be used to check against county records, credit card information to verify identity with a major credit card company, bank account information to be checked against a commercial bank, and/or any other (strictly confidential) information that can be verified through a trusted source of such information. On completion of entry of the information, the system may check against official records (step 1205) which could require interface with an External Support Service 102. Once ownership is verified (step 1206) the user could also choose to submit a project to accept bids from a commission and/or fee realtor (step 1208) or sell it themselves (choice 1209) or submit the property for bids from auctioneers (choice 1210) or attempt to connect with cash-only property liquidators (choice 1211), or attempt all possible ways to sell their home (act 1212). In each case, a project is submitted (process 800) and all appropriate service providers are notified of the sell request. The final step could be to set a "for sale" status on the property in Property Table 305 (step 1213). Once ownership is confirmed, the user may also choose to identify their property as always open for a buying offer without having to go through the listing process. The user may also choose to list the home on an existing multiple listing service (MLS) using the system to construct an MLS-compliant home description and transmitting the description to the MLS.

In certain embodiments, the system enables a user interested in buying property to review a Property in Property Table 305, including certified property surveys, property inspections and property appraisals. In some embodiments, the system provides for continuous data mining features including recurring online automatic search capabilities for open houses that meet certain user-defined selection criteria. In another embodiment, the potential buyer may be automatically profiled by the system and certain listed properties may be suggested as falling within categories of his preference (e.g., price, location, number of bedrooms, land/house ratio).

The system also enables the prospective buyer/lessor to submit bids on the property on line.

According to one embodiment, the system enables the user selling his property to select a type of transaction service. The user may select a closed auction, where the owner can view the bids and then contact individual bidders directly, or an open auction, where a bidder can bid against each other up from the lowest price, or an open auction starting at high price and lowering the price once an hour till the first bid is placed.

According to some embodiments for practicing aspects of the invention, the system may provide security to the property owner by requiring bidders to place a predetermined amount of money, for example 10% of the starting bid price, in case the bidder winning the auction does not go forward with the transaction.

In one embodiment, the system may automatically obtain and post on the system a municipal tax assessment of the property using a populater 1101. The system may specifically provide for electronic delivery of all documents required for a real estate transaction.

Figure 19:
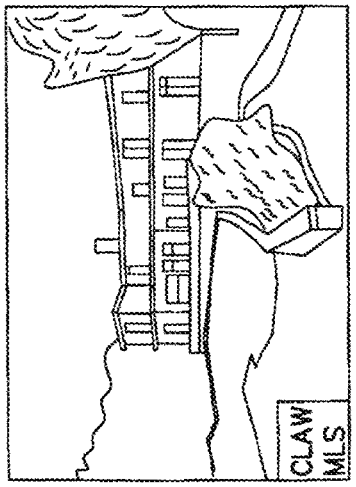
FIG. 19 is an illustration of one example of report listing all properties owned or previously owned by the user.

Another aspect of the invention is the data structures and computer-implemented procedures providing the ability for the user, on completion of sale, to transfer the complete description of the property, project history and conveying inventory to the person or entity buying the home, such history being contained in one or more databases on one or more storage devices and/or on one or more servers operably connected to the internet, or other public or private network(s). The previous homeowner may retain a copy of the home information for his/her/their records but the public account of the home in the forum would, on transfer, belong to the new owner of the home. In one aspect of the invention, a user would retain a copy of the home information for all previously owned properties for their records, and this information would be readily available, for example, as illustrated in the non-limiting example of FIG. 19.

Figure 12B:
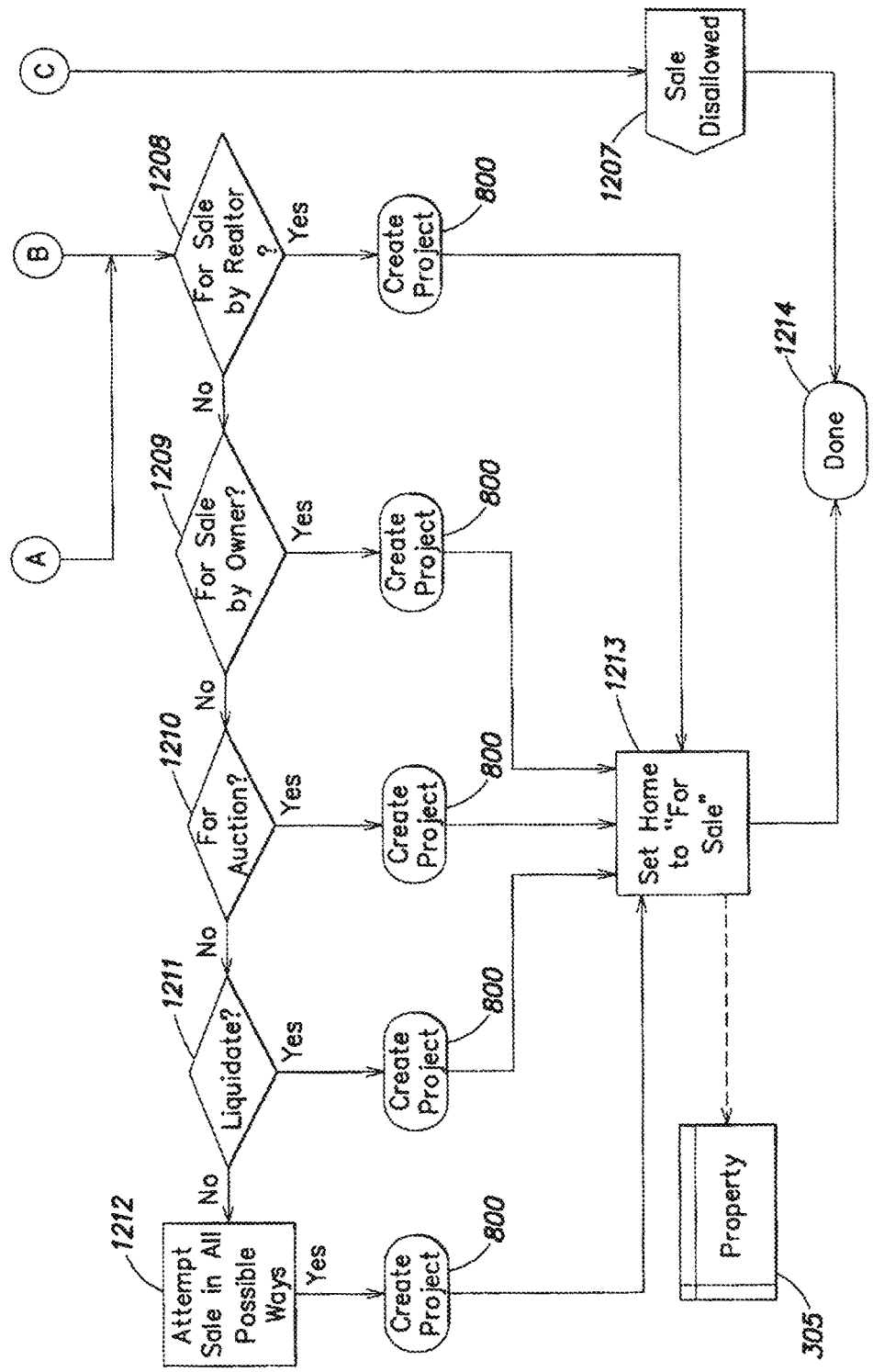
Figure 12C:
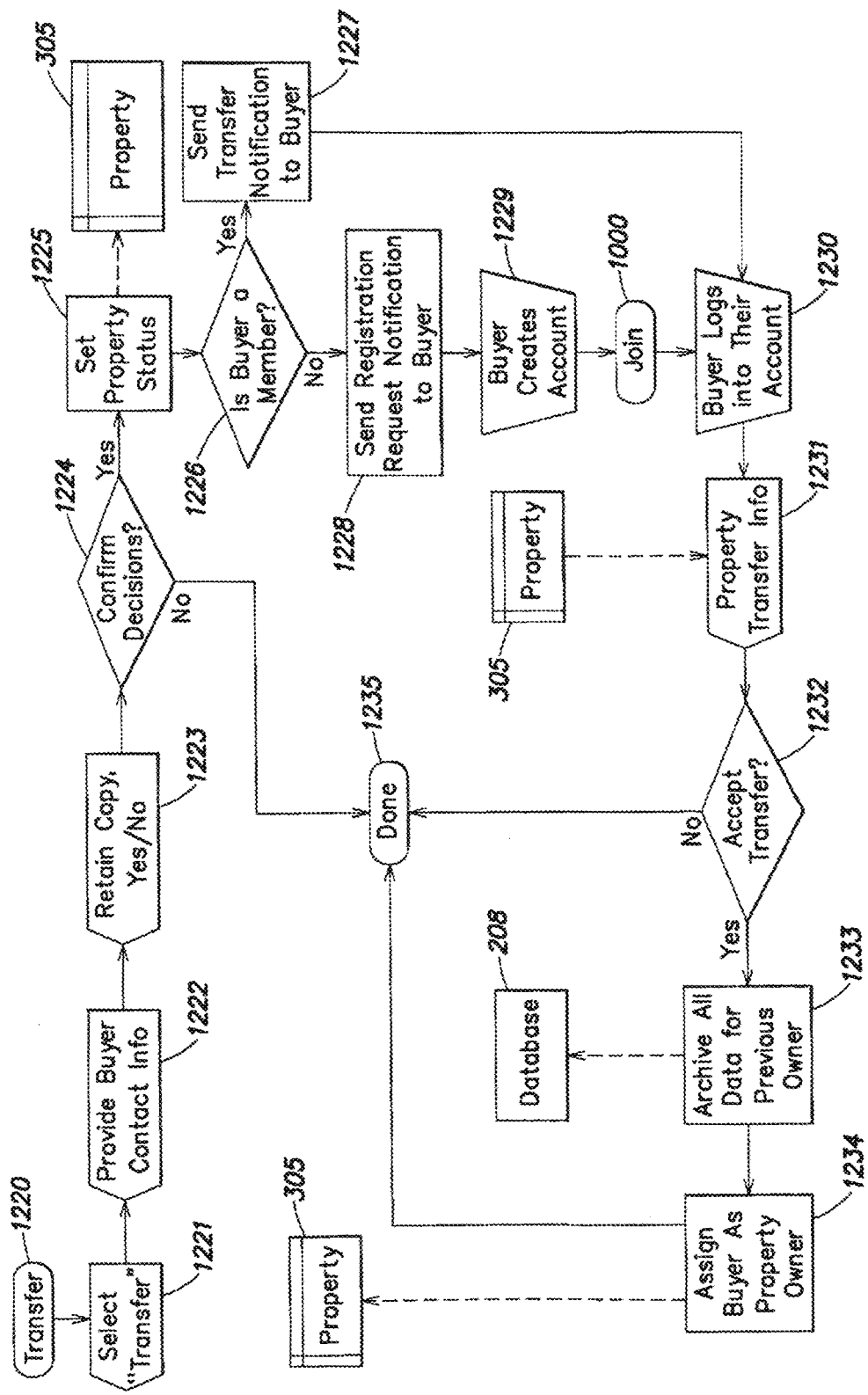

Once a user has sold or otherwise transferred ownership of a property stored in the system, according to some embodiments, the seller transfers the stored information to the new owner for all or an agreed part of the property history including descriptions, supplemental data and all public files of the property, rooms, other areas, conveying inventory, and projects. The seller may, of course, choose to delete or maintain as private and not transfer selected information such as, for example, the cost of a particular home improvement. In this way, the new owner may start with a complete or at least substantial record of the home on purchase. One example of a process 1220 for transferring a property from one user to another is defined in FIG. 12B. First, the user (i.e., seller) selects to transfer a property (step 1221). The user must provide contact information for the buyer (input step 1222), such as the buyer's user name in the system and/or the buyer's email address. The seller must now decide whether to retain a copy of the transferred information (input step 1223) and then verify the decisions they have made (step 1224). On verification, the system sets the status of the property in Property 305 to reflect a transfer has been initiated. If the buyer is a member (step 1226) then an email is sent to the buyer informing the buyer of the property's readiness to be transferred (step 1227). If the buyer is not a member, then an email is sent to the buyer informing the buyer that the property data is ready to be transferred but only if the buyer register with the system (step 1228). The buyer would then create an account 1229) and the process 1000 for joining the system would be initiated. Whether starting this process as a member or joining during it, the buyer ultimately logs into its account (step 1230) and sees the property transfer is ready (output step 1231). If the buyer accepts the transfer (step 1232) the system will then archive all the property data if the seller so chose this to occur (step 1233). This creates a second copy of all the property information in the Database 208 which will only be viewable by the seller, it is strictly a historical record for the seller to do with as it wishes. It also removes all private information from the property records such that the buyer will not see this data. After the archiving completes, the system assigns the buyer as the owner in Property container 305 (step 1234). From this time forward, the buyer is the user-of-record on the property.

In some embodiments for practicing aspects of the invention, upon sale of a property, the system will generate a transfer key code linked to all material non-private information associated with the property. The transfer key code is delivered to the new owner at closing. The new owner, upon signing onto the system, is enabled to use the transfer key code to import the entire history of the property into his account including all inventory for the personal property identified as being conveyed. In some embodiments, the transfer may be accomplished by changing attributes of the property ownership locking mechanism upon receipt of a transfer key to allow one or more communication devices to communicate complete property history data contained in a Property container 305 to a new owner and to communicate the property history data to the transferor only to the extent allowed by a new owner of the property.

Figure 15A:
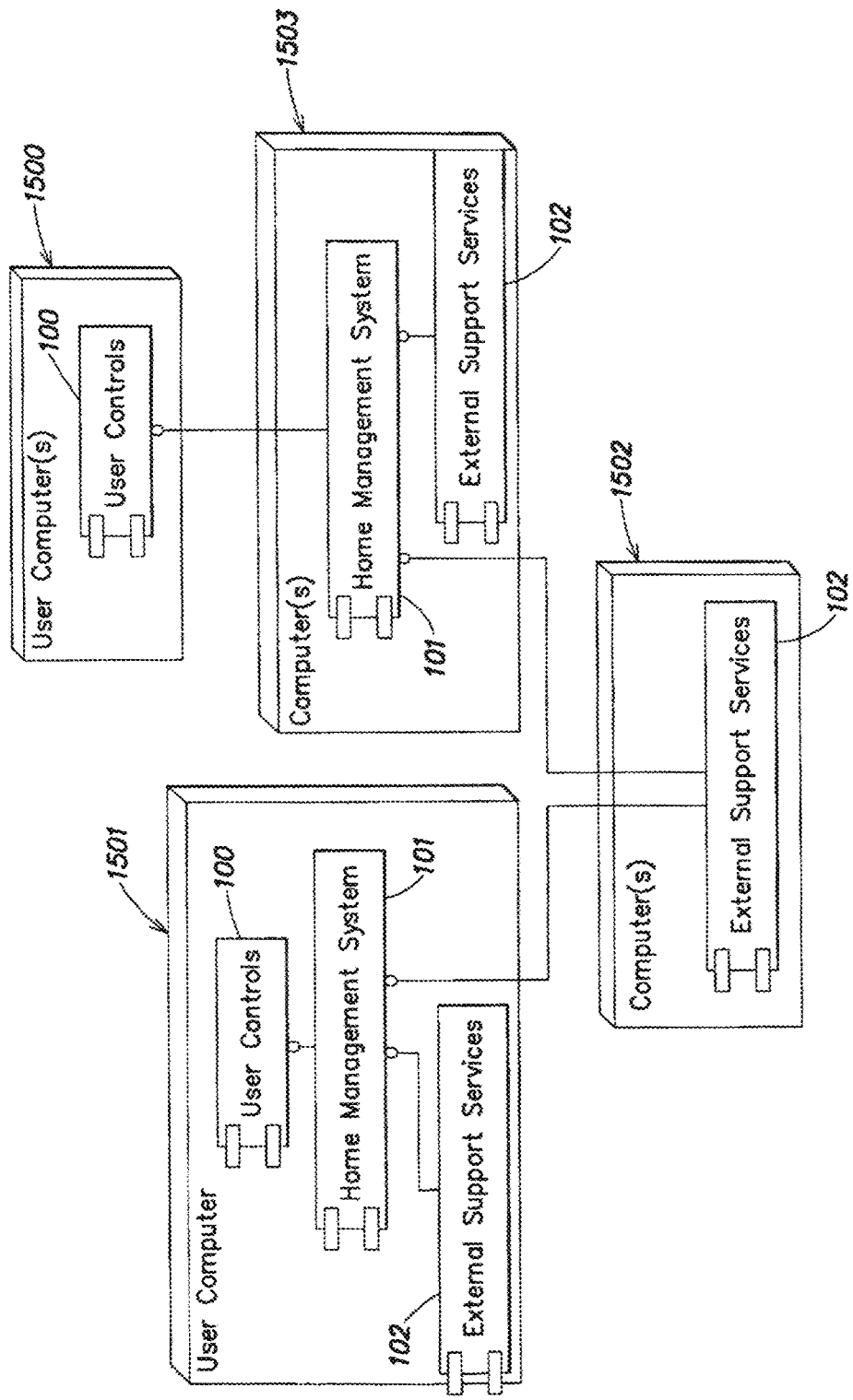
FIGS. 15A-B are deployment diagrams which illustrate an example of various approaches for deploying a system as discussed herein.

The overall application as depicted in FIG. 1 and defined above could be deployed in multiple different ways. According to one embodiment as defined in FIG. 15A, the key systems identified in FIG. 1 could all be deployed to and executed on one computer 1501. Additionally, the zero or more of the External Support Services 102 could be deployed to and executed on a different set of servers 1502 distinct and separate from the User Computer 1501. Additionally, the User Controls 100 could be deployed to and executed on a different computer 1500 distinct and separate from computers 1503 on which is deployed and executing the Home Management System 101 and the External Support Services 102. Additionally, the External Support Services 102 could be deployed to and executing on a different set of computers 1502 which are distinct and separate from the computers 1503 housing the Home Management System 101.

Figure 15B:
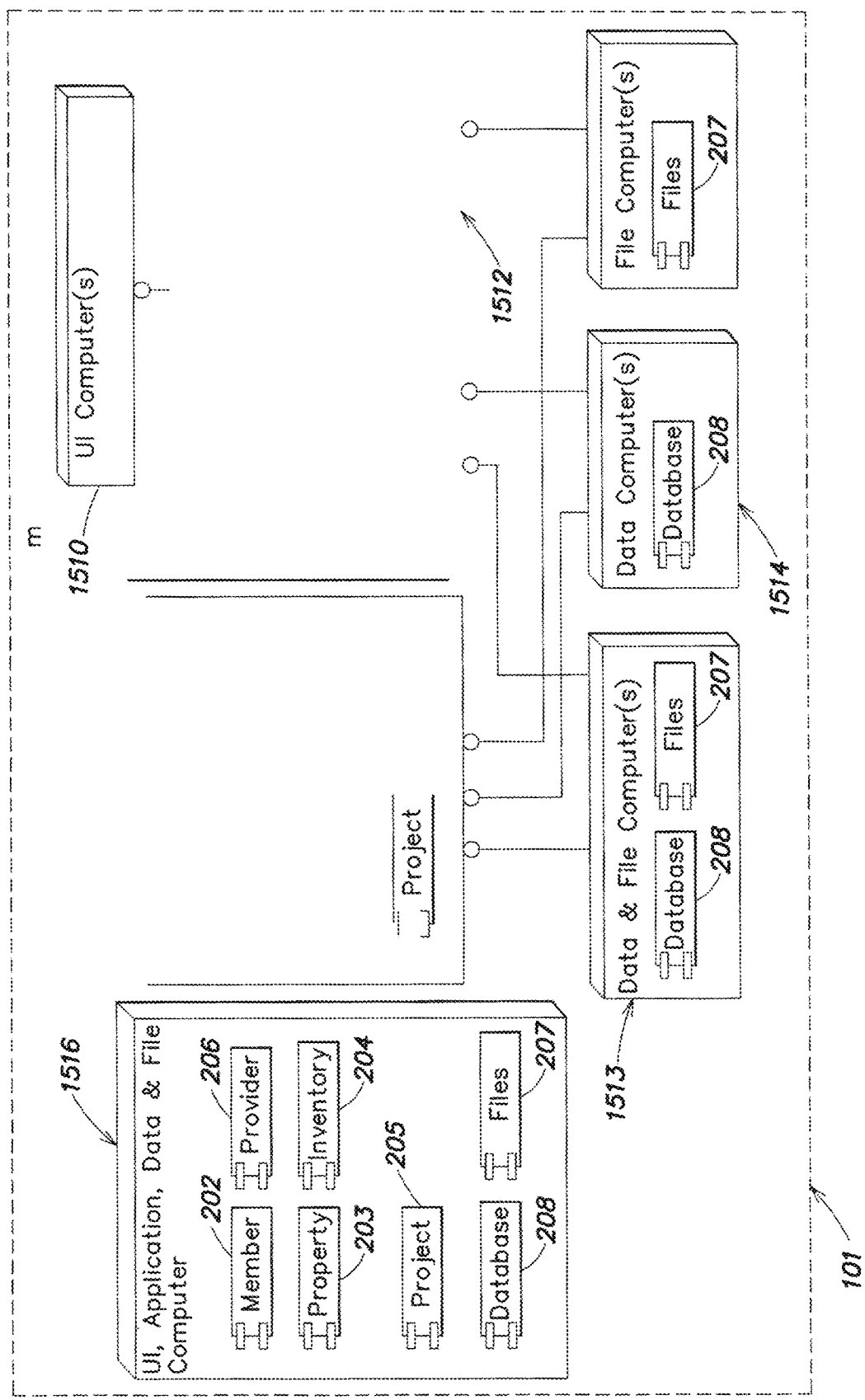

To further illustrate an example deployment of the Home Management System 101, in FIG. 15B the Home Management System 101 is shown with the subsystems identified in FIG. 2 deployed to various computers. First, all of the components of the Home Management System 101 could be deployed to a single computer 1516 which, with the subsystems, would house all the appropriate operating system, user interface infrastructure, database technology, file system technology and network technology. An alternative deployment could be to re-partition the subsystems such that Database 208 and File 207 subsystems could be deployed to one or more separate computers 1513 to improve robustness of the system and allow scaling of the core system across one or more computers 1511 to more efficiently support a plurality of users. Also, Database and File subsystems themselves could be separated from each other on different computers 1514 1515 to isolate database activity from other file system activity. Finally, the UI infrastructure could be pulled from the UI and Application Computers 1512 to further improve robustness and scaling by providing independent computers focused on computing operations associated with an even larger volume of users while the Application Computers 1512 are focused on the computing operations associated with the core system. All of this re-partitioning of the subsystems across one or more computers could be achieved with one or more distributed object software infrastructures like .NET, J2EE, CORBA, and the like, but any suitable software tools may be used.

Although the present invention has been described in connection with specific embodiments for practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A computer-implemented system for managing information relating to a home having an owner, the home having a tax basis used in computing a gain or loss to the owner upon a sale of the home, the system comprising:
  one or more computer-readable storage media, storing instructions and data relating to the home, the data comprising the tax basis of the home; and
  one or more computer processors, programmed via the instructions to:
   receive input relating to one or more projects performed on the home, the input comprising a cost associated with the one or more projects;
   automatically determine whether the one or more projects result in an improvement to the home;
   in response to determining that the one or more projects result in an improvement to the home, automatically compute a sum of the cost associated with the one or more projects and the tax basis of the home, the sum representing an updated tax basis of the home, and store the sum in the one or more computer-readable storage media.

2. The computer-implemented system of claim 1, wherein the one or more computer processors are programmed to store, in the one or more computer-readable storage media, one or more items of information relating to the one or more projects other than the cost associated with of the one or more projects.

3. The computer-implemented system of claim 2, wherein the one or more items of information comprise an image file depicting the home and one or more captions for the image file.

4. The computer-implemented system of claim 1, wherein the one or more computer processors are programmed to store in the one or more computer-readable storage media a history of updates to the tax basis of the home.

5. The computer-implemented system of claim 1, wherein the one or more computer processors are programmed to receive the input relating to the one or more projects from a user via a screen interface.

6. The computer-implemented system of claim 1, wherein the one or more computer processors are programmed to store in the one or more computer-readable storage media information relating to projects comprising at least one of improvements, repairs, extensions, one-time maintenance, and periodic maintenance to the home.

7. The computer-implemented system of claim 4, wherein the one or more computer processors are programmed to store in the one or more computer-readable storage media a date associated with each update to the tax basis of the home.

8. The computer-implemented system of claim 4, wherein the one or more computer processors are programmed to store in the one or more computer-readable storage media, in association with each one of the updates to the tax basis of the home, information identifying any project(s) resulting in the one update.

9. The computer-implemented system of claim 2, wherein the one or more items of information relating to each of the one or more projects comprises at least one of a category, name, description, affected area of the home, project status, actual start date, actual end date, desired start date, desired completion date, approximate cost, and an indication whether the project is to be published for bids.

10. The computer-implemented system of claim 2, wherein the one or more items of information identifies, for each one of the one or more projects, whether the one project affects the home's exterior, one or more rooms in the home's interior, one or more areas of property surrounding the home, or a combination thereof.

11. At least one non-transitory computer-readable storage medium having instructions recorded thereon which, when executed by at least one processor, cause the at least one processor to perform a method comprising acts of:
(A) receiving input relating to one or more projects performed on a home, the home having an owner and a tax basis used in determining a gain or loss to the owner upon a sale of the home, the input comprising a cost associated with the one or more projects;
(B) automatically determining whether the one or more projects result in an improvement to the home; and
(C) in response to determining that the one or more projects result in an improvement to the home, automatically computing a sum of the cost associated with the one or more projects and the tax basis of the home, the sum representing an updated tax basis of the home, and storing the sum in at least one database.

12. The at least one non-transitory computer-readable storage medium of claim 11, wherein the method comprises an act of storing, in the at least one database, one or more items of information relating to the one or more projects other than the cost associated with the one or more projects.

13. The at least one non-transitory computer-readable storage medium of claim 12, wherein the one or more items of information relating to the one or more projects comprise an image file depicting the home and one or more captions for the image file.

14. The at least one non-transitory computer-readable storage medium of claim 12, wherein the one or more items of information comprises, for each of the one or more projects, at least one of a category, name, description, affected area of the home, project status, actual start date, actual end date, desired start date, desired completion date, approximate cost, and an indication whether the project is to be published for bids.

15. The at least one non-transitory computer-readable storage medium of claim 12, wherein the one or more items of information identifies, for each one of the one or more projects, whether the one project affects the home's exterior, one or more rooms in the home's interior, one or more areas of property surrounding the home, or a combination thereof.

16. The at least one non-transitory computer-readable storage medium of claim 11, wherein the method comprises storing in the at least one database information relating to projects comprising at least one of improvements, repairs, extensions, one-time maintenance, and periodic maintenance to the home.

17. The at least one non-transitory computer-readable storage medium of claim 11, wherein the method comprises storing, in the at least one database, a history of updates to the tax basis of the home.

18. The at least one non-transitory computer-readable storage medium of claim 17, wherein the method comprises storing, in the at least one database, a date associated with each update to the tax basis of the home.

19. The at least one non-transitory computer-readable storage medium of claim 17, wherein the method comprises storing, in the at least one database, in association with each one of the updates to the tax basis of the home, information identifying any project(s) resulting in the one update.

20. The at least one non-transitory computer-readable storage medium of claim 11, wherein the act (A) comprises receiving the input relating to the one or more projects from a user via a screen interface.

21. The at least one non-transitory computer-readable storage medium of claim 20, wherein the instructions define presentation of the screen interface to the user.

22. A method for managing information relating to a home having an owner, the home having a tax basis used in computing a gain or loss to the owner upon a sale of the home, the method comprising acts of:
(A) causing data to be stored, in one or more computer-readable storage media, the data comprising the tax basis of the home;
(B) receiving, by at least one processor, input relating to one or more projects performed on the home, the input comprising a cost associated with the one or more projects;
(C) automatically determining, by the at least one processor, whether the one or more projects result in an improvement to the home;
(D) in response to determining that the one or more projects result in an improvement to the home, automatically computing, by the at least one processor, a sum of the cost associated with the one or more projects and the tax basis of the home, the sum representing an updated tax basis of the home; and (E) causing, by the at least one processor, the sum to be stored in the one or more computer- readable storage media.

23. The method of claim 22, wherein the act (B) comprises the at least one processor causing to be stored, in the one or more computer-readable storage media, one or more items of information relating to the one or more projects, other than the cost associated with of the one or more projects.

24. The method of claim 23, wherein the one or more items of information comprise an image file depicting the home and one or more captions for the image file.

25. The method of claim 23, wherein the one or more items of information relating to each of the one or more projects comprises at least one of a category, name, description, affected area of the home, project status, actual start date, actual end date, desired start date, desired completion date, approximate cost, and an indication whether the project is to be published for bids.

26. The method of claim 23, wherein the one or more items of information identifies, for each one of the one or more projects, whether the one project affects the home's exterior, one or more rooms in the home's interior, one or more areas of property surrounding the home, or a combination thereof.

27. The method of claim 22, wherein the act (E) comprises the at least one processor causing to be stored, in the one or more computer-readable storage media, a history of updates to the tax basis of the home.

28. The method of claim 27, wherein the act (E) comprises the at least one processor causing to be stored, in the one or more computer-readable storage media, a date associated with each update to the tax basis of the home.

29. The method of claim 27, wherein the act (E) comprises the at least one processor causing to be stored, in the one or more computer-readable storage media, in association with each one of the updates to the tax basis of the home, information identifying any project(s) resulting in the one update.

30. The method of claim 22, wherein the act (B) comprises the at least one processor receiving input relating to the one or more projects from a user via a screen interface.

31. The method of claim 22, wherein the act (B) comprises the at least one processor causing to be stored, in the one or more computer-readable storage media, information relating to projects comprising at least one of improvements, repairs, extensions, one- time maintenance, and periodic maintenance to the home.

32. A method for managing information relating to a home having an owner, the home having a tax basis used in computing a gain or loss to the owner upon a sale of the home, the method comprising acts of:
(A) causing information to be stored in one or more databases, the information comprising first tax information relating to the home before one or more projects are performed on the home, second tax information relating to the home after the one or more projects were performed, and audit information relating to the first and second tax information, the first tax information and second tax information each comprising one or more of a date and a numerical value expressed in a currency, the audit information providing a summary of the first tax information and the second tax information;
(B) receiving, by at least one processor of a computing system, first input relating to one or more projects performed on the home, the first input comprising costs associated with the one or more projects;
(C) automatically determining, by the at least one processor, whether the one or more projects result in an improvement to the home;
(D) in response to determining that the one or more projects result in an improvement to the home, automatically adding, by the at least one processor, the costs associated with the one or more projects to first tax information for the home to produce a sum; and
(E) causing to be stored, in the one or more databases, the sum as the second tax information, the difference between the first tax information and the second tax information representing an increase or decrease to the tax basis of the home.

33. The method of claim 32, wherein the act (B) comprises receiving input relating to the one or more projects comprising one or more items of information other than the costs associated with the one or more projects, and causing the one or more items of information to be stored in the one or more databases.

34. The method of claim 33, wherein the one or more items of information comprise an image file depicting the home and one or more captions for the image file.

35. The method of claim 32, wherein the act (E) comprises causing a history of modifications to the tax basis of the home to be stored in the one or more databases.

36. The method of claim 32, wherein the act (B) comprises the at least one processor receiving the first input relating to the one or more projects from a user via a screen interface.

37. The method of claim 32, comprising acts of:
receiving further input relating to an additional project performed on the home, the further input comprising costs associated with the additional project;
automatically determining whether the additional project results in an improvement to the home;
in response to determining that the additional project results in an improvement to the home, automatically adding the costs associated with the additional project to the second tax information to produce a sum, and causing the sum to be stored as third tax information;
causing data comprising a tax basis audit trail to be stored in the one or more databases, the tax basis audit trail data comprising a date, project information, and a numerical value expressed in a currency associated with each of the first tax information, the second tax information and the third tax information.

38. At least one non-transitory computer-readable storage medium having instructions stored thereon which, when executed by at least one processor, cause the at least one processor to perform a method for managing information relating to a home having an owner, the home having a tax basis used in computing a gain or loss to the owner upon a sale of the home, the method comprising acts of:
(A) causing information to be stored in one or more databases, the information comprising first tax information relating to the home before one or more projects are performed on the home, second tax information relating to the home after the one or more projects were performed, and audit information relating to the first and second tax information, the first tax information and second tax information each comprising one or more of a date and a numerical value expressed in a currency, the audit information providing a summary of the first tax information and the second tax information;
(B) receiving first input relating to one or more projects performed on the home, the first input comprising costs associated with the one or more projects;

(C) automatically determining whether the one or more projects result in an improvement to the home;

(D) in response to determining that the one or more projects result in an improvement to the home, automatically adding the costs associated with the one or more projects to first tax information for the home to produce a sum; and (E) causing to be stored, in the one or more databases, the sum as the second tax information, the difference between the first tax information and the second tax information representing an increase or decrease to the tax basis of the home.

39. The at least one non-transitory computer-readable storage medium of claim 38, wherein the act (B) comprises receiving input relating to the one or more projects comprising one or more items of information other than the costs associated with the one or more projects, and causing the one or more items of information to be stored in the one or more databases.

40. The at least one non-transitory computer-readable storage medium of claim 39, wherein the one or more items of information comprise an image file depicting the home and one or more captions for the image file.

41. The at least one non-transitory computer-readable storage medium of claim 38, wherein the act (E) comprises causing a history of modifications to the tax basis of the home to be stored in the one or more databases.

42. The at least one non-transitory computer-readable storage medium of claim 38, wherein the act (B) comprises receiving the first input relating to the one or more projects from a user via a screen interface.

43. The at least one non-transitory computer-readable storage medium of claim 38, wherein the method comprises acts of:

receiving further input relating to an additional project performed on the home, the further input comprising costs associated with the additional project;

automatically determining whether the additional project results in an improvement to the home;

in response to determining that the additional project results in an improvement to the home, automatically adding the costs associated with the additional project to the second tax information to produce a sum, and causing the sum to be stored as third tax information;

causing data comprising a tax basis audit trail to be stored in the one or more databases, the tax basis audit trail data comprising a date, project information, and a numerical value expressed in a currency associated with each of the first tax information, the second tax information and the third tax information.

\* \* \* \* \*

UNITED STATES PATENT AND TRADEMARK OFFICE
CERTIFICATE OF CORRECTION

| | |
|---|---|
| PATENT NO. | : 11,734,753 B2 |
| APPLICATION NO. | : 16/551526 |
| DATED | : August 22, 2023 |
| INVENTOR(S) | : Jacob Wohlstadter et al. |

It is certified that error appears in the above-identified patent and that said Letters Patent is hereby corrected as shown below:

On the Title Page

At item (71), the city of Applicant Thermodynamic Design, LLC, "Potomac, MD (US)" should be replaced with --Rockville, MD (US)--.

At item (72), the place of residence of Inventor Jacob Wohlstadter, "Potomac, MD (US)" should be replaced with --Palm Beach Gardens, FL (US)--.

At item (72), the place of residence of Inventor Michael Vock, "Vienna, VA (US)" should be replaced with --Wilmington, DE (US)--.

In item (60), Related U.S. Application Data, please replace "a division of application No. 12/451,946, filed as application" with --a division of application No. 12/451,946, filed on Aug. 25, 2010, filed as application--.

Signed and Sealed this
Thirteenth Day of February, 2024

Katherine Kelly Vidal
*Director of the United States Patent and Trademark Office*